US011987397B2

(12) United States Patent
Hendrix et al.

(10) Patent No.: US 11,987,397 B2
(45) Date of Patent: May 21, 2024

(54) SYSTEMS AND TAGGING INTERFACES FOR IDENTIFICATION OF SPACE OBJECTS

(71) Applicant: ExoAnalytic Solutions, Inc., Foothill Ranch, CA (US)

(72) Inventors: Douglas Lee Hendrix, Ladera Ranch, CA (US); William Alexander Therien, Upland, CA (US)

(73) Assignee: ExoAnalytic Solutions, Inc., Foothill Ranch, CA (US)

( * ) Notice: Subject to any disclaimer, the term of this patent is extended or adjusted under 35 U.S.C. 154(b) by 386 days.

(21) Appl. No.: 17/316,543

(22) Filed: May 10, 2021

(65) Prior Publication Data

US 2022/0024611 A1  Jan. 27, 2022

Related U.S. Application Data

(63) Continuation of application No. 16/283,164, filed on Feb. 22, 2019, now Pat. No. 11,017,571, which is a (Continued)

(51) Int. Cl.
  *B64G 3/00* (2006.01)
  *B64G 1/24* (2006.01)
  (Continued)

(52) U.S. Cl.
  CPC ............. *B64G 3/00* (2013.01); *B64G 1/244* (2019.05); *B64G 1/36* (2013.01); *G01C 21/02* (2013.01);
  (Continued)

(58) Field of Classification Search
  CPC ...... G01S 19/258; G01S 19/28; G01S 5/0252; G01S 5/14; G06T 11/206; G06T 2200/24;
  (Continued)

(56) References Cited

U.S. PATENT DOCUMENTS 3,303,582 A   2/1967  Farquhar
3,624,650 A   11/1971 Paine
  (Continued)

FOREIGN PATENT DOCUMENTS

EP   0886392 A2   12/1998
EP   3002552 A1    4/2016
  (Continued)

OTHER PUBLICATIONS

Cunio, P. M., et al., 'Photometric and Other Analyses of Energetic Events Related to 2017 GEO RSO Anomalies', in Proceedings of the Advanced Maui Optical and Space Surveillance (AMOS) Technologies Conference, Sep. 19-22, 2017 [Retrieved from the internet on Oct. 13, 2020]; < URL: https://amostech.com/TechnicalPapers/2017/Poster/Conio.pdf> in 15 pages.
  (Continued)

*Primary Examiner* — Olumide Ajibade Akonai
(74) *Attorney, Agent, or Firm* — Knobbe, Martens, Olson & Bear, LLP

(57) ABSTRACT

The system is configured to generate a display of a tagging interface. The tagging interface may include a stitching selector. In response to a user selection of (1) a destination element that includes a first name identifier, (2) a source element that includes at least one of the plurality of pixels such that at least one of the plurality of pixels corresponding to longitude-time points comprising a second name identifier, and (3) the stitching selector, the system can be configured to indicate that the source element comprises the first name identifier.

22 Claims, 33 Drawing Sheets

Related U.S. Application Data continuation of application No. 16/280,967, filed on Feb. 20, 2019, now Pat. No. 10,467,783.

(60) Provisional application No. 62/800,964, filed on Feb. 4, 2019, provisional application No. 62/634,765, filed on Feb. 23, 2018.

(51) Int. Cl.

| | | |
|---|---|---|
| *B64G 1/36* | (2006.01) | |
| *G01C 21/02* | (2006.01) | |
| *G06F 3/0482* | (2013.01) | |
| *G06F 3/04845* | (2022.01) | |
| *G06F 3/0485* | (2022.01) | |
| *G06F 3/14* | (2006.01) | |
| *G06F 16/51* | (2019.01) | |
| *G06F 16/587* | (2019.01) | |
| *G06F 16/901* | (2019.01) | |
| *G06F 16/909* | (2019.01) | |
| *G06F 18/40* | (2023.01) | |
| *G06T 7/70* | (2017.01) | |
| *G06T 7/80* | (2017.01) | |
| *G06T 11/20* | (2006.01) | |
| *G06T 11/60* | (2006.01) | |
| *G06V 10/20* | (2022.01) | |
| *G06V 10/94* | (2022.01) | |
| *G06V 20/13* | (2022.01) | |
| *B64G 1/10* | (2006.01) | |
| *G01C 21/20* | (2006.01) | |
| *G01S 5/14* | (2006.01) | |
| *G01S 19/25* | (2010.01) | |
| *G01S 19/40* | (2010.01) | |
| *G01S 19/42* | (2010.01) | |
| *G06F 3/04842* | (2022.01) | |
| *G06T 5/92* | (2024.01) | |
| *G06V 10/62* | (2022.01) | |
| *H04W 64/00* | (2009.01) | |

(52) U.S. Cl.
CPC .......... *G06F 3/0482* (2013.01); *G06F 3/0485* (2013.01); *G06F 3/14* (2013.01); *G06F 16/51* (2019.01); *G06F 16/587* (2019.01); *G06F 16/9024* (2019.01); *G06F 16/909* (2019.01); *G06F 18/40* (2023.01); *G06T 7/70* (2017.01); *G06T 7/80* (2017.01); *G06T 11/206* (2013.01); *G06T 11/60* (2013.01); *G06V 10/255* (2022.01); *G06V 10/945* (2022.01); *G06V 20/13* (2022.01); *B64G 1/1007* (2013.01); *B64G 1/1021* (2013.01); *B64G 1/1035* (2023.08); *B64G 1/242* (2013.01); *G01C 21/20* (2013.01); *G01S 5/14* (2013.01); *G01S 19/258* (2013.01); *G01S 19/40* (2013.01); *G01S 19/42* (2013.01); *G06F 3/04842* (2013.01); *G06F 3/04845* (2013.01); *G06F 2203/04806* (2013.01); *G06T 5/92* (2024.01); *G06T 2200/24* (2013.01); *G06T 2207/10032* (2013.01); *G06T 2207/20208* (2013.01); *G06T 2207/30204* (2013.01); *G06V 10/62* (2022.01); *H04W 64/003* (2013.01)

(58) Field of Classification Search
CPC .......... G06T 2207/10032; B64G 1/242; B64G 1/1007; B64G 1/1021; B64G 1/1085; B64G 3/00; G06F 16/909; G06F 16/9024; G06F 3/04842; G06F 3/04845; G06F 16/587; G06F 3/0482; G06F 3/0485; G06K 2009/3291; G06K 9/0063; H01Q 1/288; H04W 64/003; G01C 21/20

See application file for complete search history.

(56) References Cited

U.S. PATENT DOCUMENTS

| | | | |
|---|---|---|---|
| 3,676,581 A | 7/1972 | Swet | |
| 4,355,311 A | 10/1982 | Frosch et al. | |
| 4,602,257 A | 7/1986 | Grisham | |
| 4,617,634 A | 10/1986 | Izumida et al. | |
| 4,727,373 A | 2/1988 | Hoover | |
| 4,746,976 A | 5/1988 | Kamel et al. | |
| 4,943,808 A * | 7/1990 | Dulck | H04B 7/18576 |
| | | | 342/356 |
| 5,051,749 A | 9/1991 | Stoyle | |
| 5,133,050 A | 7/1992 | George et al. | |
| 5,436,632 A | 7/1995 | Sheynblat | |
| 5,512,743 A | 4/1996 | Shaffer et al. | |
| 5,557,524 A | 9/1996 | Maki | |
| 5,570,096 A * | 10/1996 | Knight | G01S 5/06 |
| | | | 342/461 |
| 5,574,465 A | 11/1996 | Okada | |
| 5,677,693 A | 10/1997 | Frankot et al. | |
| 5,678,175 A | 10/1997 | Stuart et al. | |
| 5,701,678 A | 12/1997 | Wang | |
| 5,812,932 A | 9/1998 | Wiedeman et al. | |
| 5,935,195 A | 8/1999 | Quine | |
| 5,979,832 A | 11/1999 | Draim | |
| 6,172,747 B1 | 1/2001 | Houlberg | |
| 6,182,114 B1 | 1/2001 | Yap et al. | |
| 6,304,212 B1 | 10/2001 | Aoki et al. | |
| 6,330,988 B1 | 12/2001 | Liu et al. | |
| 6,353,794 B1 | 3/2002 | Davis et al. | |
| 6,452,532 B1 | 9/2002 | Grisham | |
| 6,538,674 B1 | 3/2003 | Shibata et al. | |
| 6,690,934 B1 | 2/2004 | Conrad et al. | |
| 6,868,316 B1 * | 3/2005 | Stevens | B64G 1/1085 |
| | | | 701/13 |
| 7,369,809 B1 * | 5/2008 | Wang | H04B 7/18521 |
| | | | 455/430 |
| 7,477,991 B2 | 1/2009 | Cross et al. | |
| 7,777,666 B2 | 8/2010 | Gregory et al. | |
| 7,953,553 B2 | 5/2011 | Choi | |
| 8,160,400 B2 | 4/2012 | Snavely et al. | |
| 8,218,013 B1 | 7/2012 | Ellis et al. | |
| 8,275,883 B2 | 9/2012 | Snoddy et al. | |
| 8,340,423 B1 | 12/2012 | Zelinka et al. | |
| 8,401,276 B1 | 3/2013 | Choe et al. | |
| 8,401,307 B1 | 3/2013 | Rowe et al. | |
| 8,447,071 B2 | 4/2013 | Ohta | |
| 8,463,071 B2 | 6/2013 | Snavely et al. | |
| 8,498,481 B2 | 7/2013 | Blake et al. | |
| 8,645,429 B1 | 2/2014 | Bik et al. | |
| 8,718,373 B2 | 5/2014 | Mendis | |
| 8,744,214 B2 | 6/2014 | Snavely et al. | |
| 8,886,446 B1 | 11/2014 | Baiada et al. | |
| 8,942,483 B2 | 1/2015 | Janky et al. | |
| 8,989,434 B1 | 3/2015 | Reinhardt et al. | |
| 8,989,502 B2 | 3/2015 | Janky et al. | |
| 9,025,810 B1 | 5/2015 | Reinhardt et al. | |
| 9,042,657 B2 | 5/2015 | Janky et al. | |
| 9,324,003 B2 | 4/2016 | France et al. | |
| 9,344,182 B2 * | 5/2016 | Bigras | B64G 1/242 |
| 9,471,986 B2 | 10/2016 | Janky et al. | |
| 9,547,935 B2 | 1/2017 | Haglund et al. | |
| 9,569,667 B1 | 2/2017 | Forkert | |
| 9,658,073 B2 | 5/2017 | Hindman | |
| 9,667,948 B2 | 5/2017 | Wang et al. | |
| 9,727,976 B1 * | 8/2017 | Perkins | G06V 20/13 |
| 9,819,410 B1 | 11/2017 | Azevedo et al. | |
| 9,842,256 B2 | 12/2017 | Krauss | |
| 9,857,960 B1 | 1/2018 | Dennis et al. | |
| 9,927,513 B2 | 3/2018 | Benninghofen et al. | |
| 9,934,453 B2 | 4/2018 | Hammoud et al. | |
| 9,990,750 B1 | 5/2018 | Reinhardt et al. | |
| 10,115,186 B2 | 10/2018 | Komatsu | |

(56) References Cited

U.S. PATENT DOCUMENTS

| | | | |
|---|---|---|---|
| 10,242,578 B2 | 3/2019 | Mellema et al. | |
| 10,402,672 B1 | 9/2019 | Hendrix et al. | |
| 10,407,191 B1 | 9/2019 | Hendrix et al. | |
| 10,416,862 B1 | 9/2019 | Hendrix et al. | |
| 10,452,223 B2 | 10/2019 | Keondjian et al. | |
| 10,467,783 B2 | 11/2019 | Hendrix et al. | |
| 10,647,453 B2 | 5/2020 | Hendrix et al. | |
| 10,657,738 B2* | 5/2020 | Bauchot | G07C 5/008 |
| 10,661,920 B2 | 5/2020 | Hendrix et al. | |
| 10,740,609 B1 | 8/2020 | Shaddix et al. | |
| 10,835,803 B2 | 11/2020 | Okur et al. | |
| 10,976,911 B2 | 4/2021 | Hendrix et al. | |
| 11,280,194 B2 | 3/2022 | Sercel | |
| 11,402,986 B2 | 8/2022 | Hendrix et al. | |
| 11,506,773 B1 | 11/2022 | Everett et al. | |
| 11,643,930 B2 | 5/2023 | Sercel | |
| 11,748,897 B1 | 9/2023 | Burgoyne et al. | |
| 2001/0036293 A1 | 11/2001 | Laumeyer et al. | |
| 2002/0047798 A1 | 4/2002 | Platt | |
| 2004/0152471 A1 | 8/2004 | MacDonald et al. | |
| 2005/0053309 A1 | 3/2005 | Szczuka et al. | |
| 2006/0143142 A1 | 6/2006 | Vasilescu et al. | |
| 2006/0251292 A1 | 11/2006 | Gokturk et al. | |
| 2007/0110338 A1 | 5/2007 | Snavely et al. | |
| 2007/0154067 A1 | 7/2007 | Laumeyer et al. | |
| 2007/0292046 A1 | 12/2007 | Johnson | |
| 2008/0007451 A1 | 1/2008 | De Maagt et al. | |
| 2008/0033648 A1 | 2/2008 | Kelly et al. | |
| 2008/0052638 A1 | 2/2008 | Frank et al. | |
| 2008/0056538 A1 | 3/2008 | Frank | |
| 2008/0059452 A1 | 3/2008 | Frank | |
| 2008/0198221 A1 | 8/2008 | Liou | |
| 2008/0229248 A1 | 9/2008 | Fagans et al. | |
| 2009/0125221 A1 | 5/2009 | Estkowski et al. | |
| 2009/0157730 A1 | 6/2009 | Huang | |
| 2009/0225155 A1 | 9/2009 | Hirotani | |
| 2009/0303110 A1 | 12/2009 | Gregory et al. | |
| 2010/0118053 A1 | 5/2010 | Karp et al. | |
| 2010/0245571 A1 | 9/2010 | Voe | |
| 2011/0064312 A1 | 3/2011 | Janky et al. | |
| 2011/0196550 A1 | 8/2011 | Carrico et al. | |
| 2011/0235923 A1 | 9/2011 | Weisenburger et al. | |
| 2011/0246002 A1 | 10/2011 | Shavit | |
| 2012/0113230 A1 | 5/2012 | Jin | |
| 2012/0169734 A1 | 7/2012 | Snavely et al. | |
| 2012/0169770 A1 | 7/2012 | Snavely et al. | |
| 2012/0293678 A1 | 11/2012 | Morales et al. | |
| 2012/0301039 A1 | 11/2012 | Maunder et al. | |
| 2013/0159263 A1 | 6/2013 | Paffenroth et al. | |
| 2013/0195362 A1 | 8/2013 | Janky et al. | |
| 2013/0195363 A1 | 8/2013 | Janky et al. | |
| 2013/0235071 A1 | 9/2013 | Ubillos et al. | |
| 2013/0235074 A1 | 9/2013 | Cherna et al. | |
| 2013/0238724 A1 | 9/2013 | Cunningham | |
| 2013/0243250 A1 | 9/2013 | France et al. | |
| 2013/0254666 A1 | 9/2013 | Snavely et al. | |
| 2014/0072233 A1 | 3/2014 | Horwood | |
| 2014/0074766 A1 | 3/2014 | Aristoff | |
| 2014/0074767 A1 | 3/2014 | Horwood | |
| 2014/0074768 A1 | 3/2014 | Horwood | |
| 2014/0156411 A1 | 6/2014 | Murgai | |
| 2015/0103078 A1 | 4/2015 | Dykes et al. | |
| 2015/0170368 A1 | 6/2015 | Janky et al. | |
| 2015/0260849 A1 | 9/2015 | Eastman | |
| 2015/0266591 A1 | 9/2015 | Petillon | |
| 2015/0269860 A1 | 9/2015 | Shaw et al. | |
| 2015/0310627 A1 | 10/2015 | Moraites et al. | |
| 2015/0353208 A1 | 12/2015 | Turner | |
| 2016/0061598 A1 | 3/2016 | NcNair et al. | |
| 2016/0188176 A1 | 6/2016 | Runnels | |
| 2017/0046962 A1 | 2/2017 | Shipley et al. | |
| 2017/0098181 A1 | 4/2017 | Herman et al. | |
| 2017/0150060 A1 | 5/2017 | Herz | |
| 2017/0192095 A1* | 7/2017 | Jobanputra | H04B 7/18517 |
| 2017/0206643 A1 | 7/2017 | Weiss et al. | |
| 2017/0278180 A1 | 9/2017 | Landry | |
| 2017/0283094 A1 | 10/2017 | Ho | |
| 2017/0287196 A1 | 10/2017 | Raeburn et al. | |
| 2017/0365064 A1 | 12/2017 | Van 't Woud et al. | |
| 2018/0011183 A1 | 1/2018 | Tuxen | |
| 2018/0024250 A1 | 1/2018 | Nishi et al. | |
| 2018/0041032 A1 | 2/2018 | Kumar et al. | |
| 2018/0051914 A1 | 2/2018 | Sercel | |
| 2018/0089506 A1 | 3/2018 | Taite et al. | |
| 2018/0162558 A1 | 6/2018 | Chao et al. | |
| 2018/0220107 A1 | 8/2018 | Williams | |
| 2018/0232097 A1 | 8/2018 | Kneuper et al. | |
| 2018/0268605 A1 | 9/2018 | Jia et al. | |
| 2019/0050136 A1 | 2/2019 | Alfano et al. | |
| 2019/0056856 A1 | 2/2019 | Simmons et al. | |
| 2019/0219026 A1 | 7/2019 | Sheldon-Coulson et al. | |
| 2019/0263543 A1 | 8/2019 | Hendrix et al. | |
| 2019/0265872 A1 | 8/2019 | Hendrix et al. | |
| 2019/0266744 A1 | 8/2019 | Hendrix et al. | |
| 2019/0266763 A1 | 8/2019 | Hendrix et al. | |
| 2019/0266764 A1 | 8/2019 | Hendrix et al. | |
| 2019/0266770 A1 | 8/2019 | Hendrix et al. | |
| 2019/0304147 A1 | 10/2019 | Hendrix et al. | |
| 2019/0315497 A1 | 10/2019 | Blomquiest | |
| 2019/0325652 A1 | 10/2019 | Di et al. | |
| 2020/0018844 A1 | 1/2020 | Fridman et al. | |
| 2020/0240267 A1 | 7/2020 | Sercel et al. | |
| 2021/0026524 A1 | 1/2021 | Hendrix et al. | |
| 2021/0033309 A1 | 2/2021 | Sercel | |
| 2021/0223948 A1 | 7/2021 | Hendrix et al. | |
| 2021/0333019 A1 | 10/2021 | Sercel et al. | |
| 2021/0404419 A1 | 12/2021 | Sercel et al. | |
| 2022/0024612 A1 | 1/2022 | Sercel et al. | |
| 2022/0082019 A1 | 3/2022 | Sercel et al. | |
| 2022/0089302 A1 | 3/2022 | Sercel et al. | |
| 2022/0090500 A1 | 3/2022 | Sercel | |
| 2022/0268524 A1 | 8/2022 | Small et al. | |
| 2022/0274721 A1 | 9/2022 | Sercel et al. | |
| 2022/0369308 A1 | 11/2022 | Hendrix et al. | |

FOREIGN PATENT DOCUMENTS

| | | |
|---|---|---|
| WO | WO 2008/112708 A2 | 9/2008 |
| WO | WO 2010/061448 A1 | 6/2010 |
| WO | WO 2021/041918 A1 | 3/2021 |
| WO | WO 2021/252087 A2 | 12/2021 |

OTHER PUBLICATIONS

Cunio, P. M., et al., 'Advanced Debris Analysis Techniques Enabled by Rich Persistent Datasets', Jan. 16, 2018, Space Traffic Management Conference [Retrieved from internet on Jun. 11, 2019] < URL: https://commons.erau.edu/stm/2018/presentations/16>, in 18 pages.

Ivezic et al., SDSS Standard Star Catalog for Stripe 82: the Dawn of Industrial 1% Optical Photometry. Publisher and location unknown; Mar. 7, 2007, 63 pages.

Keeptrack.space by ThKruz, Javascript application to view data about satellites and the sensors that track them, 2016 [ Viewed on internet on Jun. 11, 2019 ]< URL: https://keeptrack.space > and source code available at <URL: https://github.com/thkruz/keeptrack. space >; downloaded Jul. 15, 2019 in 3 pages.

Rabotin C., NYX-SPACE 0.0.5: A high-fidelity space mission toolkit, with orbit propagation, estimation and some systems engineering Apache-2.0; 2018; downloaded from URL: < https://docs.rs/nyx-space/0.0.5/nyx_space/>; in 2 pages.

Slatton et al., Methods of Processing Geosynchronous Breakups. Advanced Maui Optical and Space Surveillance Technologies Conference (AMOS), May 31, 2018 in 9 pages.

Stuffin.space by jeyoder, Javascript application: A real-time interactive WebGL visualisation of objects in Earth orbit, 2015 [ Viewed on internet on Jun. 11, 2019 ]< URL: http://stuffin.space > and source code available at <URL: https://github.com/jeyoder/ThingsInSpace >; downloaded Jul. 15, 2019 in 13 pages.

Woffinden, D.C., et al., "Navigating the Road to Autonomous Orbit Rendezvous", J Spacecraft Rockets. (2007) 44(4): 898-909.

(56) References Cited

OTHER PUBLICATIONS

Co-Pending Applications of Assignee—Statement dated May 21, 2019 regarding commonly owned applications of Applicant, in 1 page.
International Search Report and Written Opinion dated Jun. 11, 2019 for corresponding PCT/US2019/019026, filed Feb. 21, 2019.
Ackermann et al., "A systematic examination of ground-based and space-based approaches to optical detection and tracking of satellites", Sandia National Lab. (SNL-NM), Albuquerque, NM; May 1, 2015: 46 pages.
Astroromp.com, "Comparison between LX90GPS and LX200GPS", Observationis and use; Undated, 3 pages.
BISQUE.com, "The SkyX Professional Edition—Software", (Jun. 2019), 2 pages.
Celestron Engineering Team, "The Celestron® EdgeHD™—A Flexible Imaging Platform", (Apr. 2013); 6 pages.
Clark R.N., "Spectroscopy of Rocks and Minerals, and Principles of Spectroscopy". In Manual ofRemote Sensing, vol. 3, Remote Sensing for the Earth Sciences, [Rencz A.N. Ed.], John Wiley & Sons, NY, (1999), pp. 3-58.
Diffraction Limited, Maxim DL Astronomical Imaging Software by Cyanogen Imaging®, Product Advertisement/Specification; 3 pages.
Elenin et al., Remote Observatory ISON-NM. Survey of Minor Solar System Bodies, Asteroids, Comets, Meteors 2012. May 2012;1667: 6016.
European Space Agency, "ESA—Scanning and Observing", downloaded Aug. 11, 2023 in 6 pages.
European Space Agency, "ESA—Scanning and Observing—Continuation", Space Safety, downloaded Aug. 11, 2023 in 5 pages.
European Space Policy Institute [ESPI], Towards a European Approach to Space Traffic Management—Full Report, ESPI Vienna, Austria; Jan. 2020, pp. 1-81.
Exoanalytic Solutions, Demonstrates Value-added Service to Provide Direct Support to First Successful On-Orbit Servicing in Geosynchronous Orbit, Press Release Apr. 4, 2022; pp. 1-4.
Faccenda W.J., "GEOSDSS: Past and Future Improvements", The Mitre Corporation (2000), 7 pages.
Faccenda et al., "Deep Stare Technical Advancements and Status", The Mitre Corporation (2003), 7 pages.
Flewelling et al., Formation Flying as Formalism for Space Traffic Management, AIAA SciTech Forum, Jan. 6-10, 2020, Orlando, FL. pp. 1-17.
Flury et al., "Searching for Small Debris in the Geostationary Ring", ESA Bulletin. Nov. 2000; 104(November): 92-100.
Fors et al., "Telescope Fabra ROA Montsec: A new robotic wide-field Baker-Nunn facility", Pub Astonomical Society of the Pacific. May 1, 20134;125(927): 522 in 34 pages.
Green, Daniel W.E., Central Bureau for Astronomical Telegrams No. 2880; Oct. 3, 20111; downloaded from cbat.eps.harvard.edu/002800/CBET002880.txt; 1 page.
Hendrix D., "Multi-Spectral Countermeasure and Debris Identification and Mitigation Algorithm Suite", Phase 1 Final Report; (Aug. 2012), 2 pages.
Hendrix D., "Multi-Spectral Countermeasure and Debris Identification and Mitigation Algorithm Suite", Phase 2 Final Report; (Mar. 2015), 2 pages.
IEEE Transactions on Electron Devices, (Fay, P. Ed.), Listing of Conference Papers (Jan. 2003) Part 1; vol. 50, No. 1, 8 pages.
IEEE Transactions on Electron Devices, (Fay, P. Ed.), Listing of Conference Papers (Jan. 2003) Part 2; vol. 50, No. 1, 5 pages.
Johnson et al., Fundamental stellar photometry for standards of spectral type on the revised system of the Yerkes Spectral Atlas, Astrophysical J. May 1953; 117: 313-352.
Lal et al., Global trends in space situational awareness (SSA) and space traffic management (STM), IDA Science & Technology Policy Institute Document #D-9074, Apr. 2018; 153 pages.
Meade Catalog, company7.com, "Meade@ 16" LX200GPS Schmidt-Cassegrain Telescope" Specification and Features; Undated: pp. 44-49.
National Renewable Energy Laboratory [NREL], "Solar Spectra: Standard Air Mass Zero—2000 ASTM Standard Extraterrestrial Spectrum Reference E-490-00", (Nov. 2003); 2 pages.
QSI Imaging.com, "Model 660 Camera Specification Sheet—Overview", (2023); 8 pages.
Russian Academy of Sciences (Keldysh Instiute of Applied Mathematics), "ISON activitis on highly eliptical orbit (HEO), geosynchronous orbit (GEO) and near-earth objects (NEO) observation and analysis in 2013", 51st Session of STSC Copuos, Vienna, Austria Feb. 10-21, 2014, presentation in 23 pages.
Schildknecht et al., "Challenges Related to Discovery, Follow-up, and Study of Small High Area-to-Mass Ratio Objects at Geo", Proceedings AMOS, (2007); 6 pages.
Sibert et al., "Collaborative Commercial Space Situational Awareness with ESpOC-Empowered Telescopes", Proceedings AMOS. Sep. 2013: 9 pages.
SIMBAD Astronomical Database—CDS (Strasbourg, France) Product Information Sheet; downloaded Aug. 11, 2023; [Wenger et al., 2000]; 2 pages.
STARIZONA (Adventure in Astronomy & Nature), "HyperStar Specifications", Mar. 2017, 2 pages.
U.S. Air Force, "Ground-Based Electro-Optical Deep Space Surveillance", A Geodss Sourcebook, 2008-10-19 version; 117 pages.
U.S. Naval Observatory, Astrometry Department, Star Catalogs, Apr. 25, 2017, 1 page.
Vallado D.A., Fundamentals of Astrodynamics and Applications, 4th Edition, Space Technology Library, Microcosm Press, Hawthorne, CA; 2013; Cover and Table of Contents, pp. 1-21.
Wenger et al., "The SIMBAD astronomical database—The CDS reference database for astronomical objects", Astronomy and Astrophysics Supplement Series. Apr. 1, 2000;143(1): 9-22.
ZEMAX—An Ansys Company, "Products made with Zemax define our world", Product Website downloaded Aug. 11, 2023; 9 pages.

* cited by examiner

SYSTEMS AND TAGGING INTERFACES FOR IDENTIFICATION OF SPACE OBJECTS

INCORPORATION BY REFERENCE OF RELATED APPLICATIONS

This application is a continuation of U.S. patent application Ser. No. 16/283,164, filed Feb. 22, 2019, which is a continuation of U.S. patent application Ser. No. 16/280,967, filed Feb. 20, 2019. This application also claims the benefit under 35 U.S.C. § 119(e) of U.S. Provisional Patent Application Nos. 62/634,765, filed Feb. 23, 2018, and 62/800,964, filed Feb. 4, 2019. The entire contents of these applications are incorporated by reference and made a part of this specification.

BACKGROUND

Field

This disclosure relates generally to tracking space objects such as satellites and visual interfaces and computer configurations used in such tracking.

Description of Related Art

Visualization interfaces can be used to allow a user to view, manipulate, and adjust data representing tracked orbital objects (e.g., satellites). Tracking orbital objects involves taking in an amount of data and incorporating that data into a workable and usable interface.

Tracking orbital objects may be done using photographs of objects in space and tracking their positions using a plurality of photographs. Visualization systems have been developed in various fields that provide some functionality with regard to portraying various information. However, many features are lacking and many problems exist in the art for which this application provides solutions.

SUMMARY

Example embodiments described herein have innovative features, no single one of which is indispensable or solely responsible for their desirable attributes. Without limiting the scope of the claims, some of the advantageous features will now be summarized.

In some embodiments, a system for tagging elements in a display of orbital object tracking information may include a computer readable storage configured to communicate instructions for displaying a plurality of graphs. The system can also include a hardware processor in communication with the computer-readable storage. The instructions, when executed by the hardware processor, are configured to cause the system to receive a plurality of sets of identifiers. Each set of identifiers can correspond to an orbital object and may include a name identifier, a time identifier, a latitude identifier, a longitude identifier and a scalar identifier. The system is also configured to generate a display of a longitude-time graph. The longitude-time graph may include a longitude axis spanning from a lower-longitude limit to an upper-longitude limit, a time axis spanning from a lower-time limit to an upper-time limit, and a plurality of pixels corresponding to longitude-time points within the longitude-time graph. Each of the plurality of longitude-time points can correspond to a set of identifiers having a time identifier between the lower-time limit and the upper-time limit and having a longitude identifier between the lower-longitude limit and the upper-longitude limit.

The display may include a tagging interface. The tagging interface may include a stitching selector. In response to a user selection of (1) a destination element that includes a first name identifier, (2) a source element that includes at least one of the plurality of pixels such that at least one of the plurality of pixels corresponding to longitude-time points comprising a second name identifier, and (3) the stitching selector, the system can be configured to indicate that the source element comprises the first name identifier.

BRIEF DESCRIPTION OF THE DRAWINGS

The following drawings and the associated descriptions are provided to illustrate embodiments of the present disclosure and do not limit the scope of the claims.

FIG. 7 shows the same view as FIG. 6 after the first longitude axis and the synchronized second longitude axis have been zoomed in.

FIG. 8 shows the same view as FIG. 7 after the first time axis and the synchronized second time axis have been zoomed in.

FIG. 13 shows the same view as FIG. 12 after the first longitude axis and the synchronized second longitude axis have been zoomed in.

FIG. 14 shows the same view as FIG. 13 after the first time axis and the synchronized second time axis have been zoomed in.

Figure 1A:
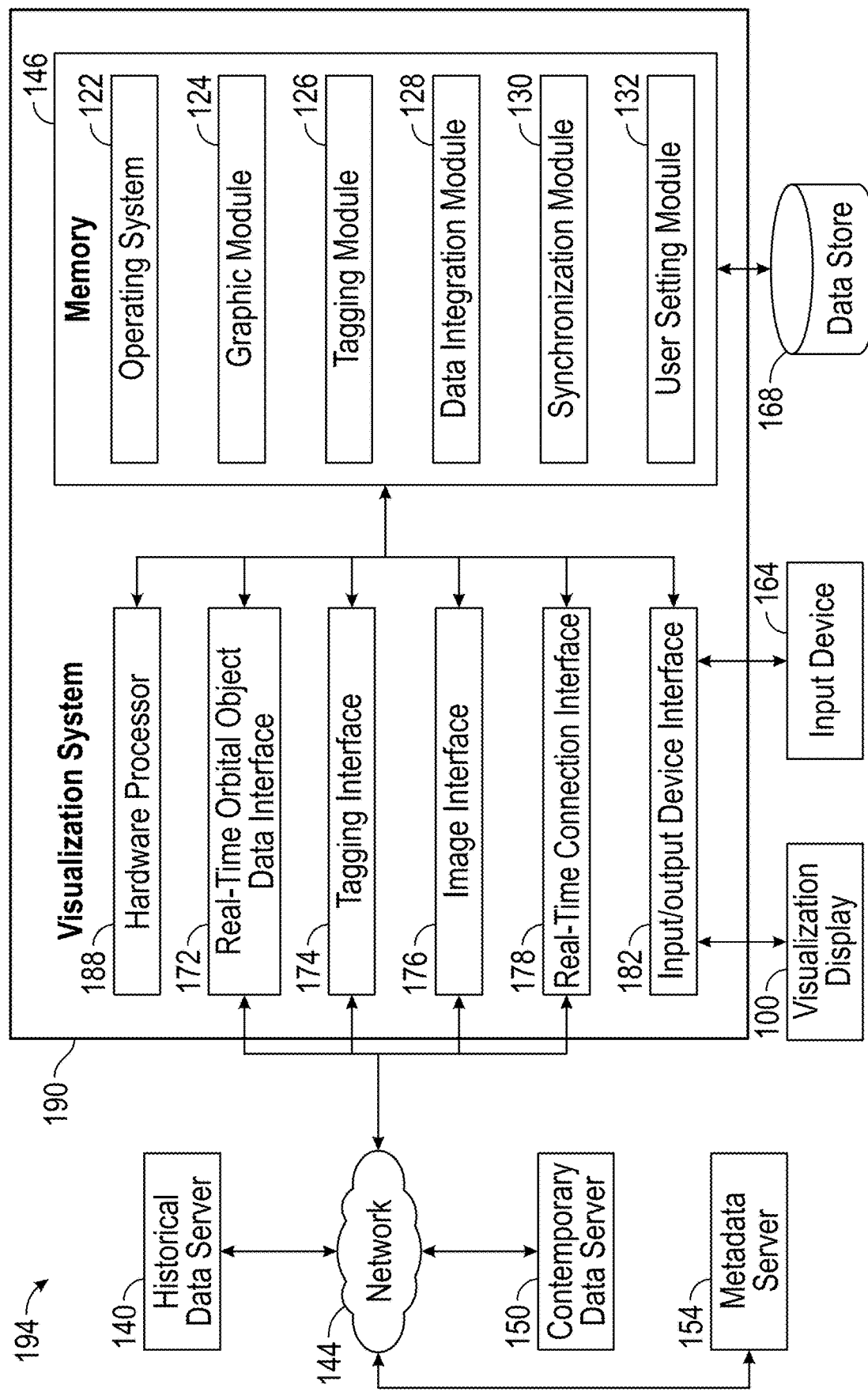
FIG. 1A schematically shows a network configuration that allows for the passing of data to a visualization system.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Described herein are methodologies and related systems for visualizing data from tracked satellites and other space objects. It will be understood that although the description herein is in the context of satellites, one or more features of the present disclosure can also be implemented in tracking objects other than satellites like, for example, aircraft, watercraft, projectiles, and other objects. Some embodiments of the methodologies and related systems disclosed herein can be used with various tracking systems, including, for example, those based on government databases.

Unless explicitly indicated otherwise, terms as used herein will be understood to imply their customary and ordinary meaning.

Disclosed herein are methods and systems relating generally to the tracking of objects in orbit (e.g., satellites), other space objects, and related systems and methods of providing an interactive user interface to interact with data related to the tracking of these objects. The information therein can be stored in one or more databases.

Tracking objects in orbit and other space objects can include receiving image data (e.g., photographs) of portions of the sky from one or more telescopes positioned at various positions across the globe. The photograph data can be used to map out the entirety or near entirety of the sky. Various altitudes above sea level may be tracked. The data can be tracked and processed in real-time. For example, a contemporary database may be configured to receive real-time image data. A historical database may be configured to store data received before a threshold time. The threshold time may be a specified amount of time (e.g., years, months, days, etc.). Alternatively, the threshold time may refer to a time based on a user action. For example, the historical database may be configured to store data received before a user causes the system to display the user interface. Using an algorithm, the received data may be consolidated and categorized. For example, the algorithm may be configured to determine whether objects that appear in a plurality of photographs correspond to the same object over time and space.

FIG. 1A is an example network configuration 194 for a visualization system 190. The architecture of the visualization system 190 can include an arrangement of computer hardware and software components used to implement aspects of the present disclosure. The visualization system 190 may include more or fewer elements than those shown in FIG. 1A. It is not necessary, however, that all of these elements be shown in order to provide an enabling disclosure. In some embodiments, the visualization system 190 is an example of what may be referred to under different names.

As illustrated, the visualization system 190 can include a hardware processor 188, a memory 146, a real-time orbital object data interface 172, a tagging interface 174, a image interface 176, a real-time connection interface 178, and/or an real-time connection interface 178, each of which can communicate with one another by way of a communication bus 142 or any other data communication technique. The hardware processor 188 can read and write to the memory 146 and can provide output information for the visualization display 100. The real-time orbital object data interface 172, tagging interface 174, image interface 176, and/or real-time connection interface 178 can be configured to accept input from an input device 164, such as a keyboard, mouse, digital pen, microphone, touch screen, gesture recognition system, voice recognition system, and/or another input device capable of receiving user input. In some embodiments, the visualization display 100 and the input device 164 can have the same form factor and share some resources, such as in a touch screen-enabled display.

In some embodiments, the real-time orbital object data interface 172, the tagging interface 174, the image interface 176, and/or the real-time connection interface 178 can be connected to a historical data server 140, a contemporary data server 150, and/or a metadata server 154 via one or more networks 144 (such as the Internet, 3G/Wi-Fi/LTE/5G networks, satellite networks, etc.). The real-time orbital object data interface 172 can receive graphical data information related to orbital objects via the network 144 (the network 144 can provide one-way communication or two-way communication). In some embodiments, the real-time orbital object data interface 172 may receive, where applicable, object data information or information that can be used for location determination (such as a cellular and/or Wi-Fi signal that can be used to triangulate a location) and determine the position of one or more objects.

The tagging interface 174 can receive tagging data from a user via the input/output device interface 182. The metadata server 154 can provide an application programming interface (API) that the tagging interface 174 can access via the network 144 (such as, for example, a 3G, Wi-Fi, LTE, or similar cellular network). The metadata server 154 may comprise data from one or more third-party providers. For example, the metadata server 154 may comprise government information (e.g., received from a United States Air Force satellite database). The image interface 176 may receive track information (such as, for example, an ordered list of known location coordinates) from a historical data server 140, contemporary data server 150, and/or metadata server 154 via the network 144. The track information can also include track-related information, such as photos, videos, or other data related to orbiting objects. In some embodiments, instead of receiving the track information over a network 144 from a historical data server 140, the system can receive such track information from a user via a computer-readable storage device, such as, for example, a USB thumb drive. The image interface 176 can also receive images (e.g., photographs, video) from a contemporary data server 150. In some embodiments, the map data can provide longitude, latitude, altitude information, and any other information related to orbiting objects.

The memory 146 can contain computer program instructions (grouped as modules or components in some embodiments) that the hardware processor 188 can execute in order to implement one or more embodiments described herein. The memory 146 can generally include RAM, ROM and/or other persistent, auxiliary or non-transitory computer-readable media. The memory 146 can store an operating system 122 that provides computer program instructions for use by the hardware processor 188 in the general administration and operation of the visualization system 190.

The memory 146 can include computer program instructions and other information for implementing aspects of the present disclosure including a graphic module 124, a tagging module 126, a data integration module 128, a synchronization module 130, a user settings module 132, other modules, and/or any combination of modules.

In some embodiment, the memory 146 may include the graphic module 124 that generates a track from the received ordered list of known locations using algorithms, such as interpolation or extrapolation algorithms. Additionally, the graphic module 124 may, in response to a user determination, alter the format (e.g., axes, labels, values) of the graphical display. Examples of functionality implemented by the graphic module 124 are more fully described, for example, with reference to FIGS. 1A-5.

In some embodiments, the memory 146 includes a tagging module 126 that the hardware processor 188 executes in order update, in response to a user action, aspects (e.g., metadata, values) of the underlying data. Accordingly, the tagging module 126 can provide data (e.g., updates) to the synchronization module 130. Examples of functionality implemented by the tagging module 126 are more fully described, for example, with reference to FIGS. 10A-10D. The data integration module 128 can correlate various data automatically or in response to a user input. For example, the data integration module 128 can combine data from the one or more servers (e.g., the historical data server 140, the contemporary data server 150, and the metadata server 154) that may be used for displaying on the visualization display 100. Examples of functionality implemented by the data integration module 128 are more fully described, for example, with reference to FIGS. 2-9.

In some embodiments, the memory 146 includes a synchronization module 130 that can be configured to correlate various aspects of data from the one or more servers. For example, the synchronization module 130 can be configured to synchronize the display of a data set on multiple graphs or to synchronize elements (e.g., axes, labels, dimensions, alignments, etc.) of one or more graphs of the visualization display 100. The synchronization module 130 can update data based on inputs from the tagging module 126 (such as stitched objects or elements), guidance parameters from the user settings module 132, and/or inputs from the data integration module 128. Examples of functionality implemented by the synchronization module 130 are more fully described, for example, with reference to FIGS. 2-9.

In some embodiments, the memory 146 includes a user settings module 132. The user settings module 132 can provide access to various user settings related to user preferences, including graph parameters, graph configurations (e.g., layout, orientation, formatting, etc.) and modes (e.g., display mode, tag mode, etc.). For example, the threshold values used for determination of the direction guidance mode may be accessed through the user settings module 132. In some instances, the user settings module 132 may provide connectivity to a data store 168 and access user settings from or store user settings to the data store 168. Examples of functionality implemented by the user settings module 132 are more fully described, for example, with reference to FIGS. 2-10D. In some embodiments, other interfaces and modules, such as the real-time orbital object data interface 172, the tagging interface 174, the image interface 176, real-time connection interface 178, and/or input/output device interface 182 may have access to the data store 168.

The historical data server 140 may communicate via the network 144 with a historical data interface. The historical data interface may include one or more of the real-time orbital object data interface 172, the tagging interface 174, the image interface 176, and the real-time connection interface 178. The historical data interface may be configured to receive historical data of objects in orbit around a planet from a historical data set. The historical data may comprise a time, a latitude, a longitude, a scalar, and/or an object identifier (e.g., name) for each object. The historical data can comprise data collected over a period of time greater than a threshold time (e.g., a year).

The amount of historical data can be unusually immense. For example, the amount of historical data may include billions of data identifiers derived from petabytes or even exabytes of photographic data. The historical data obtained may be increasing over time. Such an immense amount of data can cause serious challenges related to, for example, maintaining, sorting, extracting, transmitting, and/or displaying that data, particularly in a timely and organized fashion. This data may be supplemented from other databases (e.g., the metadata server 154), such as third-party databases. Such third-party databases may include government organizations, such as military groups (e.g., the United States Air Force), but may include private (e.g., commercial) sources additionally or alternatively.

The contemporary data server 150 may communicate via the network 144 with a real-time (e.g., contemporary) data interface configured to receive contemporary data of objects in orbit around a planet from a contemporary data set. The contemporary data may comprise a time, a latitude, a longitude, an object identifier, and/or a scalar for each object. The contemporary data may comprise data collected after the historical data available from the historical data set. The contemporary data may include data received within a few minutes or even seconds of a current time. The contemporary data may be data stored after a user has initiated a particular action, such as causing the system to generate a visualization display 100. In such a case, the system can be configured to update the visualization display 100 with pixels associated with the data collected after the generation of the visualization display 100.

Figure 1B:
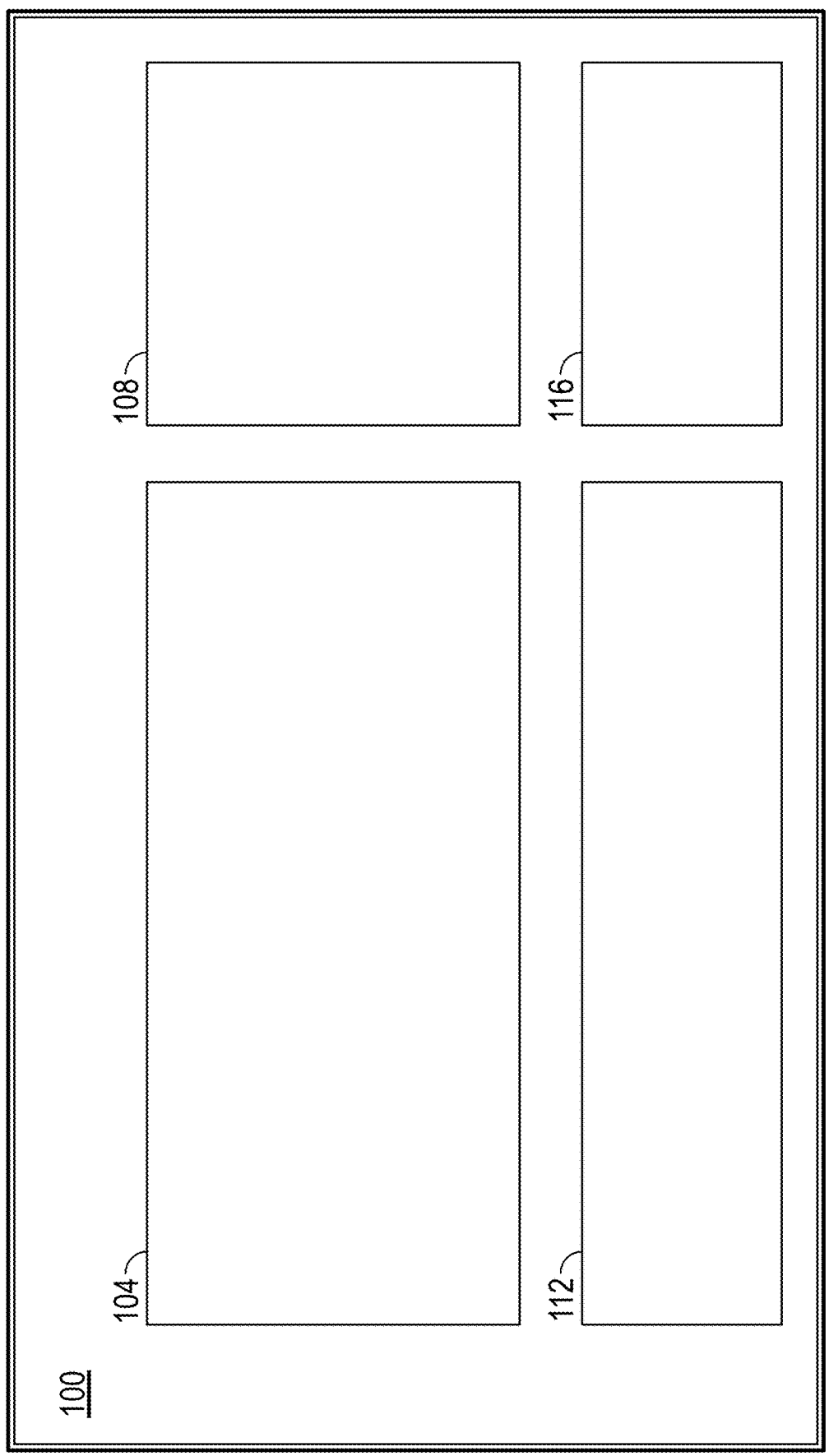
FIG. 1B shows a schematic of an example visualization display.

FIG. 1B shows a schematic of an example visualization display 100. Such a visualization display 100 may operate within the network configuration 194 of FIG. 1A, for example. The visualization display 100 may be displayed on any type of digital display device, such as a desktop computer, a laptop computer, a projection-style device, a smartphone, a tablet, a wearable device, or any other display device. The visualization display 100 may include a first plot 104, a second plot 108, a third plot 112, and/or a display area 116.

The first plot 104 and second plot 108 may be displayed with similar (e.g., within a few pixels) vertical dimensions and/or similar vertical alignment. For example, the first plot 104 may be disposed directly left of the second plot 108. The third plot 112 may have similar vertical dimensions and/or similar vertical alignment as the display area 116. The first plot 104 may have similar horizontal dimensions and/or similar horizontal alignment as the third plot 112. In some embodiments, the second plot 108 may have similar horizontal dimensions and/or similar horizontal alignment as the display area 116. In some designs, the second plot 108 may include a tagging interface (e.g., a stitching and/or splicing interface).

Figure 2:
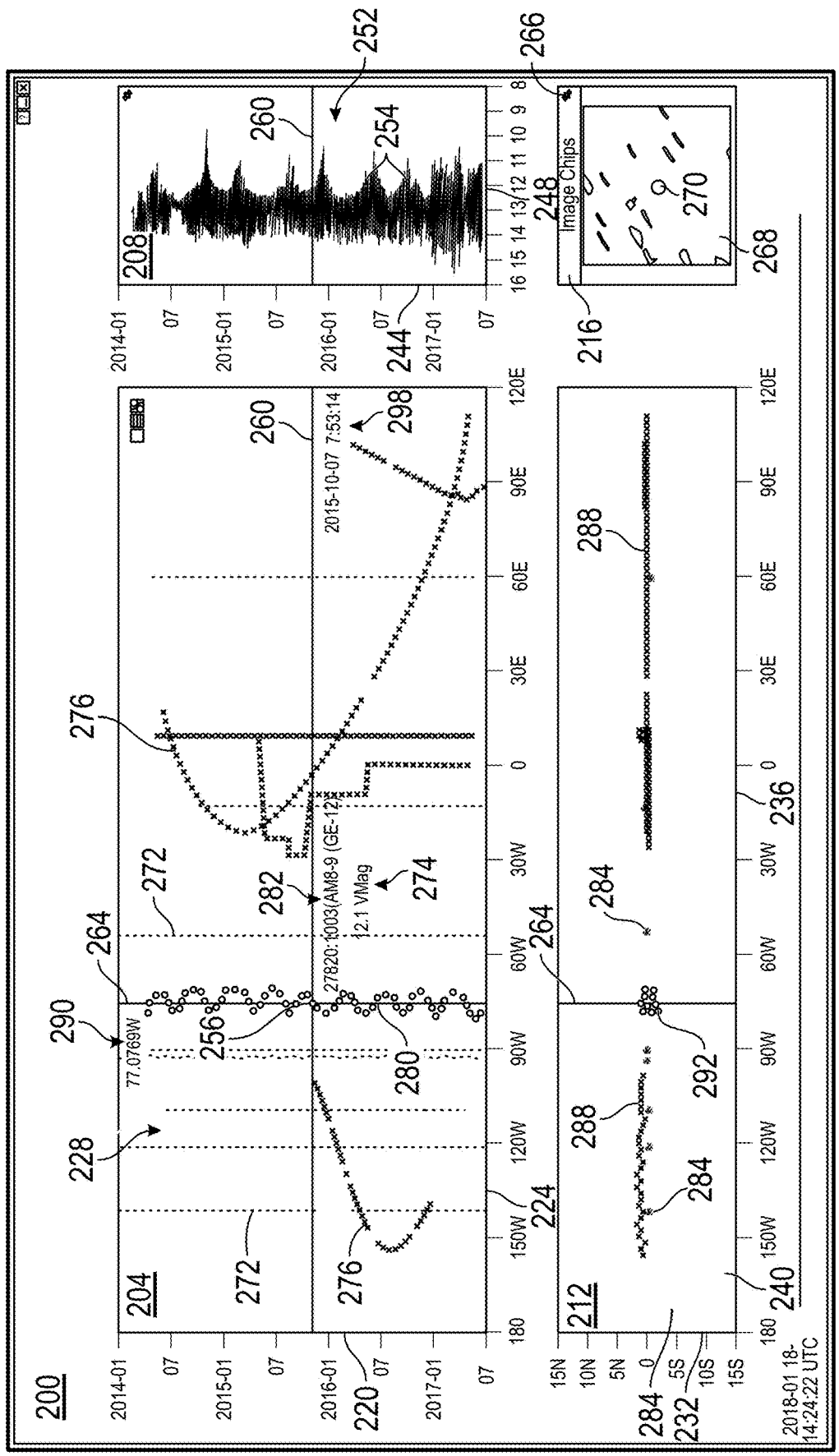
FIG. 2 shows an example visualization display with a longitude-time graph, scalar-time graph, a longitude-latitude graph, and a display area.
Figure 3:
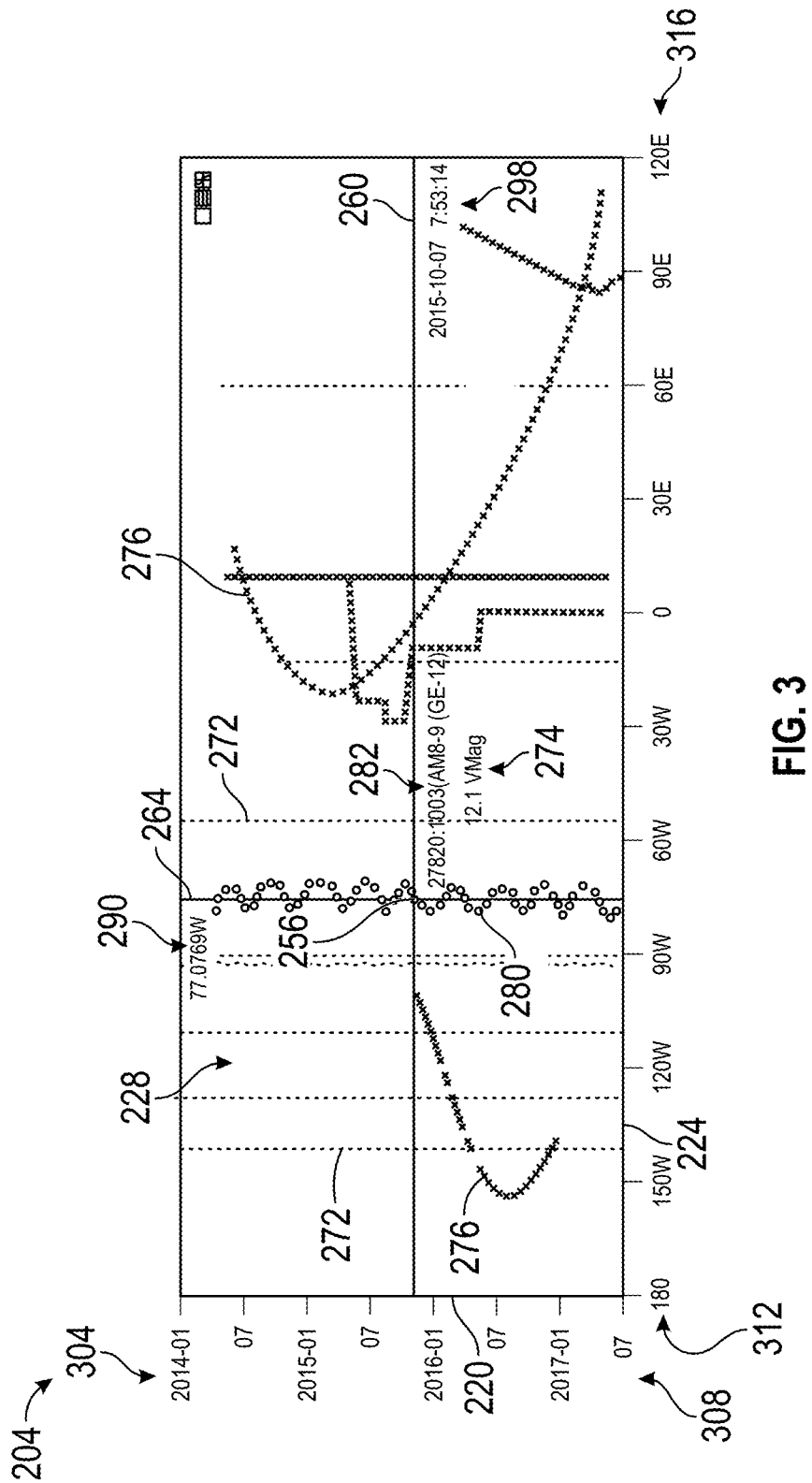
FIG. 3 shows a detail view of an example longitude-time graph that may be a part of the visualization display described in FIG. 2.
Figure 4:
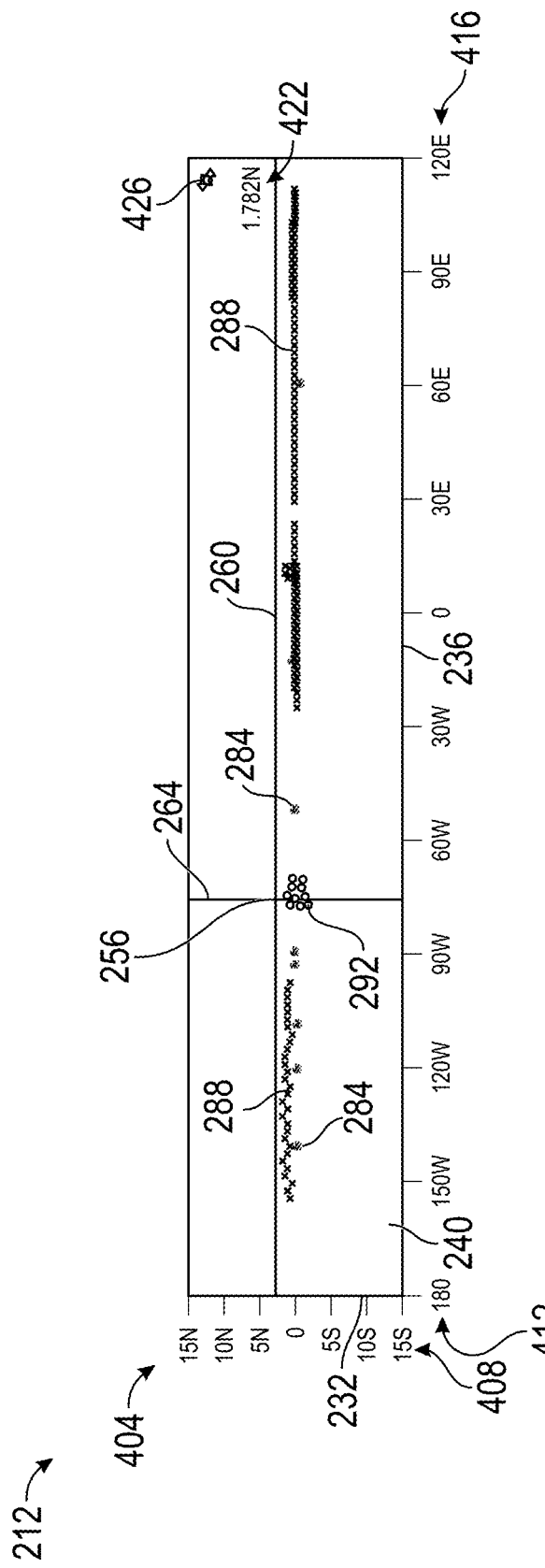
FIG. 4 shows a detail view of an example longitude-latitude graph that may be a part of the visualization display described in FIG. 2.
Figure 5:
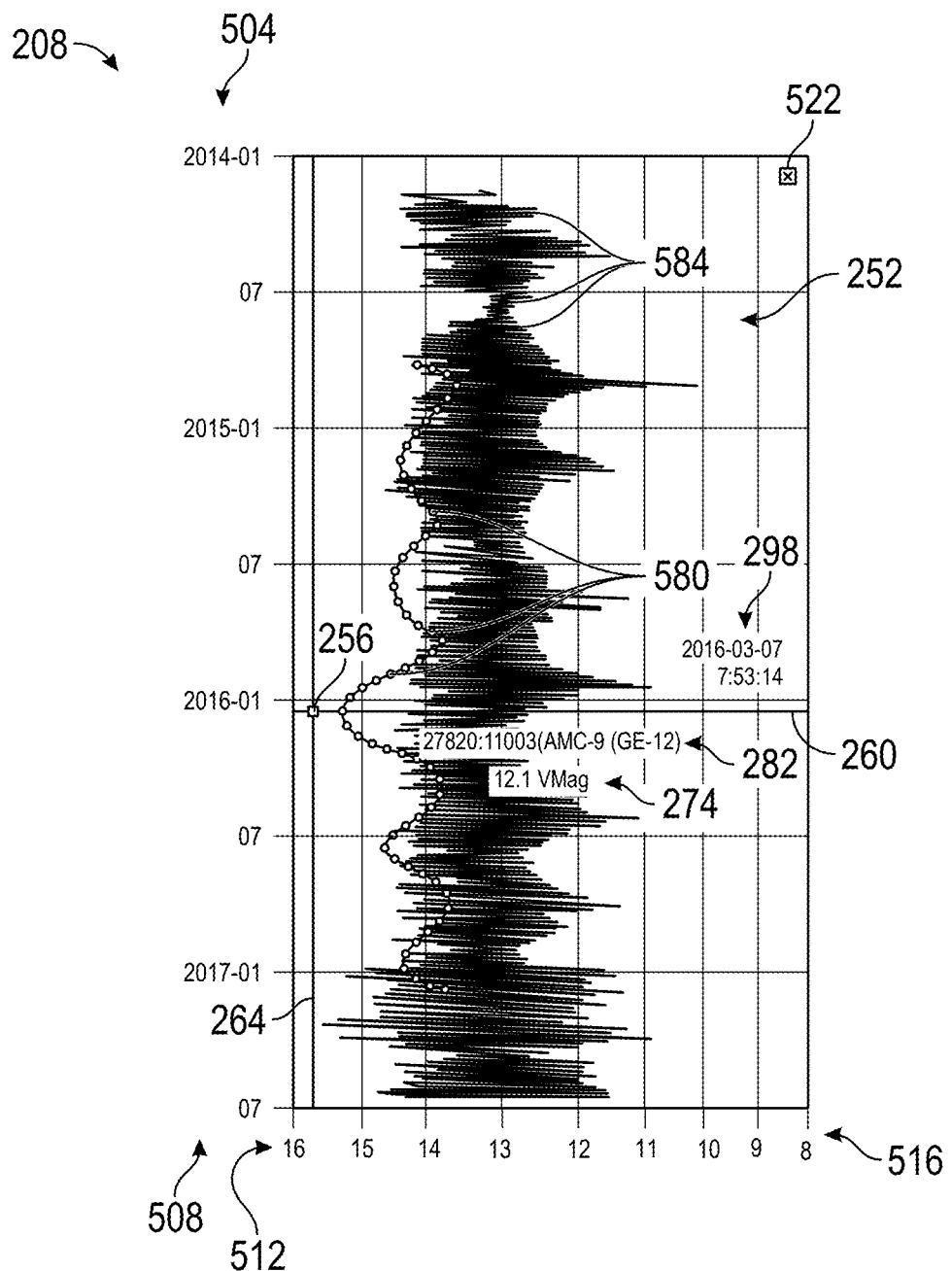
FIG. 5 shows a detail view of an example scalar-time graph that may be a part of the visualization display described in FIG. 2.

FIG. 2 shows an example visualization display 200 with a longitude-time graph 204, scalar-time graph 208, a longitude-latitude graph 212, and a display area 216. The visualization display 200 may correspond in some or all respects with the visualization display 100 of FIG. 1B. FIGS. 3-5 may provide further details related to one or more portions of FIG. 2.

The visualization display 200 can include a longitude-time graph area 228. In some embodiments, the longitude-time graph area 228 is bounded by a first longitude axis 224 and a first time axis 220. Each of the first longitude axis 224 and/or first time axis 220 can include one or more axis labels. In some designs, the axis labels of the first longitude axis 224 are not shown in relation to the longitude-time graph 204 but in relation only to, for example, the longitude-latitude graph 212 (see, e.g., FIGS. 10A-10D). The axis labels of the first longitude axis 224 and/or first time axis 220 may be equidistant from one another to portray equal intervals of the respective longitude or time. The first longitude axis 224 may span any portion of longitudes found on a planet (e.g., Earth). For Earth, the range may be from 180 W (e.g., 180° West or −180°) to 180 E (e.g., 180° East or +180°) or any range therein. For example, as shown in FIG. 2, the first longitude axis 224 spans from 180 W to 120 E. However, other ranges are possible, examples of which are described below. The first longitude axis 224 may run eastern-most to western-most from left to right (e.g., as shown in FIG. 2), but other configurations are possible.

The first time axis 220 may span any time from a historical time to nearly a current time of a user. For example, as shown by FIG. 2, the first time axis 220 may span from 2014-07 (e.g., July 2014) to 2017-07 (e.g., July 2017). The displayed time may correspond to a universal time, such as the coordinated universal time (UTC). Stored time values may similarly be in UTC. The latest time may be labeled "current time," "now," or a similar label and/or may indicate to a user that data from the most current time available are displayed. The most current time available may include time within a few seconds (e.g., 1-60 seconds) or a few minutes (e.g., 1-30 minutes) of a present time at which a viewer is observing the data. The first time axis 220 may span from a historical time from an earliest time when a database (e.g., a historical data server 140, a miscellaneous data server 154) has available data. The earliest time when the database has data may be as far back as the year 2010. In some embodiments, the historical data server 140, the contemporary data server 150, and/or the metadata server 154, may be configured to store some or all of the corresponding data in short-term memory storage (e.g., Random Access Memory (RAM)). The first time axis 220 may include axis labels that run earliest to most recent from top to bottom (e.g., as shown in FIG. 2), but other variations are possible. Axis labels may be spaced equidistant from each other to indicate equal time intervals therebetween. An axis label may show a corresponding time to include a year, a month, a day, an hour, a minute, and/or a second, depending on the level of specificity that is available, the span of the first time axis 220, and/or the level of detail that is needed for a particular display. As shown in FIG. 2, each axis label may not include superfluous detail (e.g., not show a year at each interval) in order to reduce clutter and to increase clarity for a viewer.

Each axis label of the first longitude axis 224 and/or first time axis 220 may include gridlines. For example, the longitude-time graph 204 may include one or more horizontal gridlines 296 and/or vertical gridlines 294 (not shown in FIG. 2). The vertical gridlines 294 and horizontal gridlines 296 may aid a viewer in identifying a particular point within one or more of the graphs. To further aid a user in visualizing the orbital object information, in some embodiments, the longitude-time graph 204 may display a longitude-time map (not shown in FIG. 2). The longitude-time map may be a geographical map of a portion of the planet. For example, the longitude-time map may identify the contours and/or limits of various landmasses (e.g., continents, islands). This information may help a user quickly ascertain over which landmass or body of water, for example, an orbital object may be located. For example, it may be useful to a viewer to see that a satellite orbits above a portion of Africa (or other planetary location). Points displayed on the corresponding graph (e.g., the longitude-time graph 204) may be superimposed over the geographic map (e.g., the longitude-time map).

The longitude-latitude graph 212 may include a longitude-latitude graph area 240 that is bounded by a second longitude axis 236 and a latitude axis 232. Each of the second longitude axis 236 and/or the latitude axis 232 can include one or more axis labels. The second longitude axis 236 and the first longitude axis 224 may be identical. For example, first longitude axis 224 may respond to a user input in the same way as the second longitude axis 236. In some embodiments, the axis labels of the second longitude axis 236 represent the values of the axis labels for the longitude-time graph 204. The axis labels of the second longitude axis 236 and/or the latitude axis 232 may be equidistant from one another to portray equal intervals of the respective longitude or latitude. Like the first longitude axis 224, the second longitude axis 236 may span any portion of longitudes found on the planet. For example, as shown in FIG. 2, the second longitude axis 236 spans from 180 W to 120 E. However, other ranges are possible. Like the first longitude axis 224, the second longitude axis 236 may run eastern-most to western-most from left to right (e.g., as shown in FIG. 2), but other configurations are possible.

The latitude axis 232 may span any latitude found on the planet. For example, the latitude axis 232 may span from 90 S (e.g., 90° South) to 90 N (e.g., 90° North) or any range therein. For example, as shown in FIG. 2, the latitude axis 232 may range from 15 S (e.g., 15° South) to 15 N (e.g., 15° North). The latitude axis 232 may include axis labels that run western-most to eastern-most from left to right (e.g., as shown in FIG. 2), but other variations are possible. Axis labels may be spaced equidistant from each other to indicate equal latitude intervals therebetween.

Each axis label of the first longitude axis 224 and/or latitude axis 232 may include gridlines. For example, the longitude-latitude graph 212 may include one or more horizontal gridlines 296 and/or vertical gridlines 294. In some designs, the vertical gridlines 294 may correspond to gridlines found in the longitude-time graph 204. If the first longitude axis 224 and the second longitude axis 236 span the same values, then the same vertical gridlines 294 may appear to run through both the longitude-time graph 204 and the longitude-latitude graph 212. In some embodiments, the longitude-latitude graph 212 may display a longitude-latitude map. In some designs, the longitude-latitude map may include a portion of the same features in the longitude-time map. The longitude-latitude map may be a geographical map of a portion of the planet. For example, the longitude-latitude map may identify the contours and/or limits of various landmasses (e.g., continents, islands). This information may help a user quickly ascertain over which landmass or body of water, for example, an orbital object may be located. For example, it may be useful to a viewer to see that a satellite orbits above a portion of Africa (or other planetary location). Points displayed on the corresponding graph (e.g., the longitude-latitude graph 212) may be superimposed over the geographic map (e.g., the longitude-latitude map).

The scalar-time graph 208 may include a scalar-time graph area 252 that is bounded by a scalar axis 248 and a second time axis 244. Each of the scalar axis 248 and/or the second time axis 244 can include one or more axis labels. The second time axis 244 and the first time axis 220 may be identical. For example, first time axis 220 may respond to a user input in the same way as the second time axis 244. In some embodiments, the axis labels of the first time axis 220 represent the values of the axis labels for the scalar-time graph 208. The axis labels of the scalar axis 248 and/or the second time axis 244 may be equidistant from one another to portray equal intervals of the respective longitude or latitude. Like the first time axis 220, the second time axis 244 may span any time from a historical time to nearly a current time of a user. Additional details on the historical and (nearly) current times are discussed above in regard to the longitude-time graph 204.

Like the first time axis 220, the second time axis 244 may include axis labels that run earliest to most recent from top to bottom (e.g., as shown in FIG. 2), but other variations are possible. Axis labels may be spaced equidistant from each other to indicate equal time intervals therebetween. An axis label may show a corresponding time to include a year, a month, a day, an hour, a minute, and/or a second, depending on the level of specificity that is available, the span of the first time axis 220, and/or the level of detail that is needed for a particular display. As shown in FIG. 2, each axis label may not include superfluous detail (e.g., not show a year at each interval) in order to reduce clutter and to increase clarity for a viewer.

The scalar axis 248 may span any value of scalars associated with scalars within a database. Each scalar displayed may correspond to a magnitude or other value. For example, the magnitude may represent an intensity (e.g., of light from the orbital object). However, other scalar values are also possible, such as a size, a projected area, a temperature, a mass, a radar cross section, an altitude, an inclination, a delta-V, a time until a certain event, a probability of a certain event, etc. Many variants are possible. The scalar axis 248 may include axis labels that run greatest to smallest from left to right (e.g., as shown in FIG. 2), but other variations are possible. Axis labels may be spaced equidistant from each other to indicate equal scalar intervals therebetween.

Each axis label of the scalar axis 248 and/or the second time axis 244 may include gridlines. For example, the scalar-time graph 208 may include one or more horizontal gridlines 296 and/or vertical gridlines 294. In some designs, the horizontal gridlines 296 may correspond to gridlines found in the longitude-time graph 204. If the first time axis 220 and the second time axis 244 span the same values, then the same horizontal gridlines 296 may appear to run through both the longitude-time graph 204 and the scalar-time graph 208.

The visualization display 200 may further include a display area 216. The display area 216 may be configured to display an image chip 268. This may offer a viewer an opportunity to see an underlying photograph from which image data were extracted that correspond to a set of data or identifiers that are associated with one or more points displayed by the visualization display 200. The image chip 268 may correspond to a photograph of one or more orbital objects. For example, the image chip 268 may be a representation of the photograph. In some cases, the image chip 268 may display an object image 270 that represents an orbital object. The image chip 268 may include multiple object images 270 (e.g., sequential images, summated images (see below), etc.). The display area 216 may also include an interface toggle 266, which is described in more detail below.

The visualization display 200 may further include a point marker 256. The point marker 256 may be used to identify a pixel associated with one or more points (e.g., longitude-time points) indicated by a user within the display currently. For example, the point marker 256 may comprise a highlighted pixel (or cluster of pixels around the highlighted pixel) to identify the current pixel/point. The one or more points displayed by the visualization display 200 may be received from one or more databases (e.g., the historical data server 140, the contemporary data server 150, the metadata server 154) via one or more data interfaces (e.g., the real-time orbital object data interface 172, the tagging interface 174, the image interface 176, the real-time connection interface 178). The data interfaces may be referred to as application program interfaces (e.g., APIs). The user may use an input device (e.g., a keyboard, a mouse, a digital pen, a microphone, a touch screen, etc.) to indicate the currently identified pixel. The point marker 256 may further be indicated by a horizontal tracking line 260 and/or vertical tracking line 264. As shown in FIG. 2, each of the horizontal tracking line 260 and vertical tracking line 264 may be visible in multiple graphs. For example, if the point marker 256 is displayed in the longitude-time graph 204, the horizontal tracking line 260 may be displayed in both the longitude-time graph 204 and the scalar-time graph 208. Similarly, the vertical tracking line 264 may be visible in both the longitude-time graph 204 and the longitude-latitude graph 212.

The point marker 256 may be associated with one or more point marker metadata stamps. The one or more point marker metadata stamps may display one or more data types not evident from a graph in which the point marker 256 is currently displayed. For example, in the longitude-time graph 204, a scalar stamp 274 and/or object identifier stamp 282 may be displayed. This may be because the longitude-time graph 204 is not configured to display scalar and/or object identifier information. Similarly, a time value, scalar value, and/or object identifier may be displayed for an identified pixel within the longitude-latitude graph 212. Moreover, a longitude value, latitude value, and/or object identifier may be displayed for an identified pixel within the scalar-time graph 208. As shown in FIG. 2, the scalar stamp 274 and/or object identifier stamp 282 may be displayed near (e.g., within a few pixels of) the point marker 256. The scalar stamp 274 can display a scalar value corresponding to a point associated with the identified (e.g., highlighted) pixel. As shown, the scalar value could be, for example, "12.1 VMag." Similarly, the object identifier stamp 282 may display an object identifier (e.g., object name) corresponding to the point associated with the identified pixel. As shown, the object identifier could be, for example, 27820:11003 (AMC-9 (GE-12)). In some embodiments, as noted above, a latitude stamp (not shown) can be displayed. The latitude stamp may be displayed near the point marker 256 and may display a latitude value corresponding to the point associated with the identified pixel.

One or more of the horizontal tracking line 260 and/or the vertical tracking line 264 may have corresponding tracking line metadata stamps. The one or more tracking line metadata stamps may correspond to data types displayed by the corresponding graph in which the identified pixel is displayed. For example, as shown in FIG. 2, an identified pixel within the longitude-time graph 204 may include a horizontal tracking line 260 and/or the vertical tracking line 264 that correspond, respectively, to a tracking line time stamp 298 and/or a tracking line longitude stamp 290. Similarly, an identified pixel within the longitude-latitude graph 212 may include a horizontal tracking line 260 and/or vertical tracking line stamp 290 that correspond, respectively, to a tracking line latitude stamp and/or a tracking line longitude stamp 290. Moreover, an identified pixel within the scalar-time graph 208 may correspond to a horizontal tracking line 260 and/or vertical tracking line stamp 290 that correspond, respectively, to a tracking line time stamp and/or a tracking line scalar stamp. In this way, a user can quickly identify one or more values associated with the pixel identified by the point marker 256. The horizontal tracking line stamp (e.g., tracking line time stamp 298) and/or the vertical tracking line stamp (e.g., tracking line longitude stamp 290) may be displayed near the corresponding tracking line.

As shown in FIG. 2, the longitude-time graph 204 may include one or more unhighlighted collections 272 of longitude-time points, highlighted collections 276 of longitude-time points, and/or selected collections 280 of longitude-time points. Similarly, the longitude-latitude graph 212 may include one or more unhighlighted collections 284 of longitude-latitude points, highlighted collections 288 of longitude-latitude points, and/or selected collections 292 of longitude-latitude points. Moreover, the scalar-time graph 208 may include various scalar-time points 254 within the scalar-time graph area 252. The scalar-time points 254 may include points that are highlighted, unhighlighted, and/or selected.

Object Tracking

The visualization display 200 described herein can be used to track orbital objects and present that data to a user/viewer in a meaningful way. The systems displayed herein provide a novel way of presenting high-dimensional (e.g., four-dimensional, five-dimensional, or higher dimensional) data in a way that is understandable by a human viewer.

For additional detail related to FIG. 2, reference will now include reference to FIGS. 3-5. FIG. 3 shows a detail view of an example longitude-time graph 204 that may be a part of the visualization display 200 described in FIG. 2. The first longitude axis 224 may span from a lower-longitude limit 312 to an upper-longitude limit 316. Similarly, the first time axis 220 may span from a lower-time limit 304 to an upper-time limit 308. Within the longitude-time graph area 228, the visualization display 200 may include one or more sets of longitude-time points. The one or more sets of longitude-time points may correspond to one or more pixels. Each set of longitude-time points may correspond to data on one or more orbital objects around the planet. For example, each of the one or more longitude-time points may correspond to a data set comprising historical data and/or contemporary data. Each set of longitude-time points may correspond to a set of identifiers. The set of identifiers may include a longitude value, a latitude value, a time value, a scalar value, and/or an object (e.g., name) identifier. Each set of identifiers may be obtained from one or more photographs. The photographs may contain image data from which one or more identifiers of the set of identifiers can be obtained (e.g., through algorithm).

The longitude-time points displayed within the longitude-time graph area 228 may be points that have a time value between the lower-time limit 304 and the upper-time limit 308. Additionally or alternatively, the displayed longitude-time points may have a longitude value between the lower-longitude limit 312 and the upper-longitude limit 316.

As shown in FIG. 3, the point marker 256 may comprise one or more highlighted pixels that can help a user determine which pixel is identified by a user input device. If the pixel is associated with object data, the scalar stamp 274 and/or object identifier stamp 282 may be displayed within the longitude-time graph area 228. One or both of the scalar stamp 274 and the object identifier stamp 282 may be displayed in an area easily associated with the point marker 256. If the identified pixel does not contain corresponding object data, then the respective scalar stamp 274 and/or object identifier stamp 282 may not be displayed. As shown the pixel currently identified by the point marker 256 is a pixel that includes a selected collection 280 of longitude-time points.

In order to further aid a user, an interface toggle 320 may be included in the longitude-time graph 204. The interface toggle 320 may be manipulated by a user from an input device (e.g., function keys on a keyboard, a mouse, etc.). The interface toggle 320 may communicate with the user settings module 132 (see FIG. 1A) to determine, for example, display settings for the longitude-time graph 204. A user may be able to adjust the display settings using the interface toggle 320. For example, the user may be able to click a box to switch a view type. The user may be able to filter what types of points (e.g., unhighlighted, highlighted, selected) are displayed. The interface toggle 320 may allow a user to toggle the display of the longitude-time map on and off. For example, as shown in FIG. 3, the longitude-time map is toggled off while in FIG. 2 it is toggled on.

FIG. 4 shows a detail view of an example longitude-latitude graph 212 that may be a part of the visualization display 200 described in FIG. 2. The second longitude axis 236 may span from a lower-longitude limit 412 to an upper-longitude limit 416. Similarly, the latitude axis 232 may span from a lower-latitude limit 408 to an upper-latitude limit 404. The longitude-latitude points displayed within the longitude-latitude graph area 240 may be points that have a latitude value between the lower-latitude limit 408 and the upper-latitude limit 404. Additionally or alternatively, the displayed longitude-latitude points may have a longitude value between the lower-longitude limit 412 and the upper-longitude limit 416.

The longitude-latitude graph area 240 may include various displayed longitude-latitude points. For example, the longitude-latitude graph 212 may display one or more unhighlighted collections 284 of longitude-latitude points, highlighted collections of longitude-latitude points (not shown), and/or selected collections 292 of longitude-latitude points. In some cases, the one or more selected collections 292 of longitude-latitude points may include highlighted longitude-latitude points. FIG. 4 shows the point marker 256 over a point in a selected collection 292 of longitude-latitude points.

As shown in FIG. 4, the point marker 256 may be displayed within the longitude-latitude graph 212. For example, a user may use an input device to indicate where and/or in which graph the point marker 256 is located. As noted above, if the point marker 256 is displayed within the longitude-latitude graph 212, a tracking line latitude stamp 422 may be displayed. The tracking line latitude stamp 422 displays a latitude value associated with a longitude-latitude point corresponding to the pixel identified by the point marker 256. Additionally or alternatively, a tracking line longitude stamp 290 may be displayed. One or more point marker metadata stamps (e.g., the scalar stamp 274, the object identifier stamp 282, a latitude stamp, a longitude stamp, a time stamp) may be displayed, as described above.

An interface toggle 426 may be included to aid a user in interacting with the longitude-latitude graph 212. For example, the interface toggle 426 may allow a user to toggle a view of the longitude-latitude map on or off. The interface toggle 426 may be manipulated by a user from an input device (e.g., function keys on a keyboard, a mouse, etc.). As shown in FIG. 4, the longitude-latitude map is toggled on. Other functionality is also possible.

FIG. 5 shows a detail view of an example scalar-time graph 208 that may be a part of the visualization display 200 described in FIG. 2. The scalar-time graph 208 may show one of a number of possible scalar values. For example, the scalar may refer to a magnitude, such as an intensity of reflected light. However, a number of other scalar values are possible, such as a size, a projected area, a temperature, a mass, a radar cross section, an altitude, an inclination, a delta-V, a time until a certain event, a probability of a certain event, etc.

The scalar axis 248 may span from a lower-scalar limit 512 to an upper-scalar limit 516. Similarly, the second time axis 244 may span from a lower-time limit 504 to an upper-time limit 508. The scalar-time points displayed within the scalar-time graph area 252 may be points that have a scalar value between the lower-scalar limit 512 and the upper-scalar limit 516. Additionally or alternatively, the displayed scalar-time points may have a time value between the lower-time limit 504 and the upper-time limit 508.

As shown in FIG. 5, the point marker 256 may be displayed within the scalar-time graph 208. As noted above, if the point marker 256 is displayed within the scalar-time graph 208, one or more metadata stamps may be displayed. For example, the tracking line time stamp 298 may indicate a time value of a scalar-time point corresponding to the pixel identified by the point marker 256. Similarly, a tracking line scalar stamp (not shown) may indicate a scalar value of a scalar-time point corresponding to the pixel identified by the point marker 256 Additionally or alternatively, one or more point marker metadata stamps (e.g., the scalar stamp 274, the object identifier stamp 282, a latitude stamp, a longitude stamp, a time stamp) may be displayed, as described above.

The scalar-time graph 208 may display one or more unhighlighted collections 584 of scalar-time points, highlighted collections 584 of scalar-time points (not shown), and/or selected collections 580 of scalar-time points. As shown, the point marker 256 identifies a pixel associated with a point in a selected collection 580 of scalar-time points. An interface toggle 522 may be included to aid a user in interacting with the scalar-time graph 208. For example, the interface toggle 522 may allow a user to toggle which type(s) (e.g., unhighlighted, highlighted, selected) points are displayed. Additionally or alternatively, the interface toggle 522 may allow a user to toggle between a stitching panel and a graph and/or to toggle which type of scalar is displayed by the scalar-time graph 208. Other functionality is also possible.

With reference generally to FIGS. 2-5, the system may allow a user to interact with the visualization display 200 in a variety of beneficial ways. For example, a user may be able to pan and zoom within one or more graphs in the visualization display 200. Panning may be up, down, left, right, or any other direction along an axis. Zooming may include zooming in and/or out. The user may give a panning input and/or a zooming input via an input device. The panning input and/or zooming input may comprise a scrolling of a mouse wheel, a click of a mouse, a pinch motion, a flick motion, a swipe motion, a tap, and/or any other input identifying a pan or zoom action. The visualization display 200 may be configured to allow simultaneous manipulation of multiple graphs. For example, in response to a user input to pan or zoom the first time axis 220 or the second time axis 244, the system may set the lower-time limit 304 equal to the lower-time limit 504 and/or set the upper-time limit 308 equal to the upper-time limit 508. Similarly, in response to a user input to pan or zoom the first longitude axis 224 or the second longitude axis 236, the system may set the lower-longitude limit 312 equal to the lower-longitude limit 412 and set the upper-longitude limit 316 equal to the upper-longitude limit 416.

A user may be able to set the upper and/or lower limits of a given axis. Additionally or alternatively, the user may be able to set axis spacing, axis intervals, axis labels, axis formatting, axis length, and or other aspects associated with one or more axes. Once set, the system may be configured to automatically update that axis. In some embodiments, the system may be configured to automatically update a corresponding axis. For example, automatically updating a corresponding axis may include setting a common alignment for both of the two axes, setting a common length for both of them, and/or disposing them parallel to one another. The first longitude axis 224 and second longitude axis 236 may be corresponding axes. Similarly, the first time axis 220 and second time axis 244 may be corresponding axes.

Zooming may be defined as changing a total span (e.g., a difference between an upper-axis limit and a lower-axis limit) of one or more axes in the visualization display 200. A single axis may be zoomed in or out by the user. A single graph (e.g., two perpendicular axes) may be zoomed in or out. However, the system may be configured to allow a user to zoom in and/or out on multiple axes and/or graphs simultaneously. For example, zooming in on the longitude-time graph 204 may adjust not only the first time axis 220 and first longitude axis 224, but it may adjust the second time axis 244 as well.

Zooming and/or panning in one axis or one graph may affect which points are displayed in other graphs within the visualization display 200. For example, in an adjustment of the lower-time limit 304 or the upper-time limit 308, the system may be configured to update the longitude-latitude graph 212 to display pixels corresponding only to longitude-latitude points corresponding to a set of identifiers having a time identifier between the lower-time limit 304 and the upper-time limit 308.

Panning and/or zooming may be done within a graph or along an axis. For example, in response to a user input to pan or zoom along a length of first time axis 220, the system may be configured to simultaneously modify one or more of the lower-time limit 304 and/or the upper-time limit 308. In response to a user input to pan or zoom along a length of second time axis 244, the system may be configured to simultaneously modify one or more of the lower-time limit 504 and/or the upper-time limit 508. Additionally or alternatively, in response to a user input to pan or zoom along a length of the first longitude axis 224, the system may be configured to simultaneously modify one or more of the lower-longitude limit 312 and/or the upper-longitude limit 316. In response to a user input to pan or zoom along a length of the second longitude axis 236, the system may be configured to simultaneously modify one or more of the lower-longitude limit 412 and/or the upper-longitude limit 416. Additionally or alternatively, in response to a user input to pan or zoom along a length of the latitude axis 232, the system may be configured to simultaneously modify one or more of the upper-latitude limit 404 and/or the lower-latitude limit 408. In response to a user input to pan or zoom along a length of the scalar axis 248, the system may be configured to simultaneously modify one or more of the lower-scalar limit 512 and the upper-scalar limit 516.

Further, in response to a user input to adjust the lower-longitude limit 312 or the upper-longitude limit 316, the system may update the scalar-time graph 208 to display pixels corresponding only to scalar-time points corresponding to a set of identifiers having a longitude identifier between the lower-longitude limit 312 limit and the upper-longitude limit 316. Similarly, in response to a user input to adjust the upper-latitude limit 404 or the lower-latitude limit 408, the system may update one or more of the longitude-time graph 204 and/or the scalar-time graph 208 to display pixels corresponding only to respective longitude-time points and/or scalar-time points corresponding to a set of identifiers having a latitude identifier between the lower-longitude limit 312 and the upper-longitude limit 316.

Moreover, in response to a user input to adjust the lower-scalar limit 512 or the upper-scalar limit 516, the system may update one or more of the longitude-time graph 204 and the longitude-latitude graph 212 graph to display pixels corresponding only to respective longitude-time points and/or longitude-latitude points corresponding to a set of identifiers having a scalar identifier between the lower-scalar limit 512 limit and the upper-scalar limit 516.

As noted above, the system may be configured to store dozens of petabytes of data. This can provide a variety of challenges. One of which is how the data are displayed in a way that is helpful to a human user. Accordingly, in certain embodiments, the visualization display 200 may be configured to divide a graph (e.g., the longitude-time graph 204) into a plurality of pixels. Each pixel may represent a corresponding bin of data. Each bin can be configured to store historical and/or contemporary data as well as metadata.

In some cases, a single pixel may correspond to a bin containing dozens, hundreds, or even thousands of data sets corresponding to orbital objects. To aid a user in digesting such a large amount of data, the visualization display 200 may be configured to display an indication of the amount of data (e.g., the number of objects, the number of sets of object identifiers) stored therein. For example, a user may use the point marker 256 to identify a pixel. The system can be configured to display a number of object identifiers (e.g., a number of unique object identifiers) between one and a total number of object identifiers associated with the bin associated with the identified pixel. An object identifier can be any type of identifier of an orbital object. The object identifier may comprise one or more letters, numbers, symbols, or any combination of these.

In some designs, the system is configured to receive a selection from a user of a target object identifier. For example, the system may sequentially cycle (e.g., automatically, manually) through a display of each object identifier associated with the identified pixel (e.g., every second, every two seconds, in response to a user input, etc.). As a different example, the system may be configured to display a list of object identifiers from which a user may select the target object identifier. The system may be configured only to display unique object identifiers since many object identifiers in a single bin may be identical. In some embodiments, the system may not display one or more of the metadata stamps (e.g., the tracking line longitude stamp 290, the horizontal tracking line 260, the object identifier stamp 282, the scalar stamp 274, etc.) until an object identifier has been selected. In certain embodiments, the system displays metadata stamps for each unique object identifier present in the bin. The visualization display 200 may implement a color scale or gray scale to provide information about the number of unique orbital object identifiers in a bin. For example, bins with more unique orbital object identifiers may correspond to lighter pixels while bins with fewer unique orbital object identifiers may be darker. Bins with no orbital object identifiers may be black. This situation may arise, for example, when viewing a small portion (e.g., zoomed in) of the data in a graph.

The system can be configured to identify one or more values (e.g., by various metadata time stamps described herein) associated with a default data set. The point marker 256 is an example of an interface element that can identify values in the default data set. The default data set may be determined based on one or more default rules. The default rule(s) may be based on a storage time (e.g., most recently stored), a view time (e.g., most recently viewed), a numerical value (e.g., smallest latitude), an object identifier (e.g., earliest object identifier by alphabetical order), or any other default measure.

As a user moves the point marker 256, the system may automatically (e.g., in real-time) update the identified values (e.g., metadata time stamps) associated with the updated pixel corresponding to an updated data set. The updated data set may be determined using the same or different rules described above. The user may move the point marker 256 over an updated pixel in a variety of ways, such as by mousing over the pixel using an input device (e.g., mouse), tapping on the pixel (e.g., using a touchscreen), typing in information associated with the updated pixel, or in any other way to identify a pixel.

It may be advantageous to allow a user to save one or more settings associated with the visualization display 200. For example, a user may wish to return at a later time to a point or set of points displayed by the visualization display 200. This may be accomplished in a number of ways. For example, a user may be configured to bookmark one or more values associated with the target point (e.g., an object identifier, a longitude value, a time value, etc.). The system may store a list of the user's bookmarks to allow for easy access at a future time. The system may be configured to store a set of points based, for example, on the points having a common object identifier. For example, multiple points may correspond to the same object as it orbits the planet. Thus, multiple points in time and space may reference the same object. The user may be able to retrieve the set of points by inputting the object identifier (e.g., selecting it from a list, typing it in).

Additionally or alternatively, the system may be able to allow a user to save a view of one or more graphs. For example, a user may be able to bookmark a particular view within the longitude-time graph 204. Accordingly, the system may associate with the bookmark stored values for a bookmark-min longitude value (e.g., the lower-longitude limit 312), a bookmark-max longitude value (e.g., the upper-longitude limit 316), a bookmark-min time value (e.g., the lower-time limit 304), and/or a bookmark-max time value (e.g., the upper-time limit 308). Similar usage may be made for other values (e.g., a scalar value, an object identifier, a latitude). Points that satisfy these bookmark-min and/or bookmark-max values could be displayed by the system in response to a user selection of the associated bookmark.

Display Synchronization

One of the benefits of various embodiments described herein is the ability of a user to quickly and easily view and digest an immense amount of data containing variables in three, four, or more dimensions. To help a user visualize data containing higher-dimension values, various graphs of the visualization display 200 may be synchronized to each other. FIGS. 6-9 illustrate various functionality associated therewith.

Figure 6:
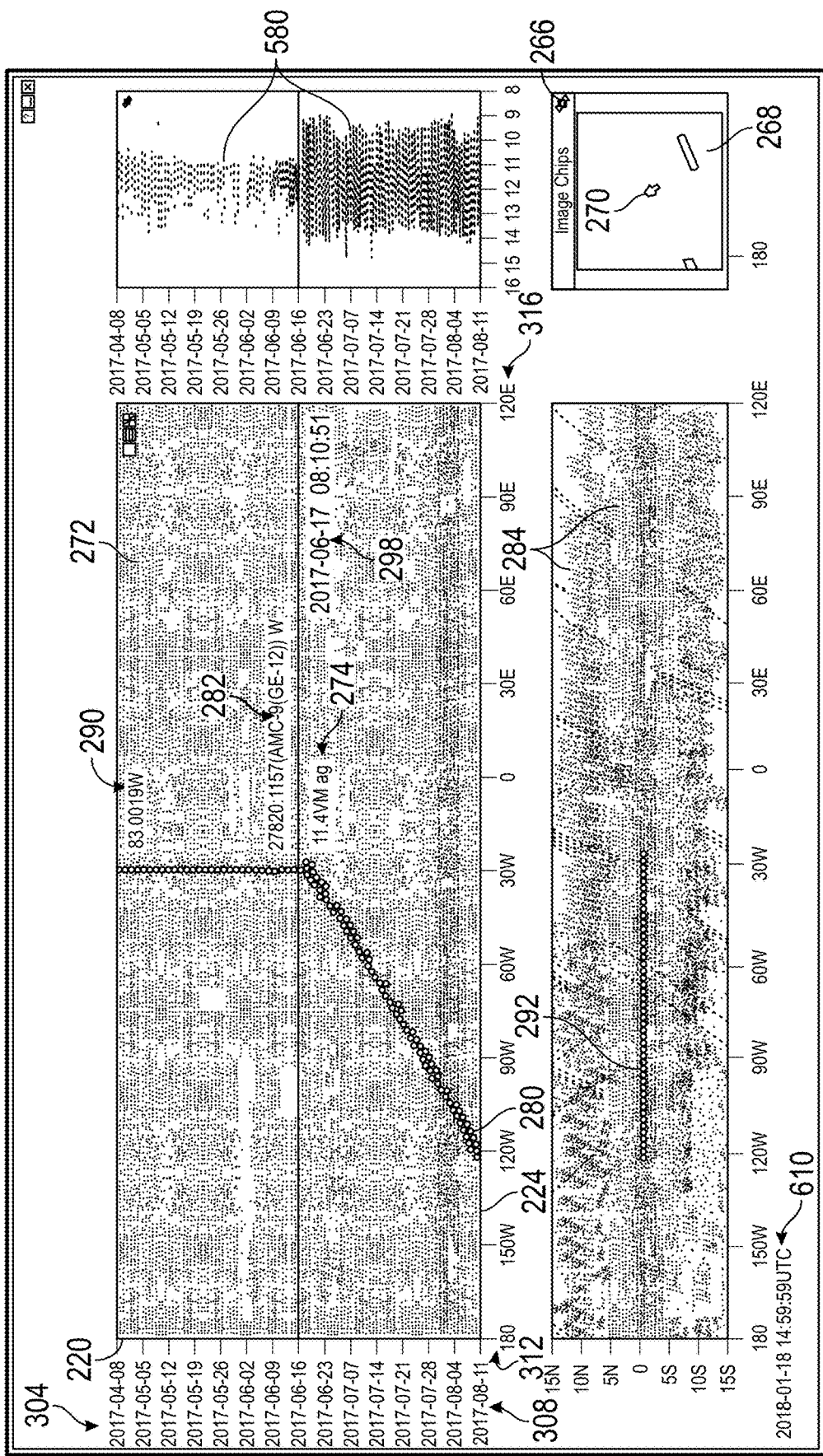
FIG. 6 shows a zoomed-in and panned view of the visualization display of FIG. 2.

FIG. 6 shows a zoomed-in and panned view of visualization display 200 of FIG. 2. As shown, the first time axis 220 spans from and updated lower-time limit 304 to an updated upper-time limit 308. The first time axis 220 spans about fifteen weeks. Similarly, the first longitude axis 224 has been updated to show a span of about 37 degrees between the lower-longitude limit 312 and the upper-longitude limit 316. The object identifier stamp 282 indicates the same object identifier shown in FIG. 2. This indicates that the point marker 256 identifies a pixel associated with the same object as is identified in FIG. 2. The tracking line longitude stamp 290 indicates a longitude of about 83.0019 W and the tracking line time stamp 298 indicates a time of 2017-06-17 08:10:51. As shown, the selected collection 280 of longitude-time points is associated with the pixel identified by the point marker 256. Other unhighlighted collections 272 of longitude-time points are also shown, which are associated with the unhighlighted collections 284 of longitude-latitude points.

The selected collection 280 of longitude-time points is similarly associated with the selected collection 292 of longitude-latitude points displayed in the longitude-latitude graph 212 as well as the selected collection 580 of scalar-time points displayed in the scalar-time graph 208.

The visualization display 200 may further include a current time stamp 610. The current time stamp 610 may indicate a current universal time, such as one tracking the coordinated universal time (UTC).

Figure 7:
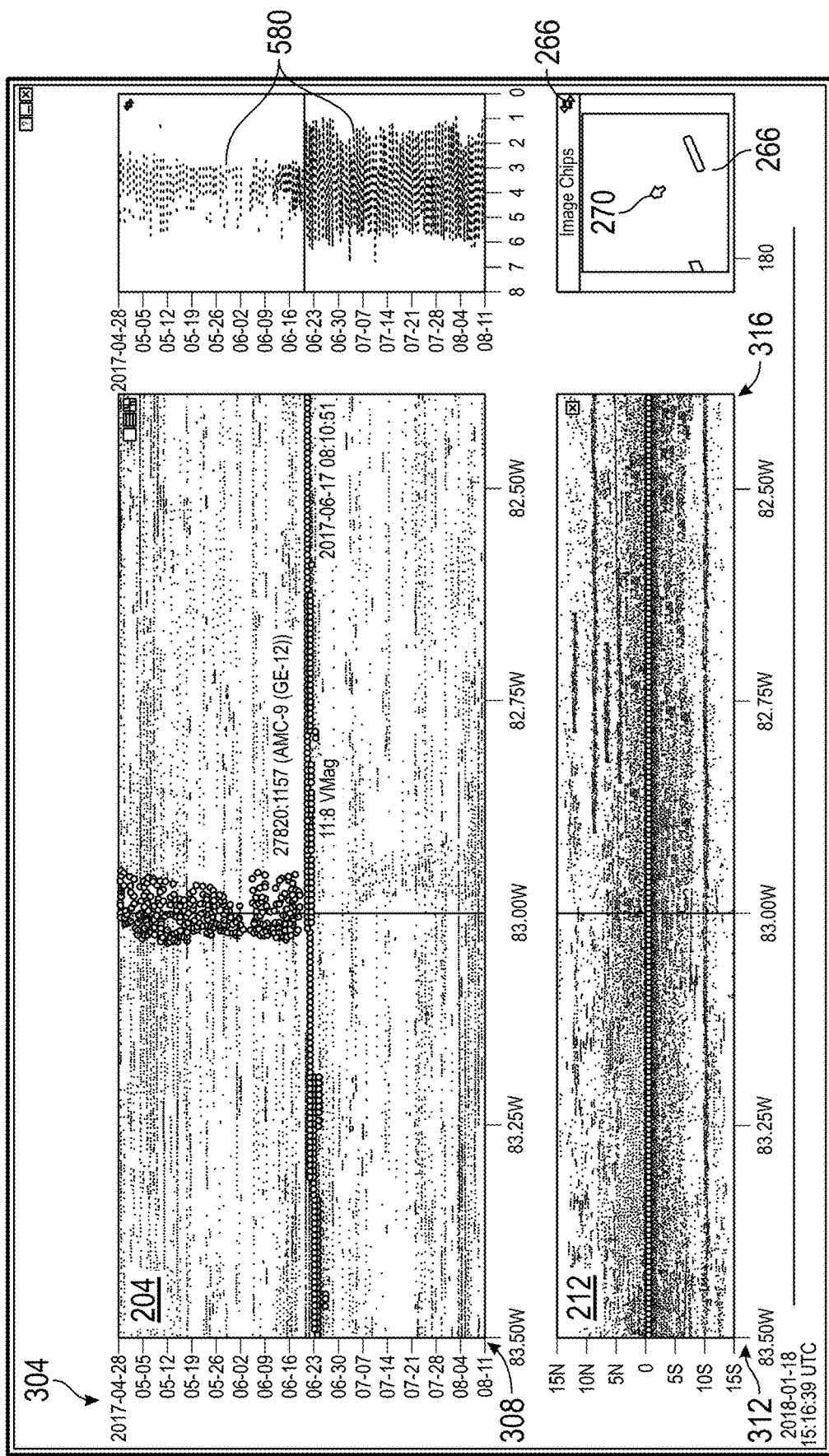

FIG. 7 shows the same view as FIG. 6 after the first longitude axis 224 and the synchronized second longitude axis 236 have been zoomed in. Note that the first longitude axis 224 and the second longitude axis 236 (as well as the first time axis 220 and the second time axis 244) are synchronized in this case, allowing for a seamless viewing experience when viewing each of the graphs. Because the first longitude axis 224 and the second longitude axis 236 are synchronized to each other, the scalar-time graph 208 has also been updated. The point marker 256 identifies a slightly different pixel as compared to FIG. 6. As shown, both longitude axes 224, 236 span a little over a single degree. Moreover, as shown, the axis labels (and/or the associated hash marks) on the first longitude axis 224 have become omitted since the two longitude axes 224, 236 are synchronized. Similarly, the two time axes 220, 244 can be synchronized, in which case the axis labels (and/or the associated hash marks) of the second time axis 244 may be omitted.

Figure 8:
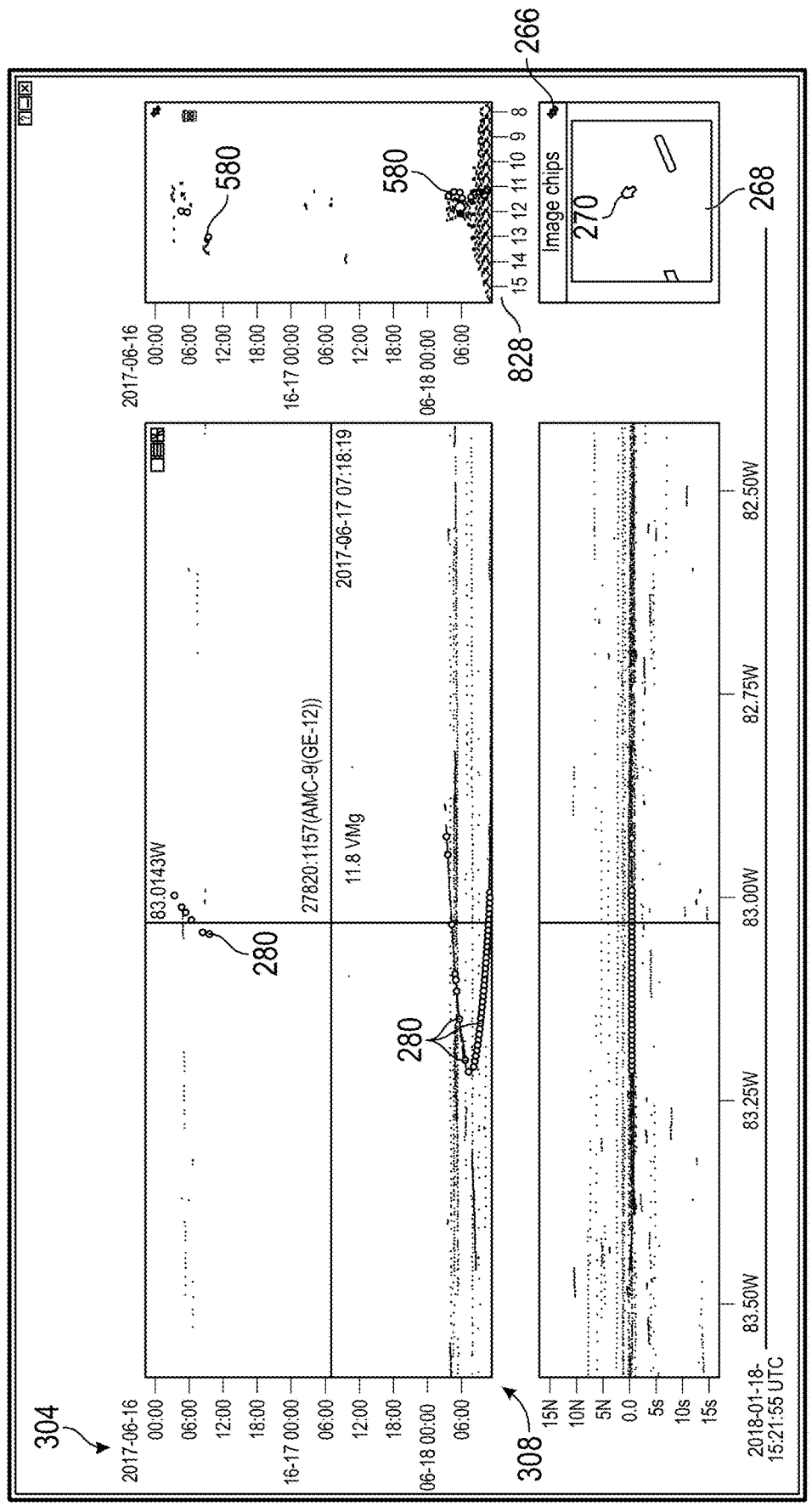

FIG. 8 shows the same view as FIG. 7 after the first time axis 220 and the synchronized second time axis 244 have been zoomed in. Because the first time axis 220 and second time axis 244 are synchronized to each other, the scalar-time graph 208 has also been updated. The point marker 256 identifies a slightly different pixel as compared to either FIG. 6 or FIG. 7.

Figure 9:
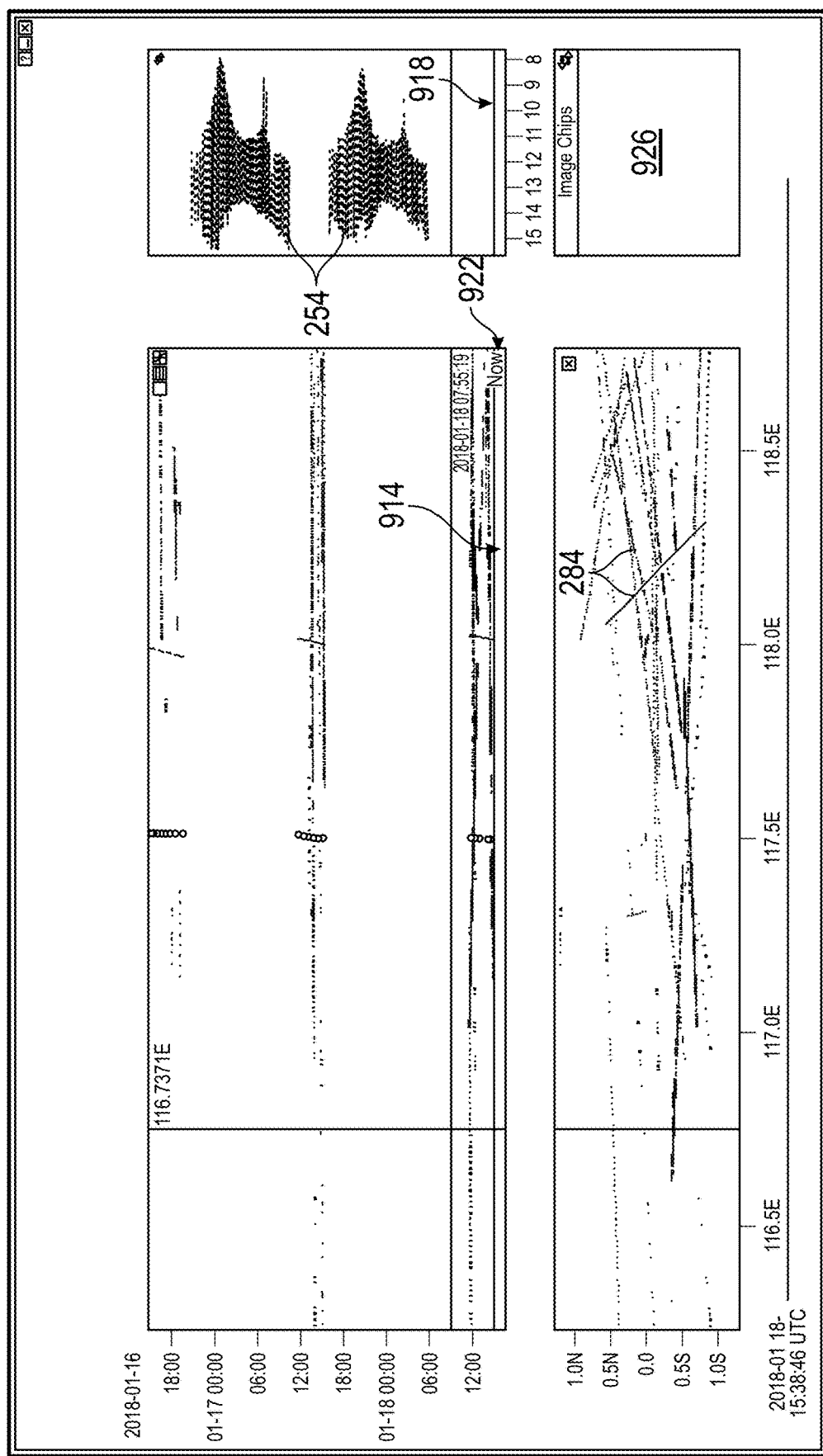
FIG. 9 shows a zoomed-in and panned view of a longitude-time graph and scalar-time graph at a current time horizon.

FIG. 9 shows a zoomed-in and panned view of a longitude-time graph 204 at a current time horizon. The current time horizon may be identified by a current time marker 922. The current time marker 922 may include a line and/or a descriptor, such as a "now" descriptor, as shown. The future longitude-time area 914 and the future scalar-time area 918 do not include any display points corresponding to object data since those times are later than the current time as indicated by the current time stamp 610. Data that has been received later than a threshold time from the current time may not be displayed yet. This delay may be due to latency in the network (e.g., the network 144) or for some other reason that delays the system from receiving the data.

The image chip 268 in FIGS. 6-8 identifies an object image 270 while the image chip 268 in FIG. 9 does not. The image chip 268 corresponds to a photograph from which object data has been obtained associated with a pixel identified by the point marker 256. The photographs shown in FIG. 6-8 may identify the object image 270 received from actual telescopic images. As noted, an image chip 268 may include a plurality of object images 270. In some embodiments, the image chip 268 identifies which of the plurality of object images 270 corresponds to the data associated with the pixel identified (e.g., by the point marker 256). For example, a marker may be displayed indicating a location of the object within the at least one photograph. The marker may comprise a circle, a box, crosshairs, a coloring, a flicker, or any other indication of an object within a photograph. The user may identify the pixel associated with the object image 270 in other ways described above.

Image chip 268 data may be received from one or more databases. For example, the system may receive the image chip 268 data from a database remote from the system. Additionally or alternatively, the data may be received from a database local to the system. The image chip 268 data may be received via one or more pointers (e.g., hyperlinks) that point to corresponding databases. For example, various image chip 268 data may be stored on databases associated with the imager (e.g., telescope) from which the data was first obtained.

The user may select one or more objects from an image chip 268 and a corresponding point or plurality of points may be indicated (e.g., highlighted, supplied with a marker) on one or more of the graphs in the visualization display 200. Additionally or alternatively, the user may be able to select a point or plurality of points on one or more of the graphs in the visualization display 200 and have one or more images (e.g., photo, video) displayed by the image chip 268 with associated marker. In some designs, the image chip 268 is configured to show a video corresponding to multiple points within a graph in the visualization display 200. The multiple points may comprise a common object identifier. In FIG. 9, because an identified pixel does not correspond to image data for a photograph, the blank image chip 926 does not display any photograph.

Tagging Interface

It may be useful to update data corresponding to the object data in the historical and/or contemporary databases. For example, it may be helpful to add or remove an object identifier (e.g., object name) to one or more points. To this end, a tagging interface can be implemented in various embodiments. FIGS. 10A-10D illustrate various aspects of embodiments of the system that include a tagging interface.

Figure 10A:
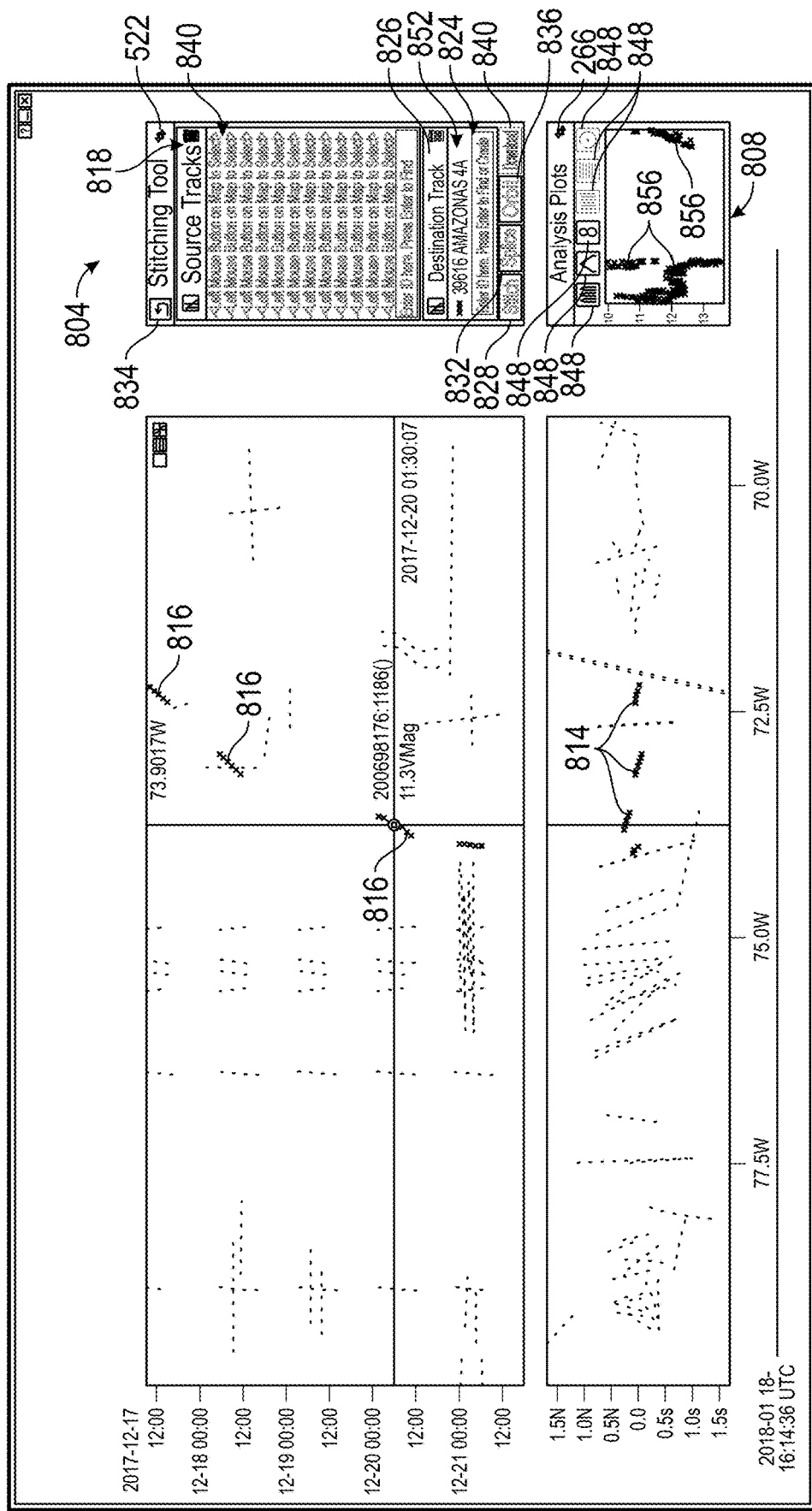
FIG. 10A shows a tagging interface comprising a stitching tool interface and an analysis plot interface.

FIG. 10A shows a tagging interface comprising a stitching tool interface 804 and an analysis plot interface 808. The tagging interface is shown along with a longitude-time graph 204 and a longitude-latitude graph 212. As shown, the stitching tool interface 804 may include a source track region designator 818 with corresponding source track region 820 and/or an destination track region designator 826 with corresponding destination track region 824. In some embodiments, the source track region designator 818 and/or destination track region designator 826 are not included. The destination track region 824 may include one or more of a stitch selector 828, a splice selector 832, an orbit selector 836, and/or a download selector 840. In response to the orbit selector 836, the system may be configured to calculate and/or display an aspect of an orbit of a selected object or plurality of objects. The stitching tool interface 804 may further include an undo selector 834. The undo selector 834 may be represented by words "undo" and/or by a symbol (e.g., an arrow symbol). In response to a selection of the undo selector 834, the system may undo a most recent user selection. In response to a sequence of selections, the system may be configured to revert back a sequence of actions in response to a sequence of previous user selections.

The analysis plot interface 808 may include one or more analysis plot input selectors 848 and/or an interface toggle 266. The interface toggle 266 may be selected by a user to toggle between a tagging interface and the scalar-time graph 208 and/or display area 216. The analysis plot interface 808 may include an analysis plot. The analysis plot may display one or analysis points within a plot area. The analysis plot may include a time axis and/or a scalar axis. The time axis may span a particular number of days (e.g., five days, seven, days, ten days, etc.). The scalar axis may be determined based on a number of selected points, such as a collection 816 of longitude-time destination points.

As shown in FIG. 10A, the collection 816 of longitude-time destination points may be selected by a user. For example, the user may highlight one or more of the collection 816 of longitude-time destination points. As used herein, highlighting may include altering one or more of a color, shading, intensity, and/or background. This may be achieved, for example, by right-clicking on a mouse one of the points in the longitude-time graph 204 and/or the longitude-latitude graph 212. The right-click (or other user input) can cause the point marker 256 to identify a pixel associated with object data. As shown in FIG. 10A, the user has identified the collection 816 of longitude-time destination points. The identified collection 816 of longitude-time destination points may be highlighted (e.g., colored). The collection 816 of longitude-time destination points corresponds to a collection 844 of longitude-latitude destination points. The destination track identifier 852 in the stitching tool interface 804 identifies the collection 816 of longitude-time destination points as a destination track. The selected points may correspond to the destination track analysis points 856 displayed within the analysis plot interface 808.

Figure 10B:
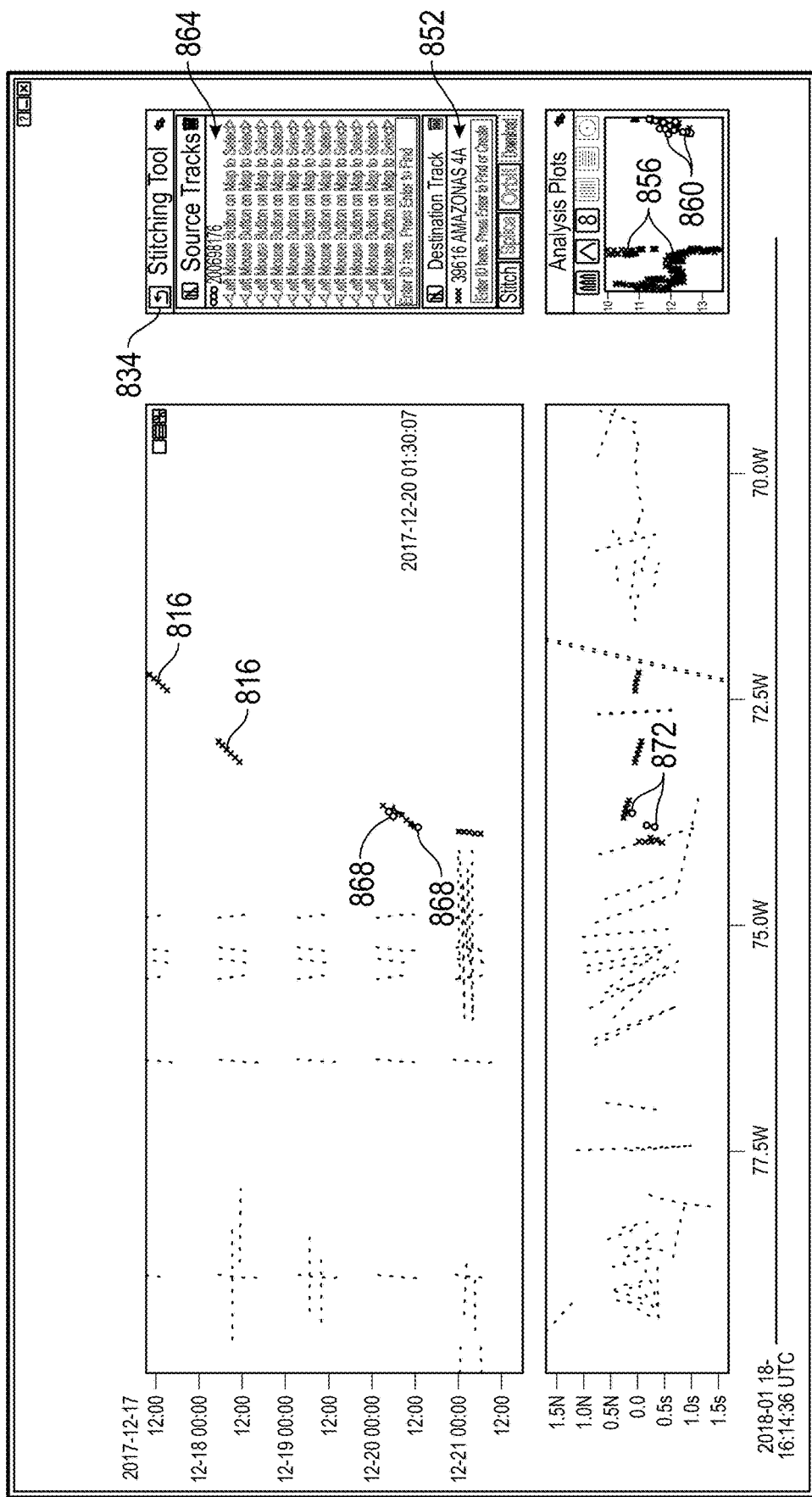
FIG. 10B shows a selection by a user of a collection of first longitude-time source points.

FIG. 10B shows a selection by a user of a collection 868 of first longitude-time source points. The collection 868 of first longitude-time source points may consist of a single point. As shown, the collection 868 of first longitude-time source points is different from the collection 816 of longitude-time destination points. The collection 868 of first longitude-time source points may be highlighted (e.g., differently from the highlighting of the collection 816 of longitude-time destination points). The source track region 820 now shows a first source track identifier 864 that has been selected. A corresponding collection 872 of first longitude-latitude source points and/or a corresponding collection 860 of first source analysis points may be plotted in their respective graph/plot.

Figure 10C:
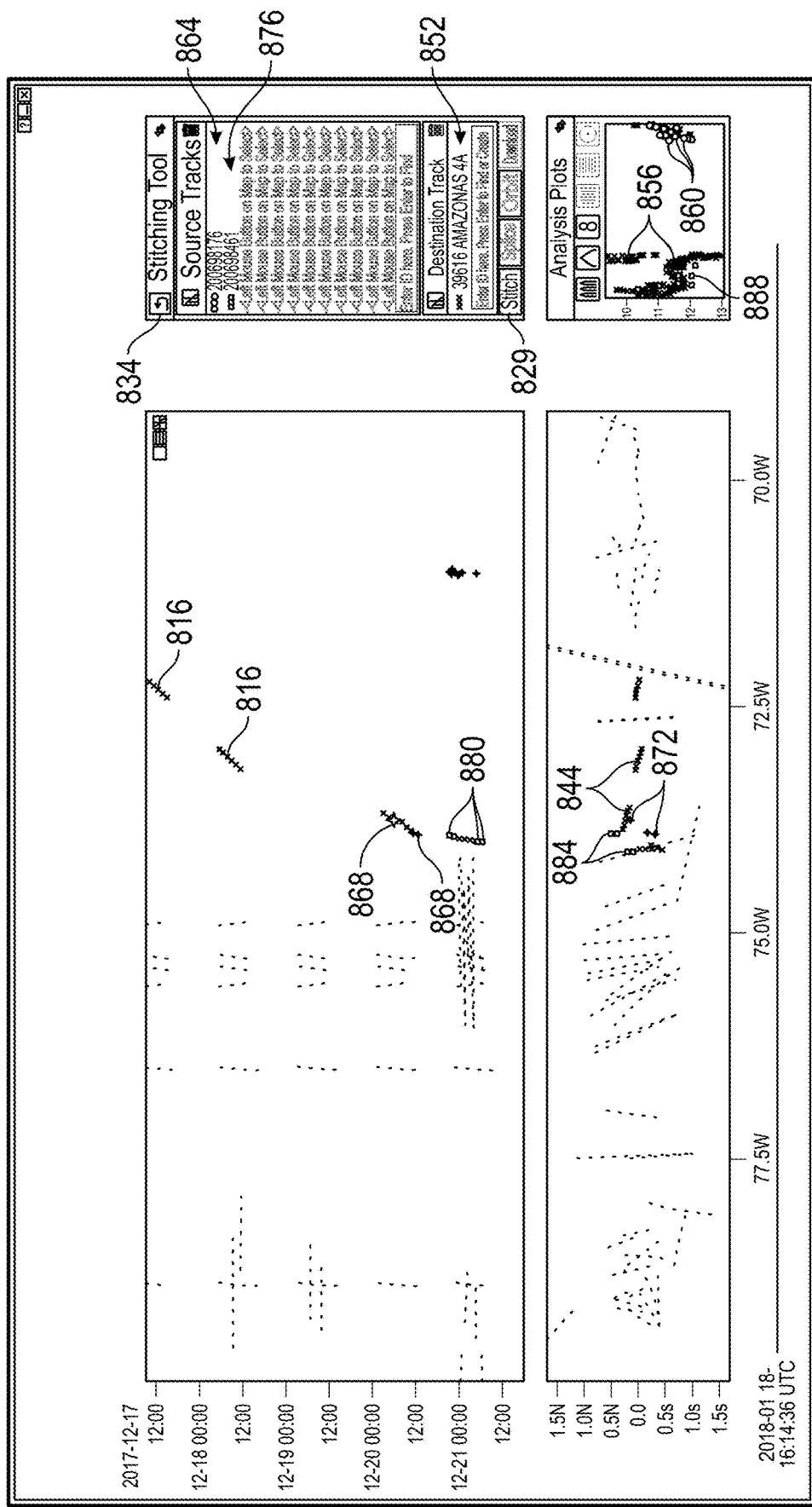
FIG. 10C shows a selection by a user of a collection of second longitude-time source points.

FIG. 10C shows a selection by a user of a collection 880 of second longitude-time source points. The collection 880 of second longitude-time source points may consist of a single point. As shown, the collection 880 of second longitude-time source points is different from either the collection 816 of longitude-time destination points or the collection 868 of first longitude-time source points. Similarly, as shown, the highlighting of the collection 880 of second longitude-time source points may be different from either the collection 816 of longitude-time destination points or the collection 868 of first longitude-time source points. The second source track identifier 876 indicates the additional selection of the collection 880 of second longitude-time source points. A corresponding collection 884 of second longitude-latitude source points and/or a corresponding collection 888 of second source analysis points may be plotted in their respective graph/plot. A highlighted stitch selector 829 may indicate that the selected collections 868, 880 are ready to be stitched. It will be noted that a single source track (as opposed to the two source tracks in the displayed example) may provide the highlighted stitch selector 829 as well.

Figure 10D:
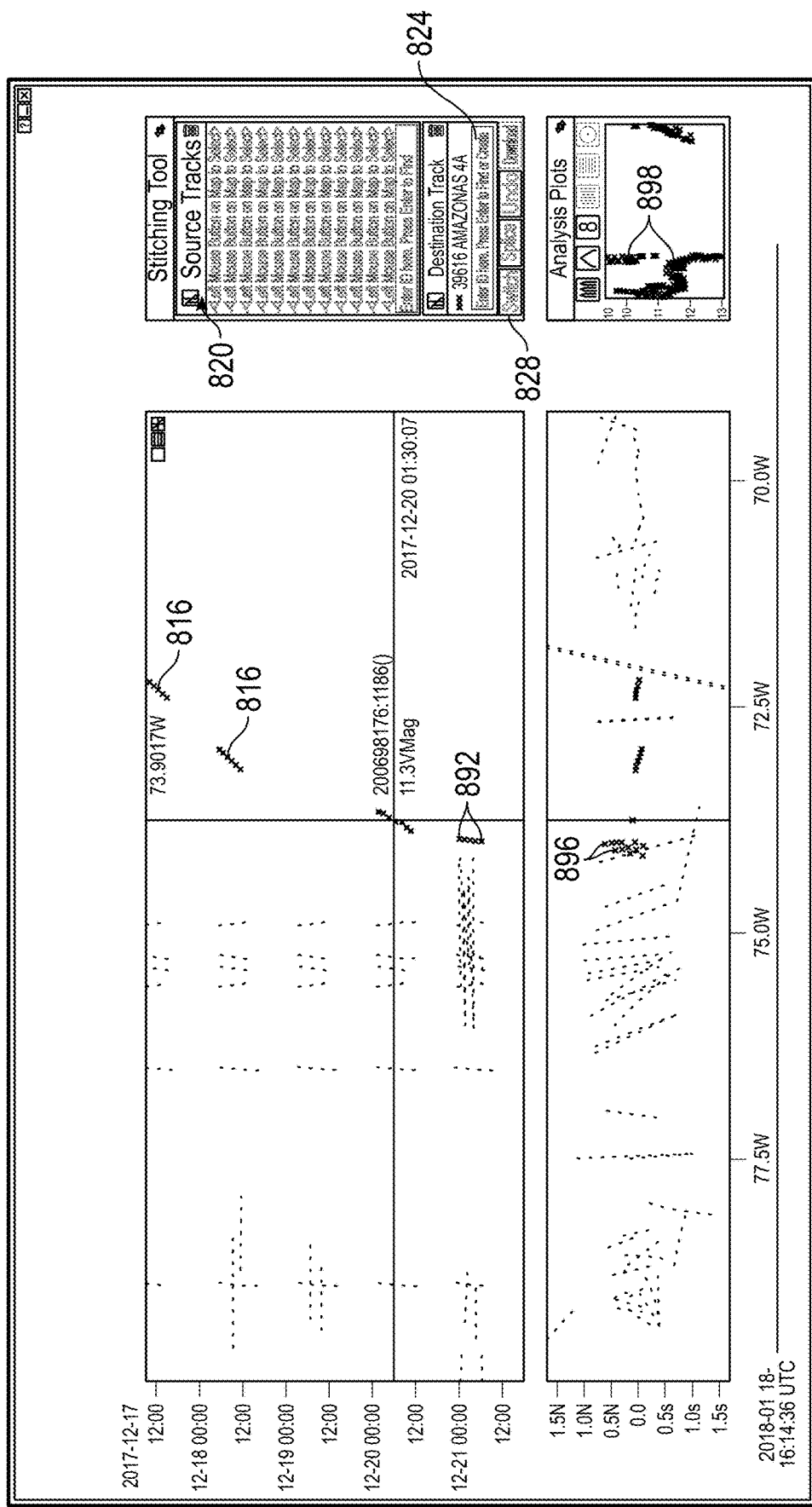
FIG. 10D shows the visualization display of FIG. 10C after a user has selected the stitch selector.

FIG. 10D shows the visualization display 200 of FIG. 10C after a user has selected the stitch selector 828. Once the stitch selector 828 has been selected by the user, the resulting new collection 892 of longitude-time destination points comprise the original destination and source track(s). A corresponding new collection 896 of longitude-latitude destination points and/or a new collection 898 of destination analysis points may also be displayed. Accordingly, it may be that no source tracks are indicated in the source track region 820. The destination track region 824 may continue to display an object identifier associated with the resulting destination track.

In this way, the tagging interface may allow a user to select a destination element comprising a first name identifier and a source element comprising at least one of the plurality of pixels corresponding to longitude-time points comprising a second name identifier. After selecting the stitching selector, the display can be configured to indicate that the source element comprises the first name identifier. In some designs, each of the destination element and source element consists of one or more points displayed by the system during the user selection of the stitching selector. In response to the user selection, the computer readable storage may be configured to associate a first data file comprising the first name identifier with a second data file comprising the second name identifier.

A reverse process may be used to splice a collection of points into separate sets of points. For example, a user may be able to select a collection of source points as well as one or more splice points from among the source points. After selecting the splice selector 832, the system may be configured to remove and/or alter an object identifier associated with the splice points relative to the source points.

For example, the system can be configured such that a user may be able to select at least one pixel corresponding to at least one longitude-time point comprising a first object identifier. The system may be configured to highlight a series of longitude-latitude points comprising an object identifier identical to the first object identifier. In response to a user selection of the splice selector, the system can be configured to distinguish a first set of one or more longitude-time points from a second set of one or more longitude-time points on the visualization display 200.

The system can be configured to highlight one or more pixels corresponding to a set of longitude-time points, for example, in response to a user input. The user input may comprise a selection of the one or more longitude-time points (e.g., via a selection of one or more pixels). The user input may include a mouse click, a double tap, a pinch motion, a two-finger tap, a grouping (e.g., circling) motion, or some other input signifying a selection of points. In some embodiments, the system may highlight a series of points based on a user selection of a first pixel. The system may be configured to highlight a series of pixels comprising the first pixel. Each of the pixels in the series can correspond to longitude-time points comprising a common object identifier. Moreover, while longitude-time points have been used as an example in FIGS. 10A-10D, other points (e.g., longitude-latitude points, analysis plot points) may be used for selecting and/or tagging (e.g., stitching, splicing).

FIGS. 11-19 show various aspects of the system described herein. Elements having label numbers corresponding to elements described elsewhere herein may have similar or identical functionality as that described as the corresponding elements.

Figure 11:
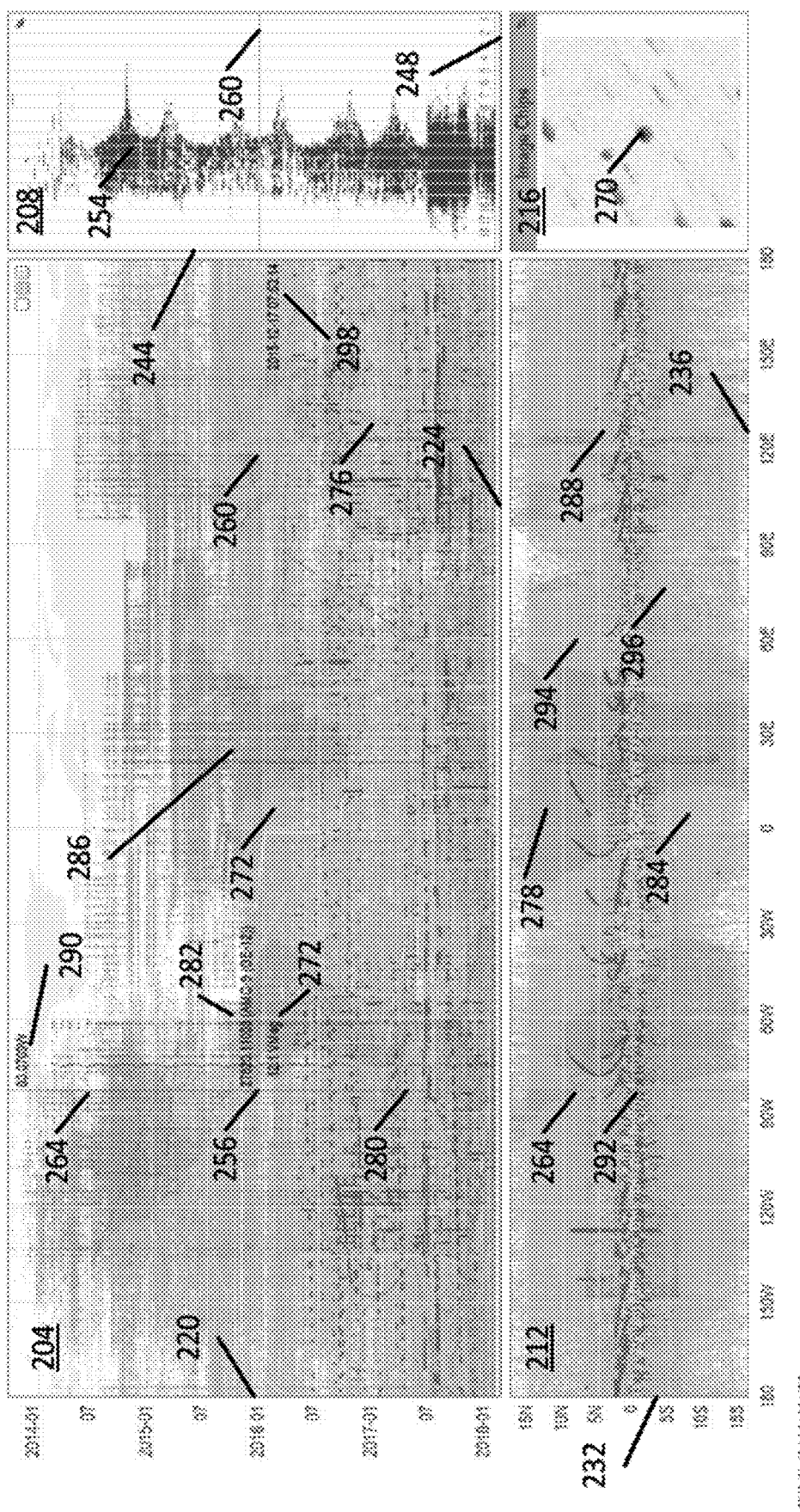
FIG. 11 shows an example visualization display with a longitude-time graph, scalar-time graph, a longitude-latitude graph, and a display area.
Figure 12:
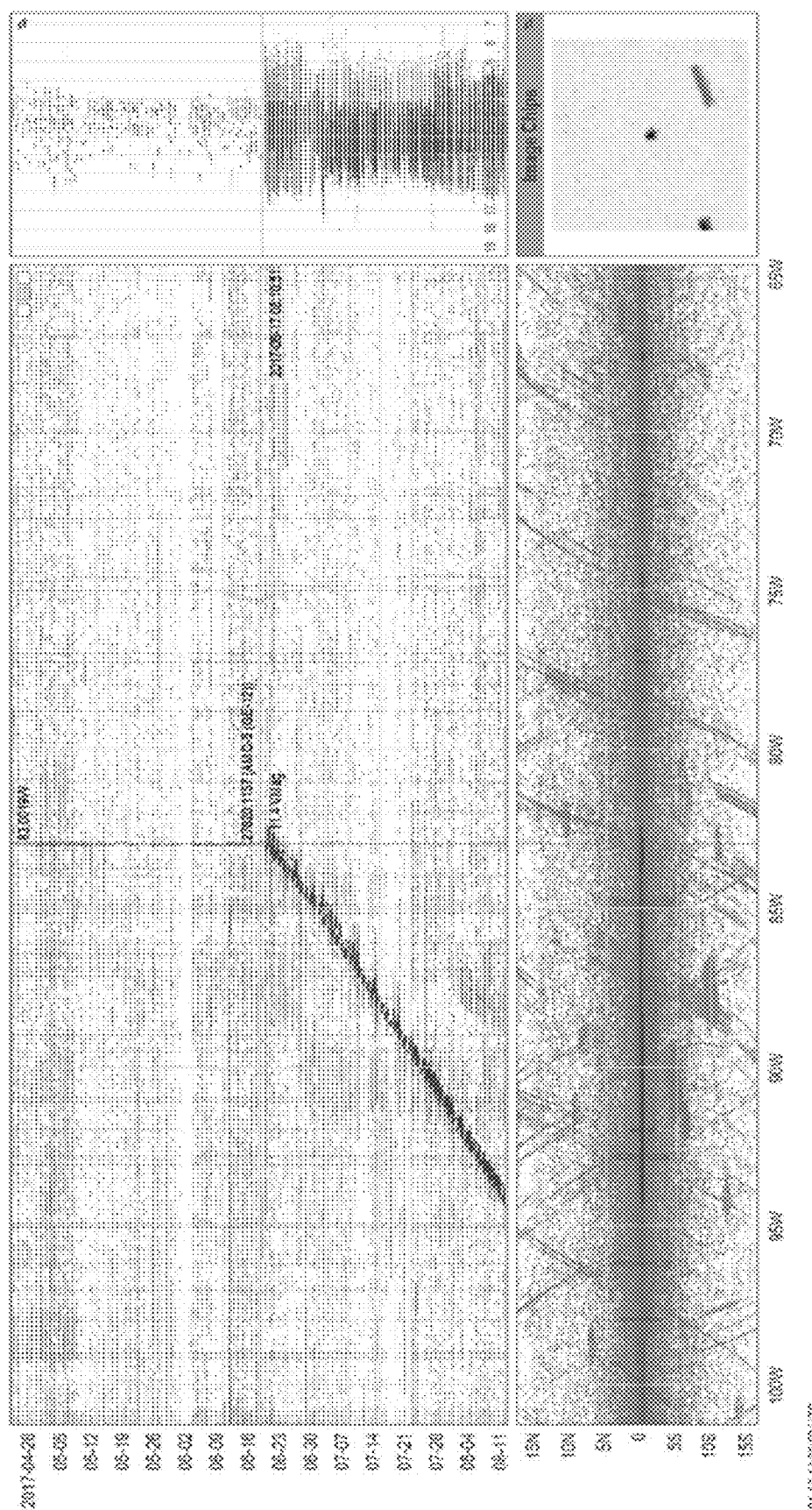
FIG. 12 shows a zoomed-in and panned view of a portion of the longitude-time graph of FIG. 11.
Figure 13:
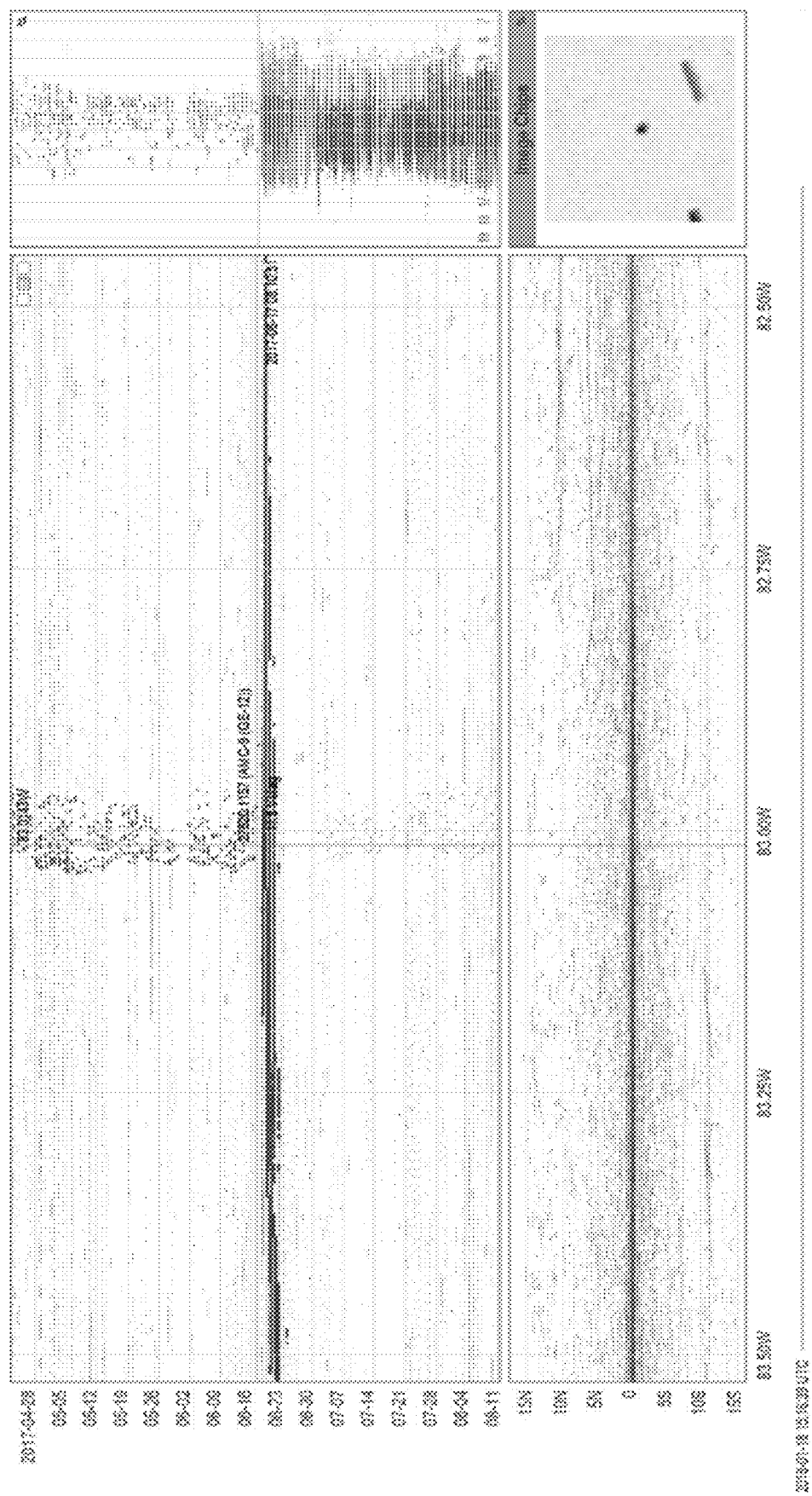
Figure 14:
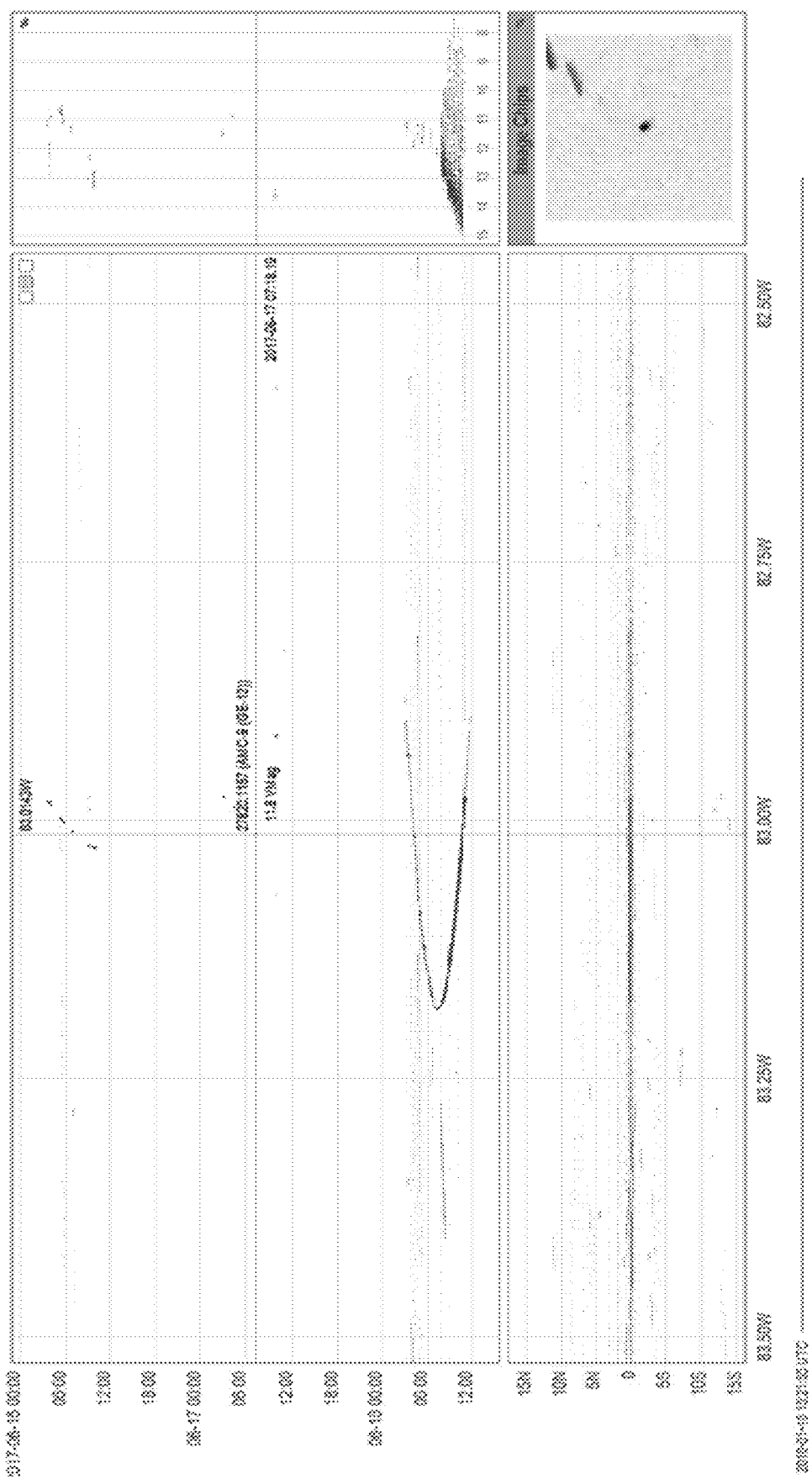
Figure 15:
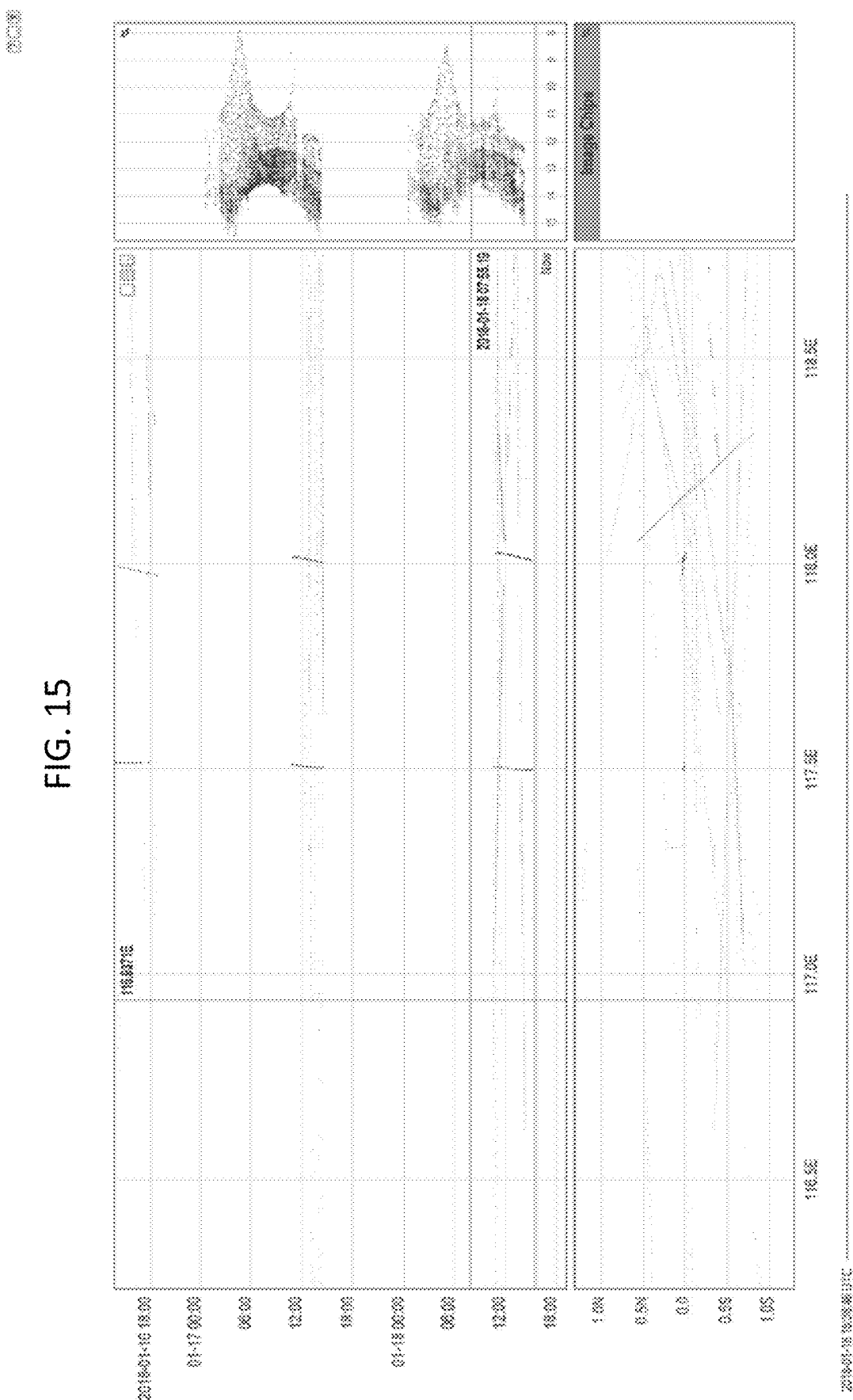
FIG. 15 shows a zoomed-in and panned view of a longitude-time graph at a current time horizon.
Figure 16:
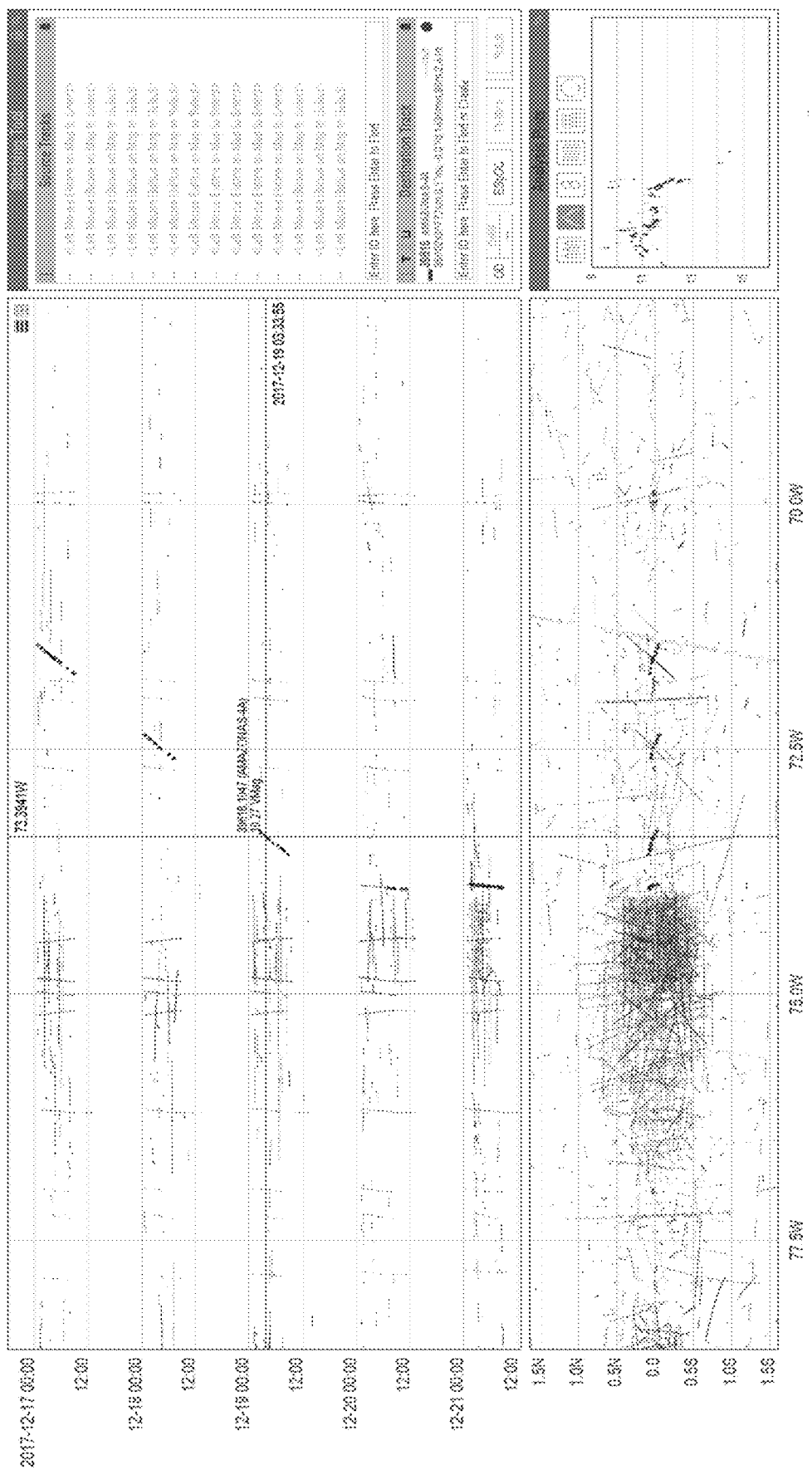
FIG. 16 shows a tagging interface comprising a stitching tool interface and an analysis plot interface.
Figure 17:
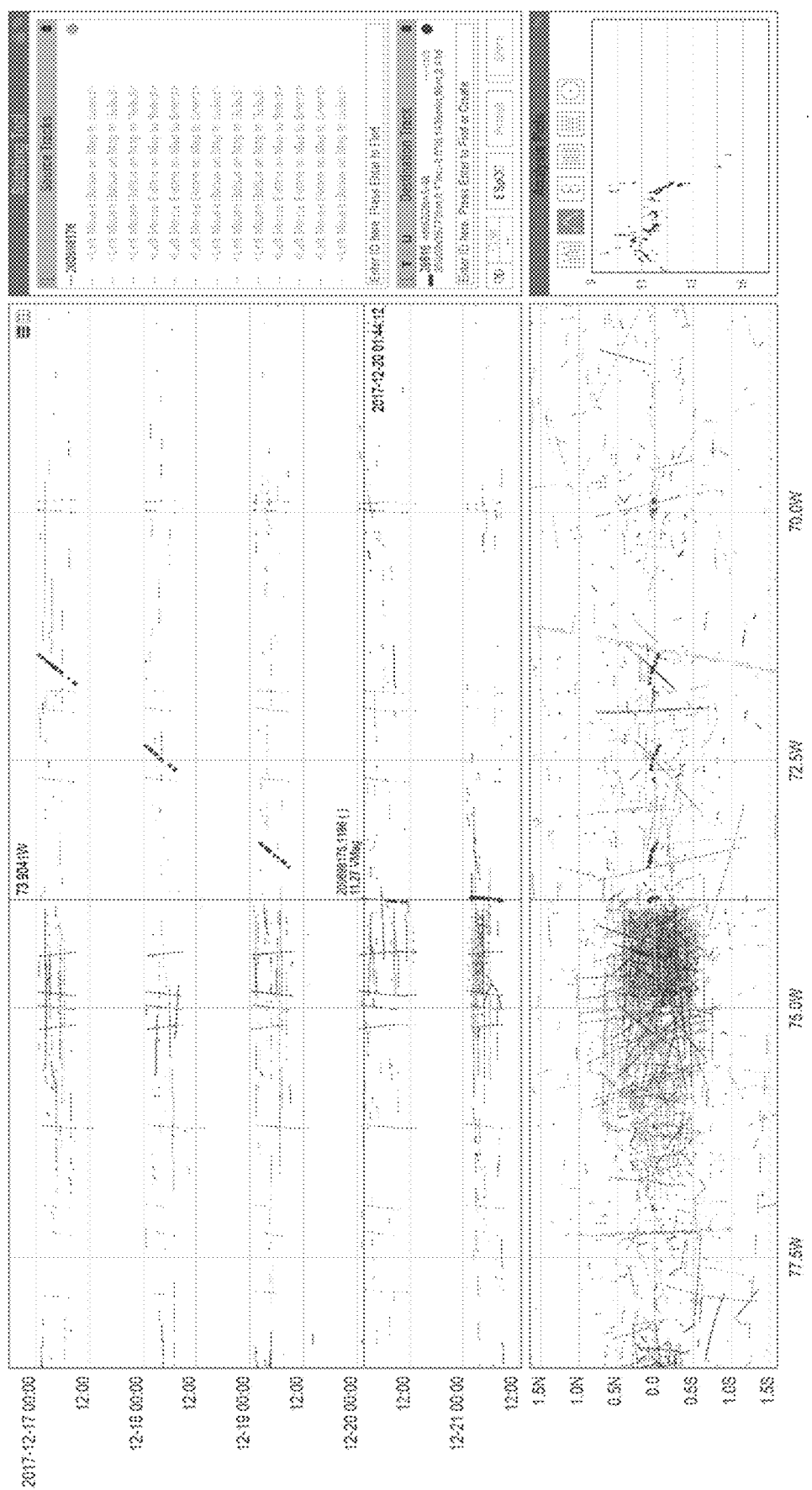
FIG. 17 shows a selection by a user of a collection of first longitude-time source points.
Figure 18:
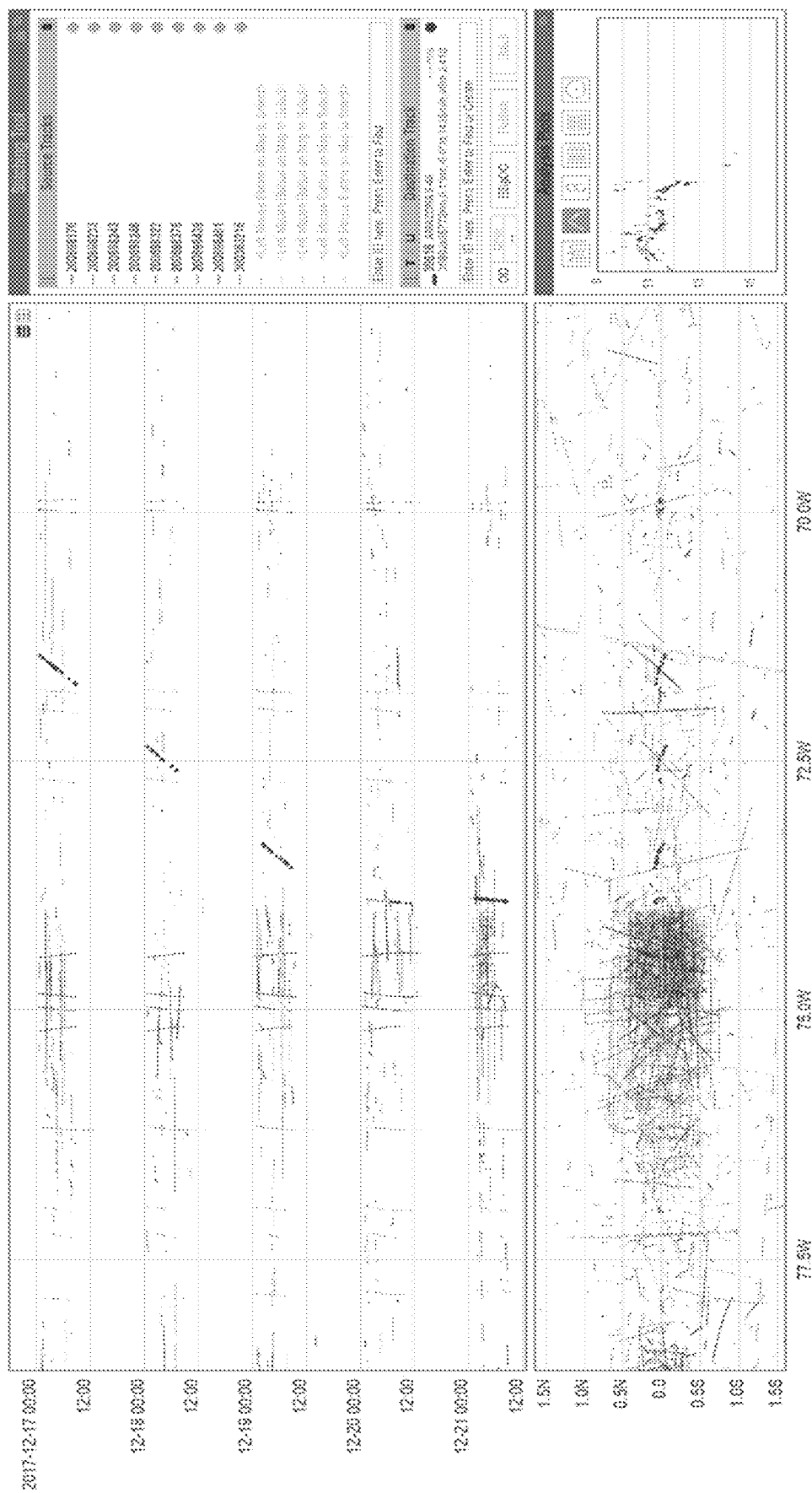
FIG. 18 shows a selection by a user of a collection of second longitude-time source points.
Figure 19:
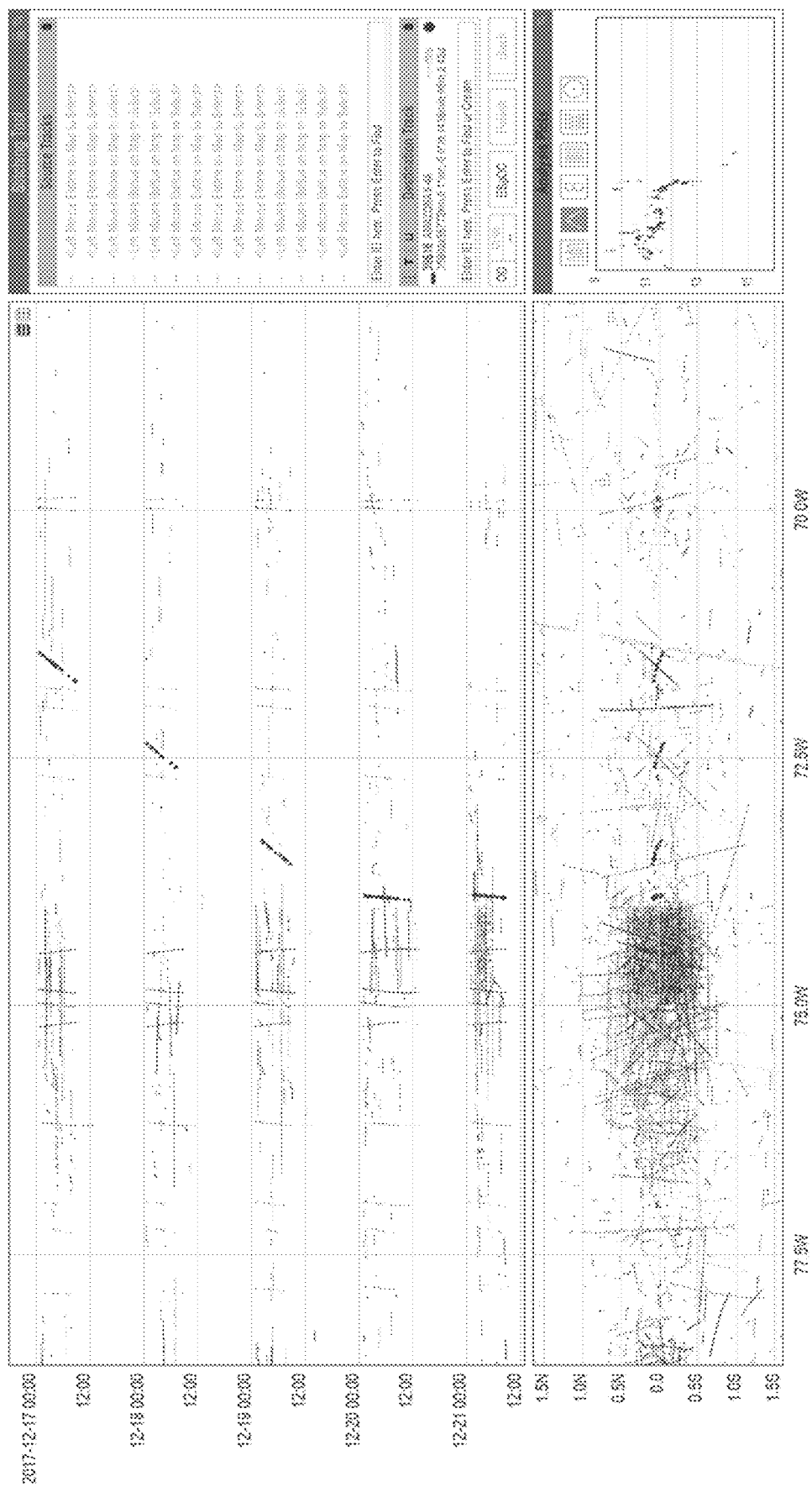
FIG. 19 shows the visualization display of FIG. 18 after a user has selected the stitch selector.

FIG. 11 shows an example visualization display 200. As shown, the visualization display 200 includes a longitude-time graph 204, a longitude-latitude graph 212, a scalar-time graph 208, and a display area 216. As shown, the longitude-time graph 204 includes a display of a longitude-time map 286. The longitude-latitude graph 212 also includes a longitude-latitude map 278. The longitude-time graph 204 also includes a point marker 256, which is indicated by a vertical tracking line 264 and a horizontal tracking line 260. As shown, various collections 272, 276, 280 of longitude-time points may be displayed. Corresponding collections 284, 292, 288 of longitude-latitude points may be similarly displayed in the longitude-latitude graph 212. Some vertical gridlines 294 and horizontal gridlines 296 are also shown in each of the graphs 204, 208, 212. Some of the labeled elements may appear in one or more of FIGS. 12-19 as well, but for clarity the labels have not been included. A person of skill in the art would be able to identify elements described herein within each Figure.

Autoselector

One of the many advantages of the systems described herein includes the ability to track and/or predict space objects. The trajectory of a space object can be extremely challenging to calculate and predict. Each prediction may include a set of measurements, which can be variable in their accuracy, precision, and/or dependability. For example, determining a position of the object in flight may require many images of the object using many optical sensors. Piecing the data from these images and arriving at an accurate and reliable position can be extremely difficult.

Despite the many challenges of capturing and allowing meaningful user interactions with space objects, embodiments disclosed herein can allow a user and the system to work synergistically to help identify areas where certain data can be improved, modified, and/or removed if necessary. Such an interface combines access to an enormous dataset, direction to more interesting features and aspects of that dataset that a human user can understand, and often a user experience that allows for real-time interaction with those features and aspects that is intuitive and manageable. In certain embodiments, a user can work with the machine to identify, manipulate, and sort (e.g., combine) data about various space objects.

Figure 20:
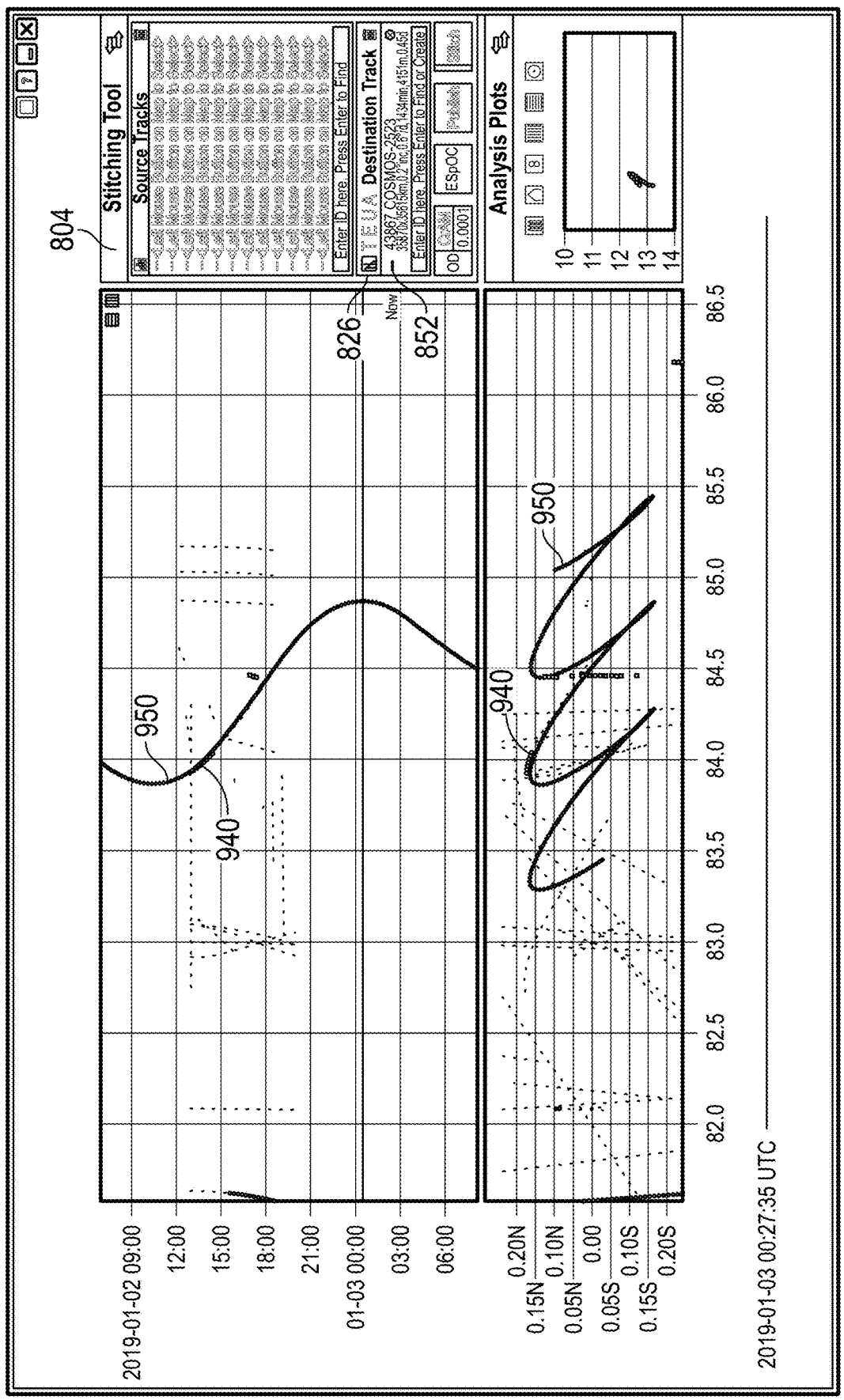
FIG. 20 shows a representation of an orbit of a space object superimposed on a longitude-time graph and longitude-latitude graph.

FIG. 20 shows an example user-selected first track (e.g., via a track identifier or track representation) and a system-predicted second track (e.g., via a system-predicted track identifier or track representation). A tagging interface is shown. One or more track representations (e.g., lines) may represent a corresponding number of tracks. A track may represent a path that an orbital object takes in space. One or more points or pixels may be used to indicate data points (e.g., timepoints) associated with an object's trajectory, position, time, etc. As shown, the first and second tracks may be displayed one on or more graphs. For example, a longitude-time graph may be shown together with a longitude-time graph (e.g., as described elsewhere herein). Additionally or alternatively, one or more scalar-time plots may be included. Other graphs/plots may be used, such as those described elsewhere herein.

Figure 21:
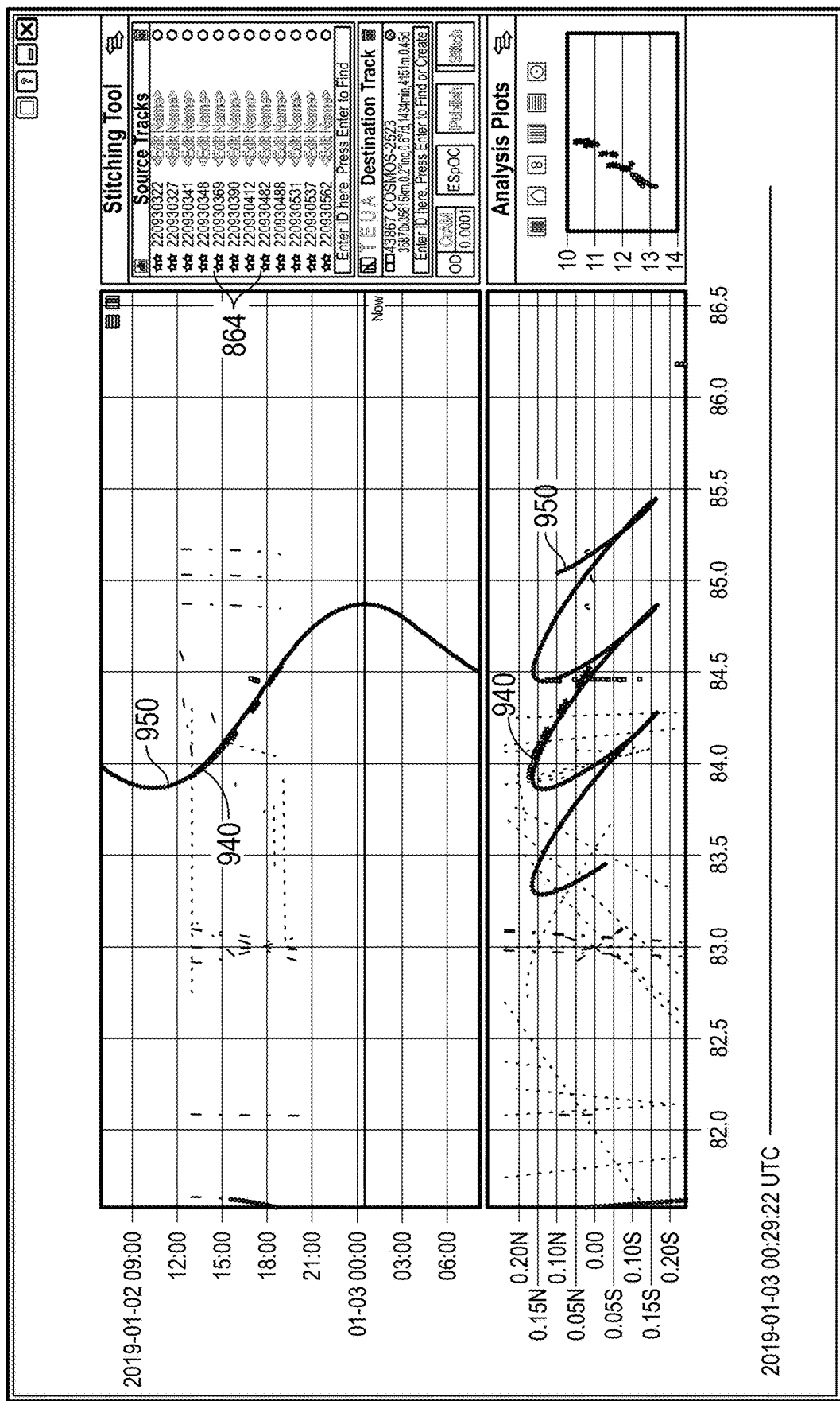
FIG. 21 shows the visualization display of FIG. 20 with highlighted longitude-time points and longitude-latitude points indicating a selection of multiple tracks associated with a space object.

FIG. 21 shows where second track is updated (e.g., to include additional tracks). As shown in the photographs of FIGS. 20-21, for example, the first and/or the second tracks can include an indication of the "future" (e.g., below a "current time" line). A first track representation may include points (e.g., longitude-time points) within a corresponding graph (e.g., longitude-time graph). Each of the plurality of longitude-time points can correspond to a set of identifiers having a time identifier between the lower-time limit and the upper-time limit and having a longitude identifier between the lower-longitude limit and the upper-longitude limit. The first track representation can provide a view of at least a portion of the first track. Additional tracks may be represented with corresponding track representations.

The display system may include a tagging interface that includes a stitching selector (e.g., "Stitching Tool" in FIGS. 20-21). The stitching selector may include certain functionality (e.g., buttons, interface design, etc.) of that described in relation to FIGS. 10A-10D, for example. In response to a user selection of a track representation, the display can indicate a selection (e.g., automatic, user-identified) of a different track representation corresponding to a second track. The system may automatically determine that the second track representation based on a determination that the second track is associated with the same orbital object as the first track.

The second track representation may be displayed on one or more graphs described herein. The system can highlight one or more of the first and/or second track representations (e.g., based on a user selection of the corresponding track representation).

In certain embodiments, the system can update the display to progressively highlight one or more additional track representations (e.g., after highlighting the first and/or second track representations). The system may update the display to automatically and/or progressively highlight each of the additional track representations. The delay may be between about 0.01 s to about 10 s between each of the highlights. The delay may depend on the density of tracks and/or the number of tracks in the viewable display. In response to a user's suspend input, the system may suspend and/or stop progressive highlighting of each of the additional track representations. A length of the delay between each of the highlights may depend on at least one of a density and/or a number of tracks displayed. The display may be configured to progressively highlight the additional track representations based at least on a time identifier associated with the additional track representations. The display may progressively highlight the additional track representations (e.g., within the longitude-time graph) by receiving a user designation. The designation may include one or more of a scroll indicator, a button, a wheel, a switch, or any combination thereof. Additionally or alternatively, the display may deselect highlighting by receiving the user designation.

As described in more detail herein, the system may be configured to determine an orbital path of the orbital object. The orbital path may be determined over an orbital time period that includes a first time period that (i) overlaps the time period, (ii) precedes the time period, (iii) succeeds the time period, or (iv) any combination thereof. As shown in FIGS. 20-21, the orbital path may be shown on one, two, or more graphs simultaneously. For example, the orbital path may be shown on the latitude-longitude graph and/or the longitude-time graphs. Other variations are possible.

Image Stacking

Figure 22:
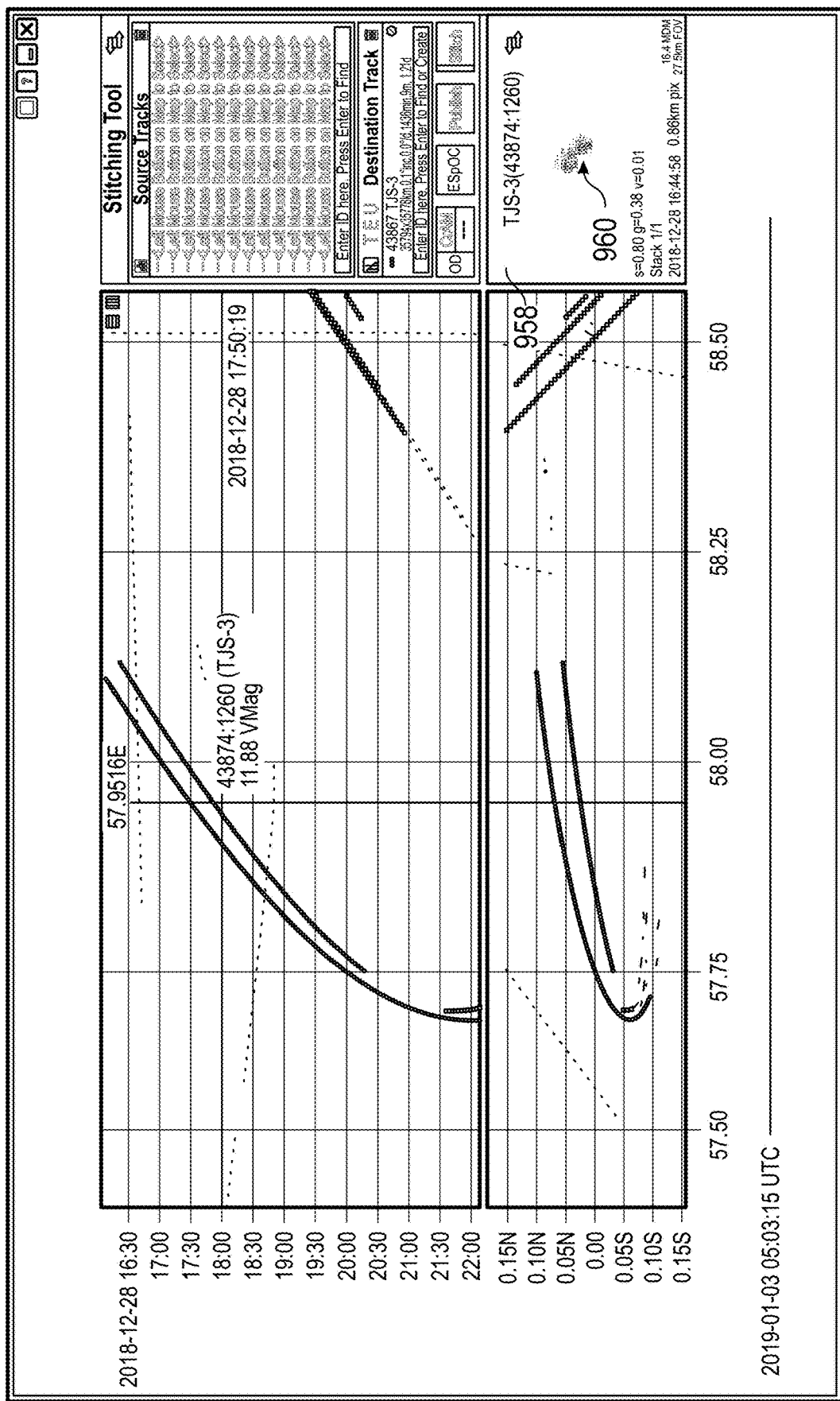
FIG. 22 shows a visualization display comprising a photograph selected from a set of photographs based on a specified latitude range, a specified longitude range, and a specified time range.

The system can receive a plurality of photographs of space objects within a time domain. Each of the plurality of photographs can correspond to a latitude domain, a longitude domain, and/or a timestamp within the time domain. Based on a selection (e.g., by a user), the system can receive image data derived from the plurality of photographs. In certain embodiments, the system may receive a user selection of a latitude range within the latitude domain, a longitude range within the longitude domain, and/or a time range within the time domain. FIG. 22 shows a photograph based on a user-selection of a latitude range, a longitude range, and a time range of set of photographs. Once selected, the display can show an object image 960 within the image chip 958.

Figure 23:
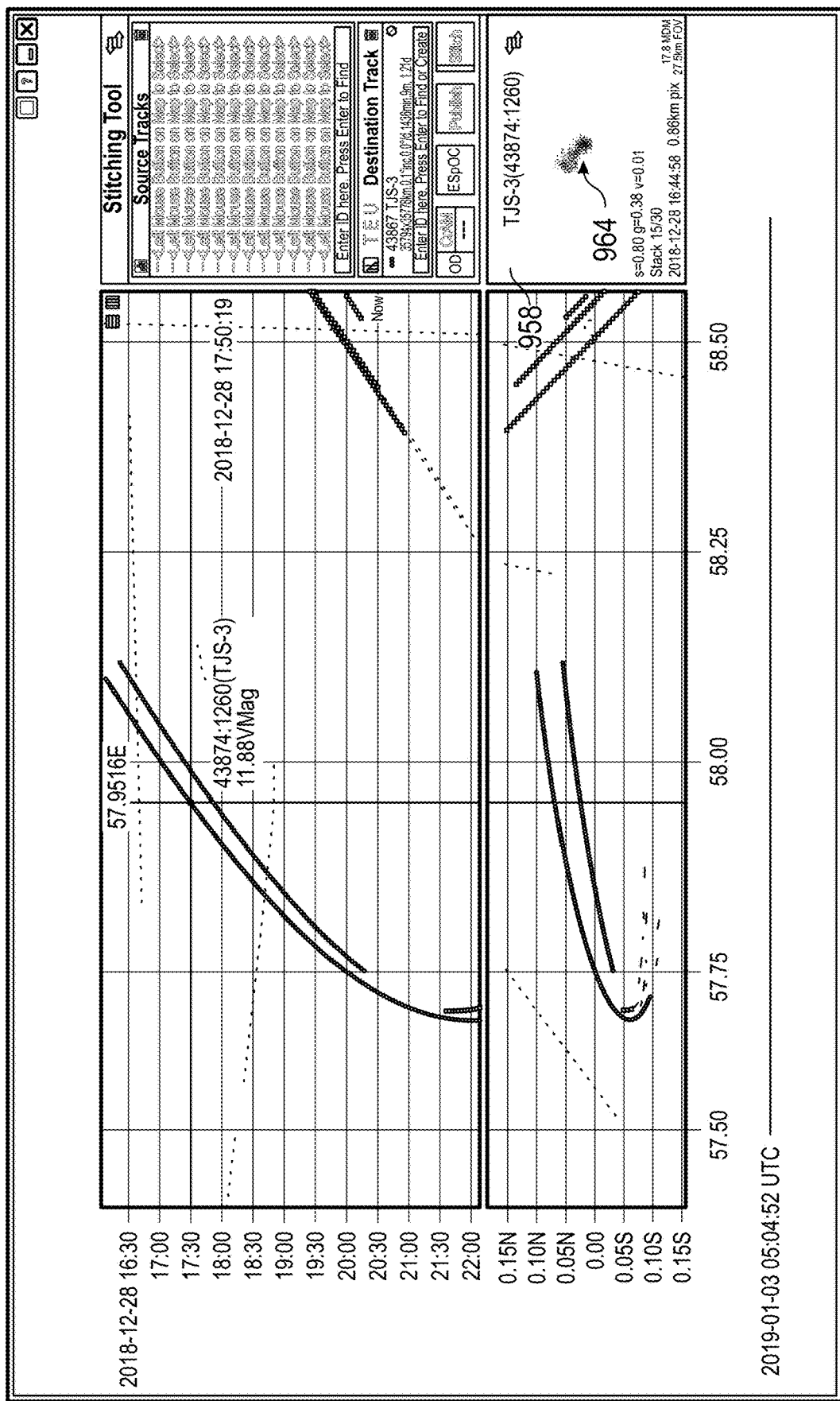
FIG. 23 shows the visualization display of FIG. 22 comprising a photograph modified relative to the photograph shown in FIG. 22.

In response to the user selection, the system may modify the image shown in the image chip 958. FIG. 23 shows an example modified photograph (e.g., based on a set of photographs) relative to the photograph showed in FIG. 22. The modification may be based on at least one of the plurality of photographs received by the system. As shown in FIG. 23, the display interface can generate a display of the 958. As shown in the photographs of FIGS. 22-23, one or more of the space object's characteristics (e.g., location in photo, size, color, brightness, etc.) may be shown as being modified (e.g., the object may be removed from the photo).

The modified image may be a combination (e.g., a summation, overlay, etc.) of two or more images of the plurality of photographs within the selected latitude range, longitude range, and time range. For example, the system may integrate (e.g., summate values of) the image data derived from the plurality of photographs of space objects. For example, certain values (e.g., RGB values, color histogram values, image histogram values, brightness values, contrast values, contrast histogram values, etc.) may be added together and/or averaged across a plurality of photographs to determine a final (e.g., integrated) value. One of more of the photographs may show a plurality of space objects even though FIGS. 22-23 show only a single space object.

The system can receive a user selection of an object shown in a photograph and display a marker indicating a location of the object within the photograph. The marker may include any marker, such as a circle, a box, and/or crosshairs. In some embodiments, a user can select a time identifier and/or a name identifier associated with an object. Based on this selection, the system may display a marker indicating a location of the object within the photograph.

The system can be configured to automatically identify one or more objects within the modified image. Such modification may include increasing or decreasing a brightness, a contrast, or a gamma value of one or more photographs. Other changes may be made. For example, the system may reduce a characteristic of an object within at least one of the plurality of photographs. As another example, the system may remove an object within at least one of the plurality of photographs, as further discussed below.

When reducing a characteristic of an object, the system can reduce a brightest of the object within the photograph. Additionally or alternatively, a larger object (e.g., the largest object in the photograph) within the at least one of the plurality of photographs may be obscured or removed. In some embodiments, the system is configured to reduce a characteristic of an object based on a location of the object within the photograph. For example, a central object may be obscured or removed from the photograph. The user may select the object and/or the system may automatically detect the object. Additionally or alternatively, the system may reduce a characteristic of the selected object, such as a brightness. Other objects may be removed from the photograph or their visibility may be otherwise substantially reduced.

In some embodiments, the system develops each of image chips such that a space object is disposed at a predetermined location of each image chip of a plurality of image chips. For example, the space object may be disposed at or near a center of the image chip. This can allow a user more convenient and intuitive visual access to the space object within the chip. Additionally or alternatively, this arrangement can allow for fewer mistakes by the system in identifying the space object, such as when modifying one or more characteristics thereof, as disclosed herein.

It may be further advantageous to dispose the space object within the same predisposed location within the image chip within a particular range of latitudes, longitudes, times, etc. For example, the space object may be maintained at a center of each image chip even as corresponding latitude and longitudes ranges change for each image chip of the plurality of image chips as the space object moves through space. The system may use this information to predict a position of the space object position and/or an orbit of the space object orbit. The system may, based on the predicted space object's position and/or orbit, develop an image chip such that the predicted space object position and/or the space object orbit position (e.g., in an image chip where the expected position of the space object is located) is disposed at a center of the image chip. Other configurations are possible.

Object Detection

It can be advantageous to be able to automatically and/or manually identify objects in the photographs or image chips. For example, the system may be configured to detect one or more objects (e.g., additional objects) that may not have been previously detected by the system or a user.

Figure 24:
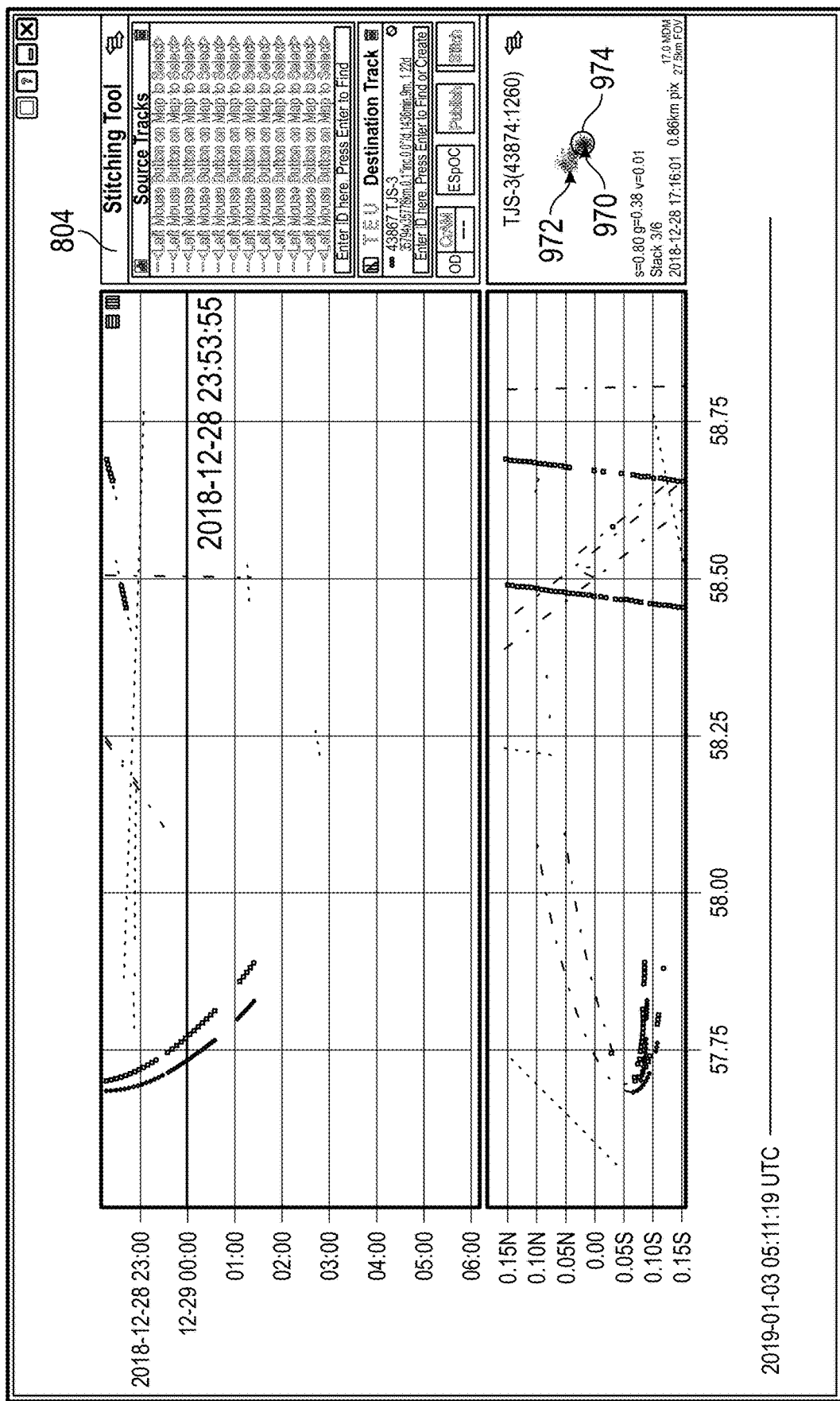
FIG. 24 shows a visualization display comprising an indication of a user-selected primary object in a photograph.
Figure 25:
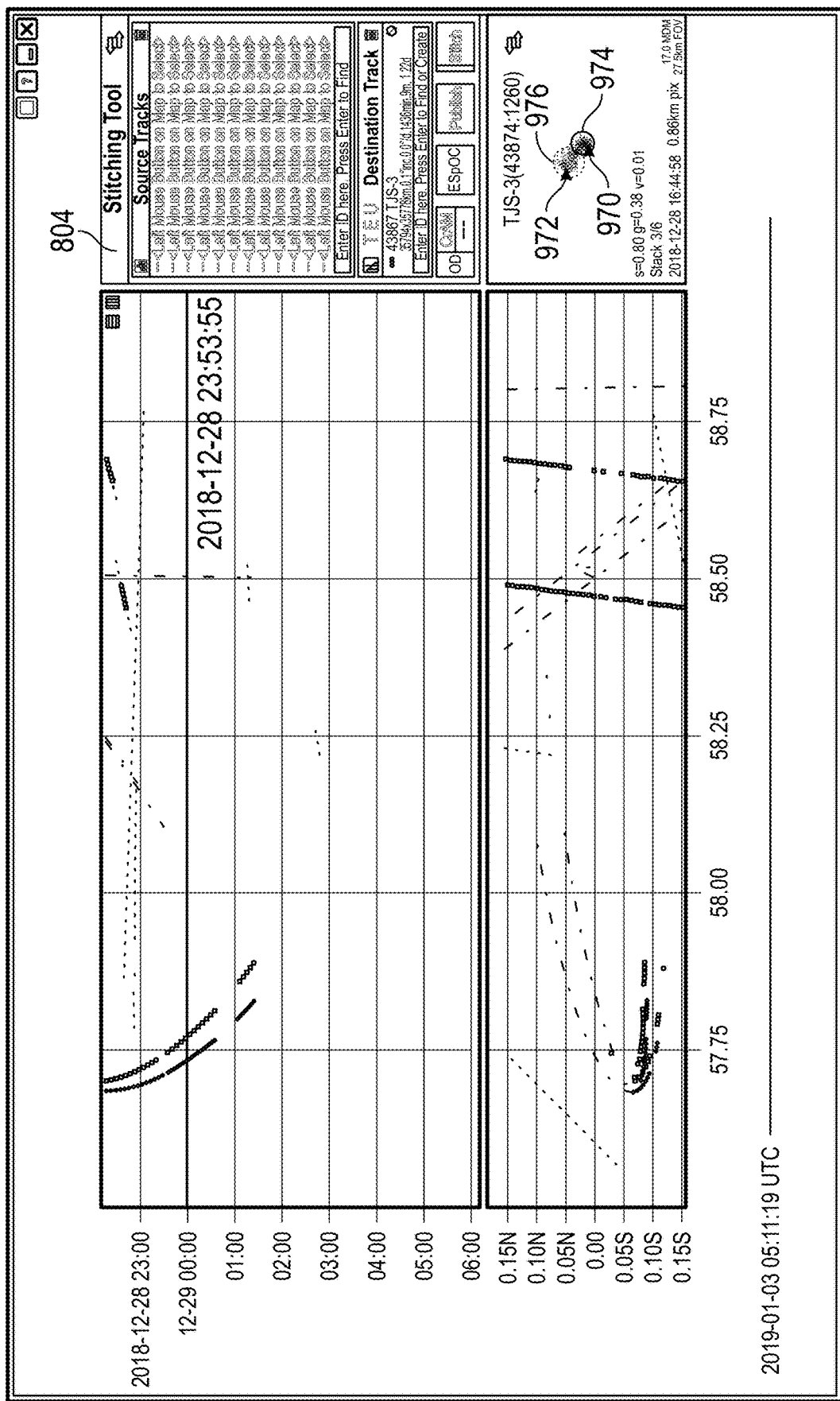
FIG. 25 shows a visualization display comprising an indication of a secondary object detected by a space object detection system.

Reference will now be made to FIGS. 24-25. FIG. 24 shows an indication of a user-selected primary object 970 in a photograph and FIG. 25 shows an indication of a secondary object 972 detected by the system (e.g., based on the user selection of the first object, based on an automatic detection). As shown in the photographs of FIGS. 24-25, the primary and/or secondary objects may be selected using user-inputted time and/or name identifiers. The system can automatically identify the primary object 970 in the photograph. In some embodiments, the system may receive a user selection of the secondary object 972 object in the at least one of the plurality of photographs. The secondary object 972 may be more visible in part because of modifications to the photographs, as described herein. In response to the user selection of the secondary object 972 in the at least one of the plurality of photographs, derive a second set of identifiers corresponding to the second orbital object.

A display a marker can be displayed to indicate a location of the primary object 970 and/or the secondary object 972 (and/or other objects) within the photograph. The marker(s) 974, 976 can be one or more of a circle, a box, crosshairs, and/or some other visual or audible marker. For example, as shown in FIG. 25, the secondary object selection identifier 976 may be a dotted-lined circle. The primary object selection identifier 974 may be a different shape, size, color, etc. to distinguish it from the secondary object selection identifier 976. Various colors or highlights may additionally or alternatively be included to mark its location in the photograph.

In some embodiments, a user can select a time and/or name identifier to signal to the system a particular location or other characteristic of the secondary object 972. The system can receive the time and/or name identifier display a marker indicating a location of the secondary object 972 within the at least one photograph. The user can enter the secondary object's 972 via various input methods, such as a mouse, keyboard, eye gesture, hand gesture, and/or other indication.

In some embodiments, the system may be configured to derive a set of identifiers associated with the secondary object 972 to automatically identify the secondary object 972 in one or more photographs. For example, the system may determine a particular contrast between an object and a background. Additionally or alternatively, the system may determine that a primary object (e.g., the primary object 970) appears to have an unusual shape, which may be an indication of another object in the frame. Such a contrast may be more apparent, for example, if a user and/or the system automatically adjusts a parameter of the image, such as the image's brightness, contrast, gamma value, and/or other characteristic. As noted above, this modification may include modifying a characteristic of the primary object 970 of the at least one of the plurality of photographs.

The system may receive the user input via two or more interface devices. For example, a combination of a keyboard, mouse, controller, headset, touch-interface, and/or other interfaces may be used.

Orbit Determination

As noted above, one of the many advantages of the systems described herein includes the ability to track and/or predict space objects. The trajectory of a space object can be extremely challenging to calculate and predict. Yet, if determining a space object's position is challenging, predicting the trajectory (e.g., orbit) of the object into the future and/or based on limited data can often be even more complicated. Yet, in spite of these challenges, embodiments disclosed herein can accurately determine such trajectories and/or present those determinations in a format that a user can readily understand and manipulate. Such an interface combines access to an enormous dataset, direction to more interesting features and aspects of that dataset that a human user can understand, and often a user experience that allows for real-time interaction with those features and aspects that is intuitive and manageable. Indications of, and data on, an object's trajectory can be indispensable to a user in certain circumstance. Such data may help identify future collisions, and having access to the data may help protect life and property.

Figure 26:
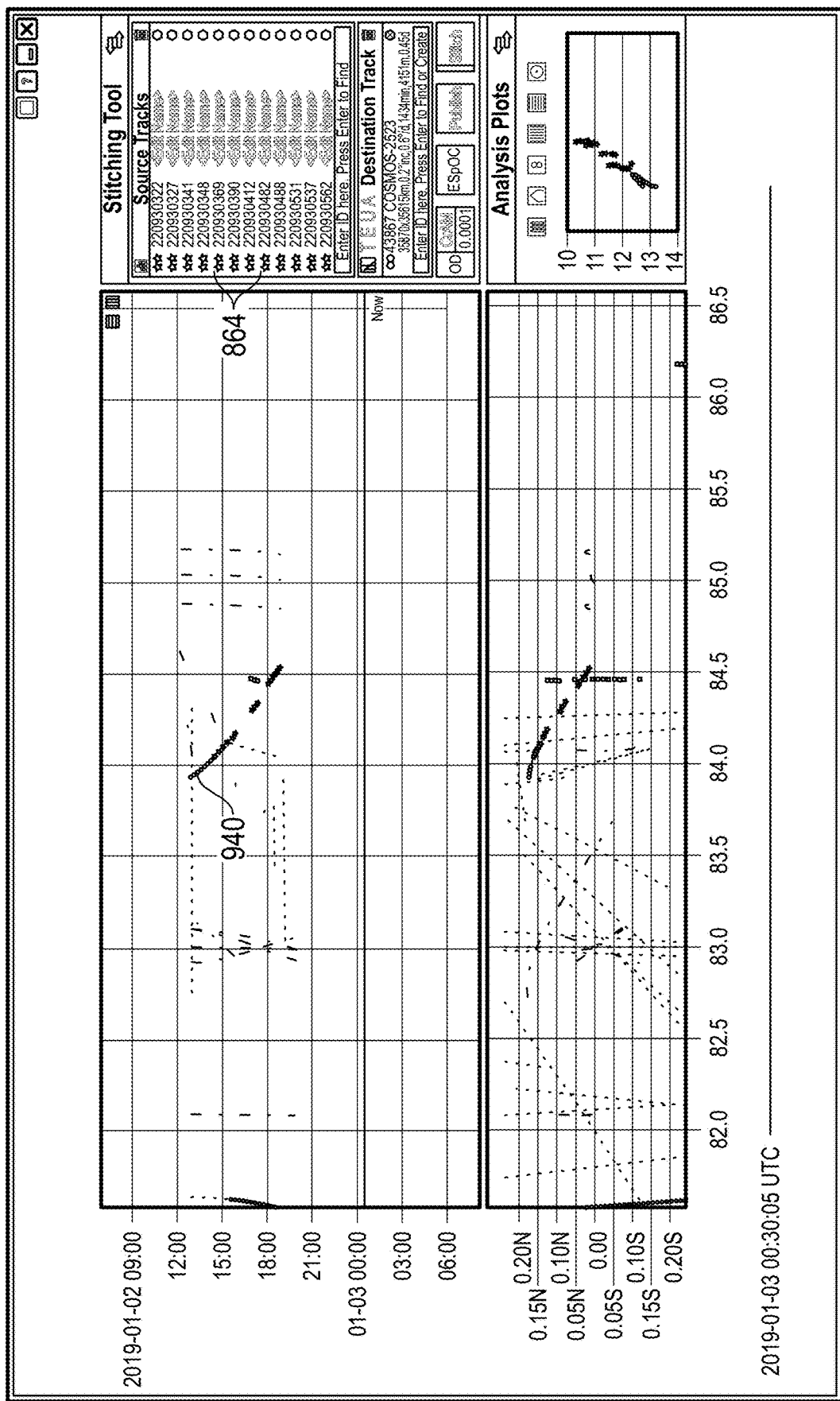
FIG. 26 shows a visualization display comprising a plurality of tracks selected by a user.
Figure 27:
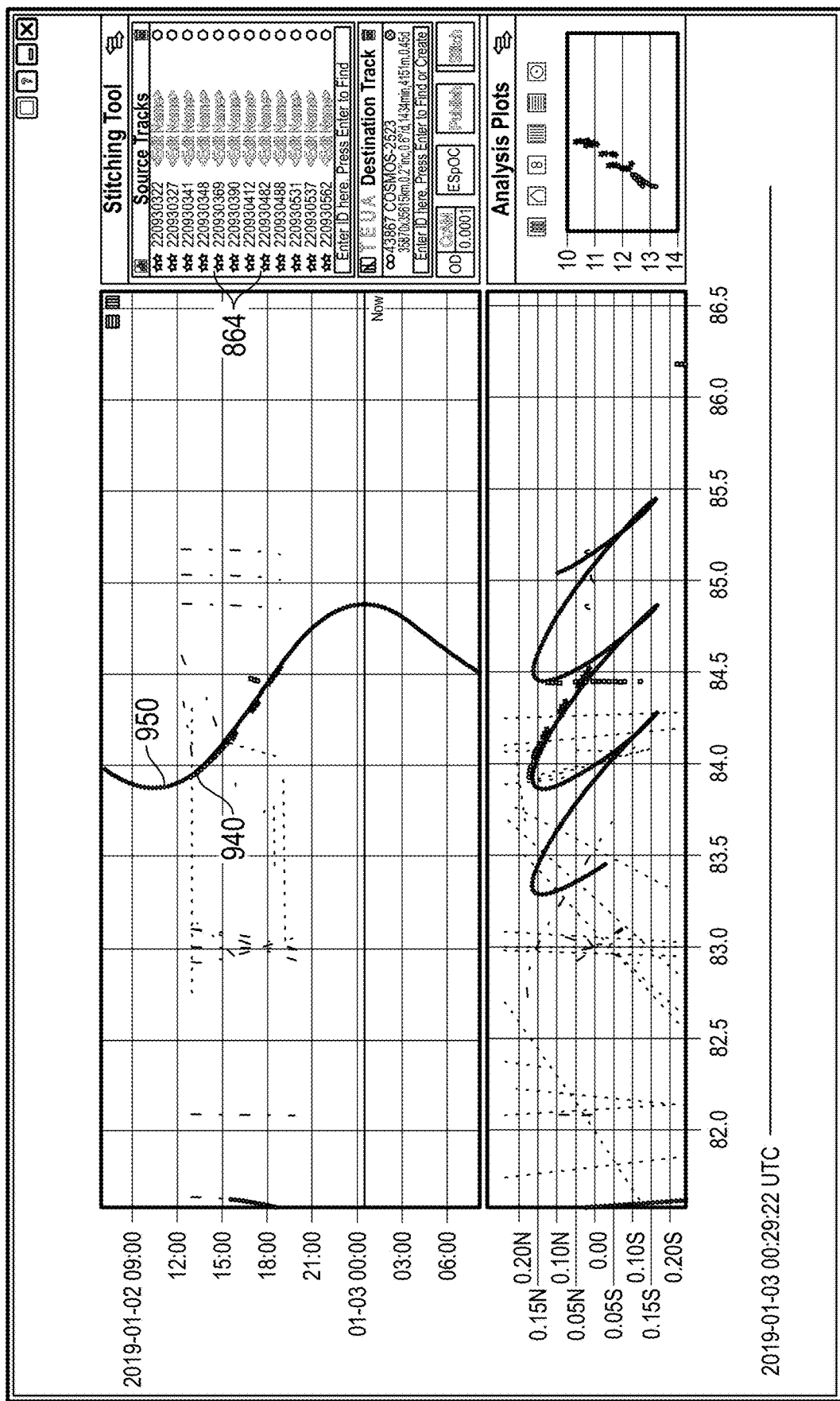
FIG. 27 shows a visualization display comprising an orbit of a space object determined using a destination track and source tracks.
Figure 28:
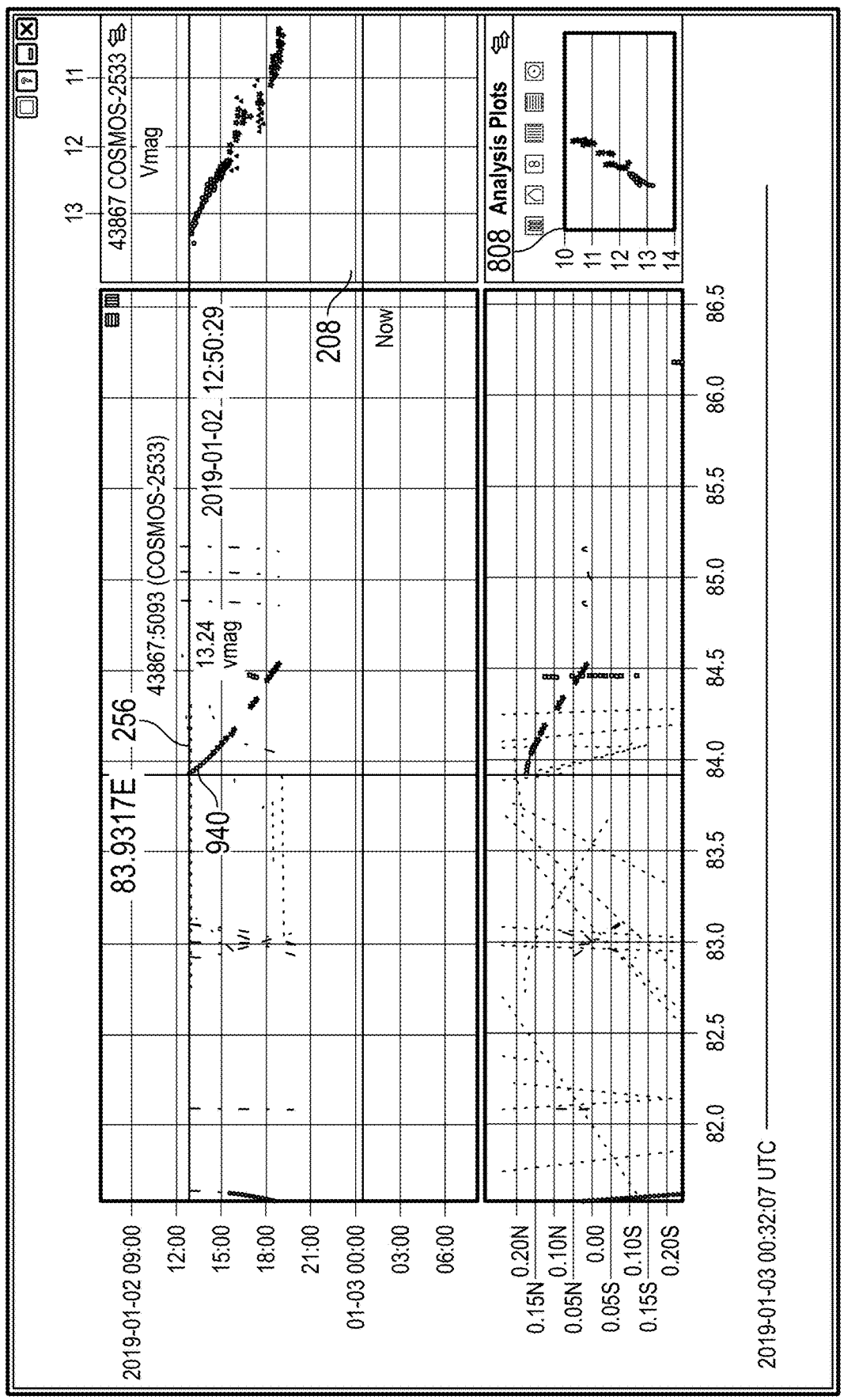
FIG. 28 shows a visualization display comprising longitude, time, and selected track labels.
Figure 29:
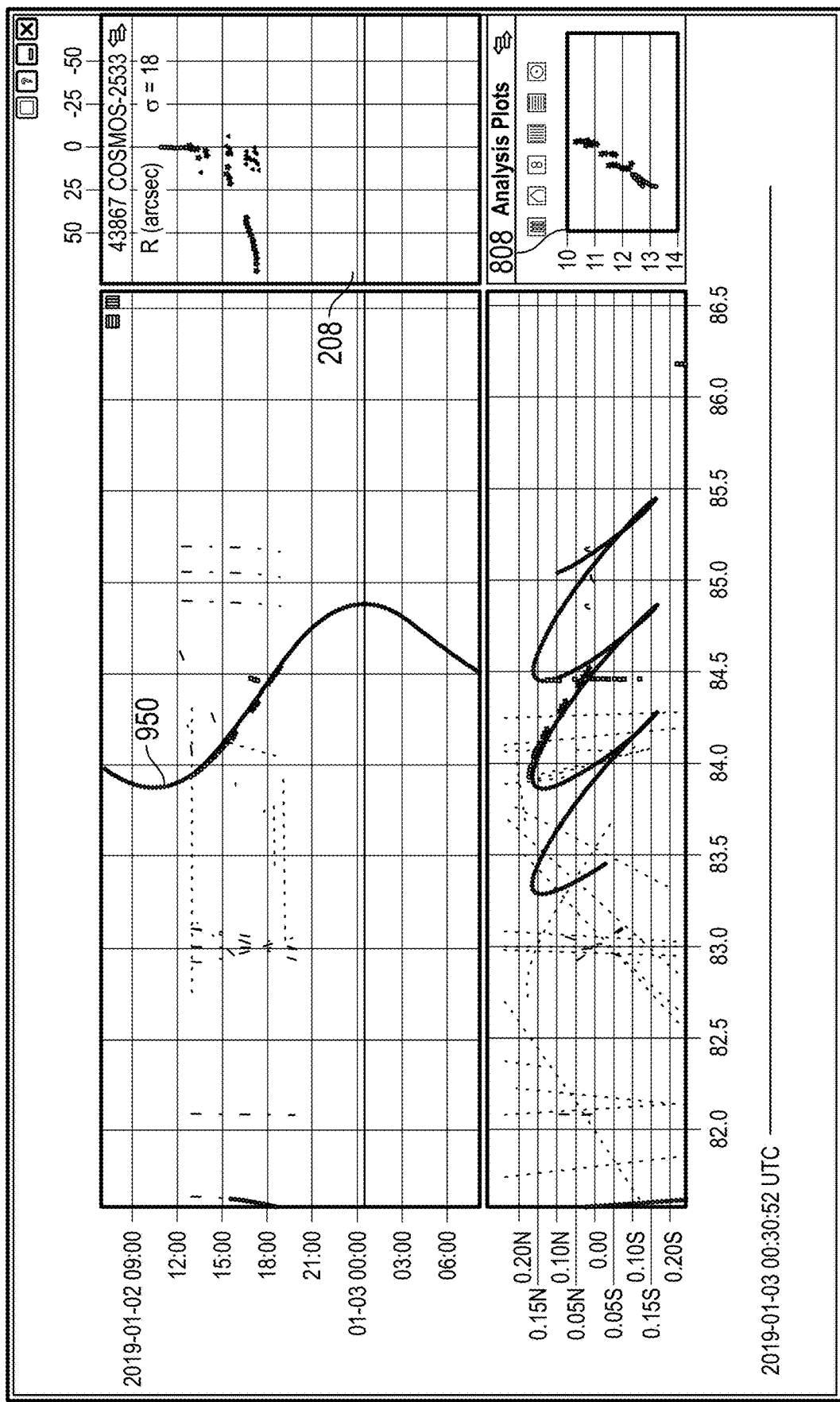
FIG. 29 shows a visualization display comprising selected tracks of a space object, an orbit for the space object, and a graph of residuals between the selected tracks and the orbit.

Reference will now be made to FIGS. 26-29. FIG. 26 shows a plurality of time points selected by user. FIG. 27 shows a track that extends both into the past and future. Tracks may include published orbit tracks and/or user-determined tracks. FIG. 28 shows an example of a longitude-time plot and a scalar-time plot showing same points. As shown, two or more plots may be used to show the same plurality of points and/or one or more of the same tracks. As shown in FIGS. 26-28, for example, a user may select timepoints by choosing a combination of time, name, longitude, and/or latitude identifiers. FIG. 29 shows a graph of residuals (either between published and user-selected or between published and system-determined). For example, as shown, the scalar-time graph 208 may indicate the residual between the system-determined timepoints and/or track and another (e.g., published) corresponding track. The scalar-time graph 208 shown indicates that a residual is near zero for some portions but deviates (e.g., to greater than 50) for other portions. Such a comparison can help the user and/or the system to calibrate the accuracy of the system's determinations. Additionally or alternatively, the user and/or system may be better able to determine the accuracy of the other corresponding track. As shown, the residual is represented as a sigma ("$\sigma$") or other symbol. The residual may be shown as a difference, an average, a standard deviation, or other metric.

As shown, the system can receive a selection of a plurality of timepoints (e.g., from a remote or local database, as described herein) corresponding to one or more orbital objects. Each timepoint may include sets of identifiers within a selected time period. For example, as shown, the point marker 256 indicates that a user has selected the track representation 940. Based on these timepoints, the system can determine an orbital path of an orbital object associated with the selected plurality of timepoints, wherein the orbital path is determined over an orbital time period that includes a time period that (i) overlaps the selected time period, (ii) precedes the selected time period, (iii) succeeds the selected time period, or (iv) any combination thereof. The selected time period generally spans from a lower-time limit to an upper-time limit that may be selected by a user or in certain implementations by the system automatically. Based on the selection, the system can generate a display interface, such as the one shown in any of FIGS. 26-29. The selected time period can determine one or more axes of one or more graphs displayed, such as any of the graphs described herein. The display can show an indication of the orbital path of the object spanning the selected time period. This indication is represented as a predicted track representation 950 in FIGS. 27 and 29.

The selection of the timepoints may include a selection based one two or more identifiers of those timepoints. This selection may help the system identify a space object of interest. For example, the selection may be based on a selection of a time identifier and a name identifier, multiple time identifiers, multiple longitude identifiers, multiple latitude identifiers, a combination of these, or some other combination of identifiers.

Once selected, the system can display an indication of the orbital path spanning a future-time period subsequent to the selected time period. Additionally or alternatively, the indication of the orbital path may span a prior-time period preceding the selected time period. As shown in FIG. 28, for example, an indication of the current time (e.g., the time the user is using the display) may be displayed. The current time may be shown as a line traversing at least part of a longitude-time graph and/or a scalar-time graph, for example, as shown in FIG. 28. Additionally or alternatively, a time of a selected timepoint may be displayed. Such times can orient a user around which part of the displayed orbital path covers a future time period. As shown, for example, in FIG. 29, the predicted track representation 950 may be displayed on a plurality of graphs simultaneously. Additionally or alternatively, the selected timepoints may be indicated on a plurality graphs.

Because the system in certain embodiments can predict the future position of the space object, the indicator of the current time may be displayed so as to indicate that the time period of the predicted track representation 950 spans a time later than the current time (e.g., the "future").

It may be helpful for a user to compare a system-predicted path with a third-party published path (e.g., a path determined from a received path equation or other symbolic representation). The system may, through an orbital path data interface for example, receive orbital path data from one or more orbital path data sets (e.g., a third party data set, a previously predicted data set of the disclosed systems). Each of the received orbital paths may be associated with the same orbital object. The system can then display, based on the received orbital path data, an indication of a received orbital path (e.g., from the third party) spanning the selected time period. This orbital path may be in addition to or instead of the predicted track representation 950, for example.

In some embodiments, the system can determine the received orbital path based on a comparison of corresponding name identifiers associated with the received orbital path and the orbital path determined by the system. Because the orbital path data among the various predicted data may be slightly different, a comparison of the data may be helpful. Accordingly, the system may be able to compare the selected orbital path with the received orbital path and, based on the comparison, indicate a result of the comparison. For example, the system may determine and display a residual characteristic of the selected orbital path by determining a difference between a timepoint associated with the selected orbital path and a corresponding timepoint associated with the received orbital path.

Comparing the selected orbital path with the received orbital path may include determining a difference between at least one identifier (e.g., a time identifier, a latitude identifier, etc.) associated with the selected orbital path and a corresponding identifier of the received orbital path. The system may determine, for example, a residual characteristic (e.g., a level of accuracy or reliability) by calculating an ascension and/or a declination based on the data. Other configurations are possible.

Example Aspects

In a 1st aspect, a system displays measurements of objects in orbit. The system can include a historical data interface configured to receive historical data of objects in orbit around a planet from a historical data set, the historical data comprising a time, a latitude, a longitude, and a scalar for each object; a real-time data interface configured to receive contemporary data of objects in orbit around a planet from a contemporary data set, the contemporary data comprising a time, a latitude, a longitude, and a scalar for each object. The contemporary data can comprise data collected after the historical data available from the historical data set; a non-transitory computer-readable medium comprising instructions executable by a hardware processor, wherein execution of the instructions by the hardware processor causes the system to generate a display interface comprising a longitude-time graph comprising: a longitude axis spanning from a lower-longitude limit to an upper-longitude limit, a time axis spanning from a lower-time limit to an upper-time limit; and a plurality of pixels corresponding to longitude-time points within the longitude-time graph, each of the plurality of longitude-time points corresponding to a data set comprising the historical data and the contemporary data, wherein the data set comprises a time identifier between the lower-time limit and the upper-time limit and a longitude identifier between the lower-longitude limit and the upper-longitude limit.

In a 2nd aspect, the system of aspect 1, wherein the display interface further comprises a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to the data set comprising the historical data and the contemporary data, wherein the data set comprises a latitude identifier between the lower-latitude limit and the upper-latitude limit and a longitude identifier between the second lower-longitude limit and the second upper-longitude limit.

In a 3rd aspect, the system of any of aspects 1-2, wherein the display interface further comprises a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to the data set comprising the historical data and the contemporary data, wherein the data set comprises a scalar identifier between the lower-scalar limit and the upper-scalar limit and a time identifier between the second lower-time limit and the second upper-time limit.

In a 4th aspect, the system of any of aspects 1-3, wherein execution of the instructions by the hardware processor causes the system to: in response to user input to pan or zoom the time axis or the second time axis, set the lower-time limit equal to the second lower-time limit and set the upper-time limit equal to the second upper-time limit; and in response to user input to pan or zoom the longitude axis or the second longitude axis, set the lower-longitude limit equal to the second lower-longitude limit and set the upper-longitude limit equal to the second upper-longitude limit.

In a 5th aspect, the system of any of aspects 1-3, wherein in response to a user entry, the system updates a display of one or more axes, wherein updating the display of one or more axes comprises displaying one or more of an updated lower-time limit, an updated upper-time limit, an updated second lower-time limit, an updated second upper-time limit, an updated lower-longitude limit, an updated upper-longitude limit, an updated second lower-longitude limit, an updated second upper-longitude limit, an updated lower-latitude limit, an updated upper-latitude limit, an updated lower-scalar limit, or an updated upper-scalar limit.

In a 6th aspect, the system of any of aspects 1-3, wherein displaying updated one or more of the axes is such that one or more of the following are true: a difference between the updated upper-time limit and the updated lower-time limit is equal to a difference between the upper-time limit and the lower-time limit; a difference between the updated second upper-time limit and the updated second lower-time limit is equal to a difference between the second upper-time limit and the second lower-time limit; a difference between the updated upper-longitude limit and the updated lower-longitude limit is equal to a difference between the upper-longitude limit and the lower-longitude limit; a difference between the updated second upper-longitude limit and the updated second lower-longitude limit is equal to a difference between the second upper-longitude limit and the second lower-longitude limit; a difference between the updated upper-latitude limit and the updated lower-latitude limit is equal to a difference between the upper-latitude limit and the lower-latitude limit; or a difference between the updated upper-scalar limit and the updated lower-scalar limit is equal to a difference between the upper-scalar limit and the lower-scalar limit.

In a 7th aspect, the system of aspect 1, wherein the display interface further comprises at least a portion of a geographic map.

In a 8th aspect, the system of any of aspects 1-3, wherein the longitude-time graph comprises the geographic map, wherein the longitude-time points are superimposed on the geographic map, and wherein the longitude-time points and the geographic map are both visible to a viewer of the display interface.

In a 9th aspect, the system of aspect 1, wherein each pixel of the plurality of pixels represents a corresponding data bin, each data bin storing historical and/or contemporary data of a number of objects having a longitude between a bin-minimum longitude and a bin-maximum longitude and having a time between a bin-minimum time and a bin-maximum time.

In a 10th aspect, the system of aspect 9, wherein each pixel of the plurality of pixels comprises an indication of the number of objects stored therein.

In a 11th aspect, the system of aspect 10, wherein the display interface further comprises a point marker, the point marker identifying a first pixel corresponding to a first longitude-time point within the longitude-time graph, and wherein, in response to a user action, the point marker identifies a subsequent pixel corresponding to a subsequent longitude-time point.

In a 12th aspect, the system of aspect 11, wherein the user action comprises mousing over the subsequent pixel.

In a 13th aspect, the system of any of aspects 11-12, wherein the display interface further comprises one or more tracking lines indicating a location of the point marker.

In a 14th aspect, the system of aspect 13, wherein the display interface further comprises a tracking line longitude stamp and a tracking line time stamp, the tracking line longitude stamp indicating a longitude associated with the identified first pixel corresponding to the first longitude-time point, and the tracking line time stamp indicating a time associated with the identified first pixel.

In a 15th aspect, the system of any of aspects 1-14, wherein each of the historical data and contemporary data sets further comprises an object identifier for each object.

In a 16th aspect, the system of aspect 15, wherein in response to a user save action, the system stores one or more objects as a bookmark, each of the one or more objects of the bookmark comprising one or more of: a common object identifier; a longitude between a bookmark-min longitude and a bookmark-max longitude; a time between a bookmark-min time and a bookmark-max time; a latitude between a bookmark-min latitude and a bookmark-max latitude; and a scalar between a bookmark-min scalar and a bookmark-max scalar.

In a 17th aspect, the system of any of aspects 15-16, wherein in response to a user save action, the system stores view-data associated with a view of the longitude-time graph, the view-data comprising data associated with the lower-time limit, the upper-time limit, the lower-longitude limit, and the upper-longitude limit.

In a 18th aspect, the system of any of aspects 1-17, wherein the scalar represents at least one of a magnitude, a projected area, a temperature, a mass, a radar cross section, an altitude, an inclination, a delta-v, a time until a certain event, or a probability of a certain event.

In a 19th aspect, the system of any of aspects 1-18, wherein the historical data set comprises data collected prior to a generation of the display interface.

In a 20th aspect, the system of any of aspects 1-19, wherein the contemporary data comprises data collected after a generation of the display interface, and wherein execution of the instructions by the hardware processor causes the system to update the display interface with pixels associated with the data collected after the generation of the display interface.

In a 21st aspect, the system of any of aspects 1-20, wherein the historical data comprises data collected over a period of time greater than one year.

In a 22nd aspect, a system for displaying measurements of objects in orbit, the system comprising: a computer readable storage medium configured to communicate instructions for displaying one or more graphs; a hardware processor in communication with the computer-readable storage medium, wherein the instructions, when executed by the hardware processor, are configured to cause the system to: receive a plurality of sets of identifiers, wherein each set of identifiers corresponds to an orbital object and comprises: an object identifier; a time identifier; a latitude identifier; a longitude identifier; and a scalar identifier; and generate a display comprising: a longitude axis spanning from a lower-longitude limit to an upper-longitude limit, a time axis spanning from a lower-time limit to an upper-time limit; and a plurality of pixels corresponding to longitude-time points within the longitude-time graph, each of the plurality of longitude-time points corresponding to a data set comprising the historical data and the contemporary data, wherein the data set comprises a time identifier between the lower-time limit and the upper-time limit and a longitude identifier between the lower-longitude limit and the upper-longitude limit; and wherein each pixel of the plurality of pixels represents a corresponding data bin, each data bin storing data of a number of objects having a longitude between a bin-minimum longitude and a bin-maximum longitude and having a time between a bin-minimum time and a bin-maximum time.

In a 23rd aspect, the system of aspect 22, wherein each pixel of the plurality of pixels comprises an indication of the number of objects stored therein.

In a 24th aspect, the system of any of aspects 22-24, wherein the display interface further comprises a point marker, the point marker identifying a first pixel corresponding to a first longitude-time point within the longitude-time graph, and wherein, in response to a user action, the point marker identifies a subsequent pixel corresponding to a subsequent longitude-time point.

In a 25th aspect, the system of aspect 24, wherein the user action comprises mousing over the subsequent pixel.

In a 26th aspect, the system of any of aspects 24-25, wherein the display interface further comprises one or more tracking lines indicating a location of the point marker.

In a 27th aspect, the system of aspect 26, wherein the display interface further comprises a tracking line longitude stamp and a tracking line time stamp, the tracking line longitude stamp indicating a longitude associated with the identified first pixel corresponding to the first longitude-time point, and the tracking line time stamp indicating a time associated with the identified first pixel.

In a 28th aspect, the system of any of aspects 24-27, wherein, in response to the user action, the display comprises a plurality of object identifiers.

In a 29th aspect, the system of aspect 28, wherein, in response to a user selection, the display comprises only one of the plurality of object identifiers.

In a 30th aspect, a system for presenting orbital object tracking information in synchronized graphs, the system comprising: a computer readable storage configured to communicate instructions for displaying a plurality of graphs; a hardware processor in communication with the computer-readable storage, wherein the instructions, when executed by the hardware processor, are configured to cause the system to: receive a plurality of sets of identifiers, each set of identifiers comprising: a name identifier; a time identifier; a latitude identifier; a longitude identifier; and a scalar identifier; generate a display of a plurality of synchronized graphs, the display comprising: a longitude-time graph comprising: a first longitude axis spanning from a first lower-longitude limit to a first upper-longitude limit, a first time axis spanning from a first lower-time limit to a first upper-time limit; and a plurality of pixels corresponding to longitude-time points within the longitude-time graph, each of the plurality of longitude-time points corresponding to a set of identifiers having a time identifier between the first lower-time limit and the first upper-time limit and having a longitude identifier between the first lower-longitude limit and the first upper-longitude limit; a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and the second upper-longitude limit; a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to a set of identifiers having a time identifier between the second lower-time limit and the second upper-time limit and having a scalar identifier between the lower-scalar limit and the upper-scalar limit; in response to a user input to adjust the first lower-longitude limit or first upper-longitude limit, automatically update the respective second lower-longitude limit or second upper-longitude limit; in response to a user input to adjust the first lower-time limit or first upper-time limit, automatically update the respective second lower-time limit or second upper-time limit.

In a 31st aspect, the system of aspect 30, wherein generating a display of a plurality of graphs comprises: in response to user input to pan or zoom the first time axis or the second time axis, setting the first lower-time limit equal to the second lower-time limit and setting the first upper-time limit equal to the second upper-time limit; and in response to user input to pan or zoom the first longitude axis or the second longitude axis, setting the first lower-longitude limit equal to the second lower-longitude limit and setting the upper-longitude limit equal to the second upper-longitude limit.

In a 32nd aspect, the system of any of aspects 30-31, wherein the display further comprises a point marker, the point marker identifying a first pixel corresponding to a first longitude-time point within the longitude-time graph, and wherein, in response to a user action, the point marker identifies a second pixel corresponding to a second longitude-time point.

In a 33rd aspect, the system of aspect 32, wherein the user action comprises mousing over the second pixel.

In a 34th aspect, the system of any of aspects 32-33, wherein the display interface further comprises one or more tracking lines indicating a location of the point marker.

In a 35th aspect, the system of aspect 34, wherein the display interface further comprises a first metadata stamp and a second metadata stamp, the first metadata stamp indicating a first metadata value associated with the identified first pixel corresponding to the first longitude-time point, and the second metadata stamp indicating a second metadata value associated with the identified first pixel.

In a 36th aspect, the system of aspect 35, wherein the first metadata value comprises a longitude identifier and the second metadata value comprises a time identifier.

In a 37th aspect, the system of any of aspects 32-36, wherein at least one of the longitude-latitude graph and the scalar-time graph comprises at least a portion of at least one of the one or more tracking lines.

In a 38th aspect, the system of any of aspects 32-37, wherein in response to a user selection, the system highlights a series of pixels comprising the first pixel identified by the point marker, wherein each of the pixels in the series corresponds to longitude-time points comprising a common name identifier.

In a 39th aspect, the system of aspect 38, wherein highlighting the series of pixels comprises altering one or more of a color, shading, intensity, or background.

In a 40th aspect, the system of any of aspects 38-39, wherein in response to the user selection, the system highlights a series of pixels corresponding to respective longitude-latitude points, wherein each of the pixels in the series corresponding to respective longitude-latitude points corresponds to longitude-latitude points comprising a common name identifier.

In a 41st aspect, the system of any of aspects 38-39, wherein in response to the user selection, the system highlights a series of pixels corresponding to respective scalar-time points, wherein each of the pixels in the series corresponding to respective scalar-time points corresponds to scalar-time points comprising a common name identifier.

In a 42nd aspect, the system of any of aspects 30-41, wherein the scalar represents a magnitude.

In a 43rd aspect, the system of any of aspects 30-42, wherein, in response to a user input to adjust the first lower-time limit or the first upper-time limit, the system updates the longitude-latitude graph to display pixels corresponding only to longitude-latitude points corresponding to a set of identifiers having a time identifier between the first lower-time limit and the first upper-time limit.

In a 44th aspect, the system of any of aspects 30-43, wherein, in response to a user input to adjust the first lower-longitude limit or the first upper-longitude limit, the system updates the scalar-time graph to display pixels corresponding only to scalar-time points corresponding to a set of identifiers having a longitude identifier between the first lower-longitude limit and the first upper-longitude limit.

In a 45th aspect, the system of any of aspects 30-44, wherein, in response to a user input to adjust the lower-latitude limit or the upper-latitude limit, the system updates each of the longitude-time graph and the scalar-time graph to display pixels corresponding only to respective longitude-time points or scalar-time points corresponding to a set of identifiers having a latitude identifier between the lower-latitude limit and the upper-latitude limit.

In a 46th aspect, the system of any of aspects 30-45, wherein, in response to a user input to adjust the lower-scalar limit or the upper-scalar limit, the system updates each of the longitude-time graph and the longitude-latitude graph to display pixels corresponding only to respective longitude-time points or longitude-latitude points corresponding to a set of identifiers having a scalar identifier between the lower-scalar limit and the upper-scalar limit.

In a 47th aspect, the system of any of aspects 30-46, wherein: an alignment of the first and second time axes are the same; a length of the first and second time axes are the same; the first and second time axes are parallel; an alignment of the first and second longitude axes are the same; a length of the first and second longitude axes are the same; and the first and second longitude axes are parallel.

In a 48th aspect, the system of any of aspects 30-47, wherein generating a display of a plurality of graphs comprises at least one of: in response to a user input to pan or zoom within an area defined by the longitude-time graph, modifying simultaneously each of the first lower-longitude limit, the first upper-longitude limit, the first lower-time limit, and the first upper-time limit; in response to a user input to pan or zoom within an area defined by the longitude-latitude graph, modifying simultaneously each of the second lower-longitude limit, the second upper-longitude limit, the lower-latitude limit, and the upper-latitude limit; or in response to a user input to pan or zoom within an area defined by the scalar-time graph, modifying simultaneously each of the lower-scalar limit, the upper-scalar limit, the second lower-time limit, and the second upper-time limit.

In a 49th aspect, the system of aspect 48, wherein the user input to pan or zoom comprises a scrolling of a mouse wheel, a click of a mouse, a pinch motion, a flick motion, a swipe motion, or a tap.

In a 50th aspect, the system of any of aspects 30-49, wherein generating a display of a plurality of graphs comprises at least one of: in response to a user input to pan or zoom along a length of the first time axis, modifying simultaneously each of the first lower-time limit and the first upper-time limit; in response to a user input to pan or zoom along a length of the second time axis, modifying simultaneously each of the second lower-time limit and the second upper-time limit; in response to a user input to pan or zoom along a length of the first longitude axis, modifying simultaneously each of the first lower-longitude limit and the first upper-longitude limit; in response to a user input to pan or zoom along a length of the second longitude axis, modifying simultaneously each of the second lower-longitude limit and the second upper-longitude limit; in response to a user input to pan or zoom along a length of the latitude axis, modifying simultaneously each of the lower-latitude limit and the upper-latitude limit; or in response to a user input to pan or zoom along a length of the scalar axis, modifying simultaneously each of the lower-scalar limit and the upper-scalar limit.

In a 51st aspect, a system for tagging elements in a display of orbital object tracking information, the system comprising: a computer readable storage configured to communicate instructions for displaying a plurality of graphs; a hardware processor in communication with the computer-readable storage, wherein the instructions, when executed by the hardware processor, are configured to cause the system to: receive a plurality of sets of identifiers, wherein each set of identifiers corresponds to an orbital object and comprises: a name identifier; a time identifier; a latitude identifier; a longitude identifier; and a scalar identifier; and generate a display comprising: a longitude-time graph comprising: a longitude axis spanning from a lower-longitude limit to an upper-longitude limit, a time axis spanning from a lower-time limit to an upper-time limit; and a plurality of pixels corresponding to longitude-time points within the longitude-time graph, each of the plurality of longitude-time points corresponding to a set of identifiers having a time identifier between the lower-time limit and the upper-time limit and having a longitude identifier between the lower-longitude limit and the upper-longitude limit; a tagging interface comprising a stitching selector, wherein in response to a user selection of: a destination element comprising a first name identifier, a source element comprising at least one of the plurality of pixels, the at least one of the plurality of pixels corresponding to longitude-time points comprising a second name identifier, and the stitching selector, the display is configured to indicate that the source element comprises the first name identifier.

In a 52nd aspect, the system of aspect 51, wherein each of the destination element and source element consists of one or more points displayed by the system during the user selection of the stitching selector.

In a 53rd aspect, the system of any of aspects 51-52, wherein in response to the user selection, the computer readable storage associates a first data file comprising the first name identifier with a second data file comprising the second name identifier.

In a 54th aspect, the system of any of aspects 51-52, wherein the display further comprises a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and second upper-longitude limit.

In a 55th aspect, the system of aspect 54, wherein generating a display comprises: in response to user input to pan or zoom the longitude axis or the second longitude axis, setting the lower-longitude limit equal to the second lower-longitude limit and setting the upper-longitude limit equal to the second upper-longitude limit.

In a 56th aspect, the system of aspect 55, wherein in response to the user selection of the destination element comprising the first name identifier, the system highlights a series of pixels corresponding to longitude-time points associated with the destination element, wherein each of the pixels in the series corresponds to longitude-time points comprising a common name identifier.

In a 57th aspect, the system of aspect 56, wherein highlighting the series of pixels comprises altering one or more of a color, shading, intensity, or background.

In a 58th, the system of any of aspects 55-57, wherein in response to the user selection of the destination element comprising the first name identifier, the system highlights a series of pixels corresponding to longitude-latitude points associated with the destination element, wherein each of the pixels in the series corresponds to longitude-latitude points comprising a common name identifier.

In a 59th aspect, the system of any of aspects 55-58, wherein in response to the user selection of the source element comprising the second name identifier, the system highlights one or more pixels corresponding to one or more longitude-time points associated with the source element, wherein each of the one or more highlighted pixels corresponds to one or more longitude-time points comprising a common name identifier.

In a 60th aspect, the system of any of aspects 55-59, wherein in response to the user selection of the source element comprising the second name identifier, the system highlights one or more pixels corresponding to one or more longitude-latitude points associated with the source element, wherein each of the one or more highlighted pixels corresponds to one or more longitude-latitude points comprising a common name identifier.

In a 61st aspect, the system of any of aspects 55-60, wherein the tagging interface further comprises a splice selector, wherein in response to a user selection of: at least one pixel corresponding to at least one longitude-time point comprising a first name identifier, the system highlights a series of longitude-latitude points, each of the longitude-latitude points in the series comprising an name identifier identical to the first name identifier, and the splice selector, the display is configured to distinguish a first set of one or more longitude-time points from a second set of one or more longitude-time points.

In a 62nd aspect, the system of aspect 61, wherein in response to the user selection of the splice selector, the display is further configured to distinguish a first set of one or more longitude-latitude points from a second set of one or more longitude-latitude points.

In a 63rd aspect, the system of any of aspects 61-62, wherein each of the first set and second set consists of one or more points displayed by the system during the user selection of the splice selector.

In a 64th, the system of any of aspects 51-63, wherein the display further comprises an analysis plot comprising point plots corresponding to one or more scalar-time points.

In a 65th aspect, the system of any of aspects 51-64, wherein the plurality of sets of identifiers are derived from image data corresponding to photographs of orbital objects.

In a 66th aspect, the system of any of aspects 51-65, further comprising a real-time telescope data connection interface configured to receive the image data from historical and contemporary data sets generated by a network of telescopes photographing a substantial portion of an orbit.

In a 67th aspect, a system for displaying image data derived from photographs of objects in orbit around a planet, the system comprising: a computer readable storage configured to communicate instructions for displaying a plurality of graphs; a hardware processor in communication with the computer-readable storage, wherein the instructions, when executed by the hardware processor, are configured to cause the system to: receive image data derived from a plurality of photographs of objects in orbit around the planet; receive a plurality of sets of identifiers, each of the sets associated with a photograph, a plurality of identifiers of each set derived from the associated photograph, wherein each set of identifiers corresponds to an object in orbit and comprises: a name identifier; a time identifier; a latitude identifier; a longitude identifier; and a scalar identifier; generate a display comprising: a longitude-time graph comprising: a longitude axis spanning from a lower-longitude limit to a upper-longitude limit, a time axis spanning from a lower-time limit to a upper-time limit; a plurality of pixels corresponding to longitude-time points within the longitude-time graph, each of the plurality of longitude-time points corresponding to a set of identifiers having a time identifier between the lower-time limit and the upper-time limit and having a longitude identifier between the lower-longitude limit and the upper-longitude limit; in response to a user selection of a time identifier and a name identifier, generate a display of at least one of the plurality of photographs.

In a 68th aspect, the system of aspect 67, wherein the instructions, when executed by the hardware processor, are configured to cause the system to receive the at least one of the plurality of photographs from a database remote from the system.

In a 69th aspect, the system of any of aspects 67-68, wherein the instructions, when executed by the hardware processor, are configured to cause the system to receive the at least one of the plurality of photographs from a database local to the system.

In a 70th aspect, the system of any of aspects 67-69, wherein the instructions, when executed by the hardware processor, are configured to cause the system to receive the at least one of the plurality of photographs via pointers, the at least one of the plurality of photographs stored in corresponding one or more databases.

In a 71st aspect, the system of any of aspects 67-70, wherein the display further comprises a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and the second upper-longitude limit.

In a 72nd aspect, the system of any of aspects 67-71, wherein the display further comprises a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to a set of identifiers having a time identifier between the second lower-time limit and the second upper-time limit and having a scalar identifier between the lower-scalar limit and the upper-scalar limit.

In a 73rd aspect, the system of any of aspects 67-72, wherein the scalar represents a magnitude.

In a 74th aspect, the system of any of aspects 67-73, wherein at least one of the plurality of photographs shows a plurality of objects in orbit around the planet.

In a 75th aspect, the system of aspect 74, wherein the instructions, when executed by the hardware processor, are configured to cause the system to: receive a selection of an object shown in the at least one photograph; and display a marker indicating a location of the object within the at least one photograph.

In a 76th aspect, the system of aspect 75, wherein the marker comprises at least one of a circle, a box, or crosshairs.

In a 77th aspect, the system of any of aspects 74-76, wherein the instructions, when executed by the hardware processor, are configured to cause the system to: receive a selection of a time identifier and a name identifier associated with an object; and display a marker indicating a location of the object within the at least one photograph.

In a 78th aspect, a system for tagging elements in a display of orbital object tracking information, the system comprising: a computer readable storage configured to communicate instructions for tagging elements in a display of orbital object tracking information; a hardware processor in communication with the computer-readable storage, wherein the instructions, when executed by the hardware processor, are configured to cause the system to: receive a plurality of sets of identifiers, wherein each set of identifiers corresponds to an orbital object and comprises: a time identifier; a latitude identifier; a longitude identifier; and a scalar identifier; determine that a first track comprising a plurality of the sets of identifiers is associated with the same orbital object; receive a name identifier associated with the first track; and generate a display comprising: a longitude-time graph comprising: a longitude axis spanning from a lower-longitude limit to an upper-longitude limit, a time axis spanning from a lower-time limit to an upper-time limit; and a first track representation comprising longitude-time points within the longitude-time graph, each of the plurality of longitude-time points corresponding to a set of identifiers having a time identifier between the lower-time limit and the upper-time limit and having a longitude identifier between the lower-longitude limit and the upper-longitude limit, wherein the first track representation provides a view of at least a portion of the first track; and a tagging interface comprising a stitching selector, wherein in response to a user selection of the first track representation, the display is configured to indicate an automatic selection of at least a second track representation corresponding to a second track comprising a plurality of the sets of identifiers, the second track representation selected based on a determination that the second track is associated with the same orbital object as the first track.

In a 79th aspect, the system of aspect 78, wherein the longitude-time graph comprises at least a portion of the second track representation.

In a 80th aspect, the system of any of aspects 78-79, wherein the display further comprises a longitude-latitude graph comprising: a second longitude axis spanning from a second lower-longitude limit to a second upper-longitude limit, a latitude axis spanning from a lower-latitude limit to an upper-latitude limit; and a longitude-latitude track representation comprising longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and second upper-longitude limit, wherein the longitude-latitude track representation provides a view of at least a portion of the first track.

In a 81st aspect, the system of any of aspects 78-80, wherein the instructions, when executed by the hardware processor, are configured to update the display to highlight the second track representation.

In a 82nd aspect, the system of aspect 81, wherein the instructions, when executed by the hardware processor, are configured to update the display to progressively highlight one or more additional track representations after highlighting the second track representation.

In a 83rd aspect, the system of aspect 82, wherein the instructions, when executed by the hardware processor, are configured to update the display automatically to progressively highlight each of the additional track representations, wherein a delay of 0.01 s to 10 s is included between each of the highlights.

In a 84th aspect, the system of aspect 83, wherein the instructions, when executed by the hardware processor, are configured to suspend, in response to a user's suspend input, the progressive highlighting of each of the additional track representations.

In a 85th aspect, the system of aspect 84, wherein a length of the delay between each of the highlights depends on at least one of a density or number of tracks displayed.

In a 86th aspect, the system of aspect 85, wherein the instructions, when executed by the hardware processor, are configured to update the display to progressively highlight the additional track representations based at least on a time identifier associated with the additional track representations.

In a 87th aspect, the system of any of aspects 85-86, wherein the instructions, when executed by the hardware processor, are configured to update the display to progressively highlight the additional track representations within the longitude-time graph by receiving a user designation comprising a scroll indicator, a button, a wheel, a switch, or any combination thereof.

In a 88th aspect, the system of any of aspects 85-87, wherein the instructions, when executed by the hardware processor, are configured to update the display to progressively deselect highlighted track representations within the longitude-time graph by receiving a user designation comprising a scroll indicator, a button, a wheel, a switch, or any combination thereof.

In a 89th aspect, the system of any of aspects 78-88, wherein the display further comprises a scalar-time graph comprising: a scalar axis spanning from a lower-scalar limit to an upper-scalar limit, a time axis spanning from a lower-time limit to an upper-time limit; and a scalar-time track representation comprising scalar-time points within the scalar-time graph, each of the plurality of scalar-time points corresponding to a set of identifiers having a time identifier between the lower-time limit and the upper-time limit and having a scalar identifier between the second lower-scalar limit and second upper-scalar limit, wherein the scalar-time track representation provides a view of at least a portion of the first track.

In a 90th aspect, a computer-implemented method of tagging elements in a display of orbital object tracking information, the method comprising: receiving a plurality of sets of identifiers, wherein each set of identifiers corresponds to an orbital object and comprises: a time identifier; a latitude identifier; a longitude identifier; and a scalar identifier; determining that a first track comprising a plurality of the sets of identifiers is associated with the same orbital object; receiving a name identifier associated with the first track; and generating a display comprising: a longitude-time graph comprising a first track representation comprising longitude-time points within the longitude-time graph, wherein the first track representation provides a view of at least a portion of the first track; and a tagging interface comprising a function selector; receiving a user selection of the first track representation; in response to the user selection, determining that a second track comprising a plurality of the sets of identifiers is associated with the same orbital object as the first track; and indicating an automatic selection of at least the second track representation corresponding to the second track.

In a 91st aspect, the method of aspect 90, further comprising updating the display to highlight the second track.

In a 92nd aspect, the method of any of aspects 90-91, wherein the function selector comprises a stitching selector, wherein in response to a user selection of the first track representation, the method comprises indicating an automatic selection of at least a second track representation corresponding to a second track comprising a plurality of the sets of identifiers, the second track representation selected based on a determination that the second track is associated with the same orbital object as the first track.

In a 93rd aspect, the method of any of aspects 90-92, wherein the function selector comprises an orbit selector, and in response to a user selection of a track representation corresponding to an orbital object and a time period, the method comprises: determining an orbital path of the orbital object, wherein the orbital path is determined over an orbital time period that includes a first time period that (i) overlaps the time period, (ii) precedes the time period, (iii) succeeds the time period, or (iv) any combination thereof, the first time period spanning from a lower-time limit to an upper-time limit; and generating a display of an indication of the orbital path spanning at least the first time period.

In a 94th aspect, a system for displaying image data derived from photographs of space objects, the system comprising: a computer readable storage comprising instructions for displaying image data derived from photographs of space objects; a hardware processor in communication with the computer-readable storage, wherein the instructions, when executed by the hardware processor, are configured to cause the system to: receive a plurality of photographs of space objects within a time domain, each of the plurality of photographs corresponding to a latitude domain, a longitude domain, and a timestamp within the time domain; receive image data derived from the plurality of photographs; receive a user selection of a latitude range within the latitude domain, a longitude range within the longitude domain, and a time range within the time domain; in response to the user selection, modify an image based on at least one of the plurality of photographs and generate a display of the modified image.

In a 95th aspect, the system of aspect 94, wherein the instructions, when executed by the hardware processor, are configured to cause the system to generate a modified image from two or more images of the plurality of photographs within the selected latitude range, longitude range, and time range.

In a 96th aspect, the system of any of aspects 94-95, wherein the at least one of the plurality of photographs shows a plurality of space objects.

In a 97th aspect, the system of aspect 96, wherein the instructions, when executed by the hardware processor, are configured to cause the system to: receive a user selection of an object shown in the at least one photograph; and display a marker indicating a location of the object within the at least one photograph.

In a 98th aspect, the system of aspect 97, wherein the marker comprises at least one of a circle, a box, or crosshairs.

In a 99th aspect, the system of any of aspects 96-98, wherein the instructions, when executed by the hardware processor, are configured to cause the system to: receive a user selection of a time identifier and a name identifier associated with an object; and display a marker indicating a location of the object within the at least one photograph.

In a 100th aspect, the system of any of aspects 94-99, wherein the instructions, when executed by the hardware processor, are configured to cause the system to integrate the image data derived from the plurality of photographs of space objects.

In a 101st aspect, the system of any of aspects 94-100, wherein the instructions, when executed by the hardware processor, are configured to cause the system to sum image data from a plurality of photographs associated with the time range.

In a 102nd aspect, the system of any of aspects 94-101, wherein the instructions, when executed by the hardware processor, are configured to cause the system to automatically identify one or more objects within the modified image.

In a 103rd aspect, the system of any of aspects 94-102, wherein the instructions, when executed by the hardware processor, are configured to cause the system to modify at least one of a brightness, contrast, or gamma of the at least one of the plurality of photographs.

In a 104th aspect, the system of any of aspects 94-103, wherein the instructions, when executed by the hardware processor, are configured to cause the system to reduce a characteristic of an object within at least one of the plurality of photographs.

In a 105th aspect, the system of any of aspects 94-104, wherein the instructions, when executed by the hardware processor, are configured to cause the system to remove an object within at least one of the plurality of photographs.

In a 106th aspect, the system of aspect 105, wherein the removed object comprises at least one of a brightest object within the at least one of the plurality of photographs, a largest object within the at least one of the plurality of photographs, or a central object within the at least one of the plurality of photographs.

In a 107th aspect, the system of any of aspects 94-107, wherein the instructions, when executed by the hardware processor, are configured to cause the system to receive from a user a selection of an object within the at least one of the plurality of photographs.

In a 108th aspect, the system of aspect 107, wherein the instructions, when executed by the hardware processor, are configured to cause the system to reduce a characteristic of the selected object.

In a 109th aspect, the system of aspect 108, wherein the characteristic is a brightness of the selected object.

In a 110th aspect, the system of aspect 109, wherein the instructions, when executed by the hardware processor, are configured to cause the system to remove the selected object.

In a 111th aspect, the system of any of aspects 94-110, wherein the instructions, when executed by the hardware processor, are configured to cause the system to receive the at least one of the plurality of photographs from a database remote from the system.

In a 112th aspect, the system of any of aspects 94-111, wherein the instructions, when executed by the hardware processor, are configured to cause the system to receive the at least one of the plurality of photographs from a database local to the system.

In a 113th aspect, the system of any of aspects 94-112, wherein the instructions, when executed by the hardware processor, are configured to cause the system to receive the at least one of the plurality of photographs via pointers, the at least one of the plurality of photographs stored in corresponding one or more databases.

In a 114th aspect, the system of any of aspects 94-113, wherein the display further comprises a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and the second upper-longitude limit.

In a 115th aspect, the system of any of aspects 94-114, wherein the display further comprises a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to a set of identifiers having a time identifier between the second lower-time limit and the second upper-time limit and having a scalar identifier between the lower-scalar limit and the upper-scalar limit.

In a 116th aspect, the system of aspect 115, wherein the scalar represents a magnitude.

In a 117th aspect, the system of any of aspects 94-116, wherein the display further comprises a longitude-time graph comprising: a longitude axis spanning from a lower-longitude limit to a upper-longitude limit, a time axis spanning from a lower-time limit to a upper-time limit; a plurality of pixels corresponding to longitude-time points within the longitude-time graph, each of the plurality of longitude-time points corresponding to a set of identifiers having a time identifier between the lower-time limit and the upper-time limit and having a longitude identifier between the lower-longitude limit and the upper-longitude limit.

In a 118th aspect, a system for displaying space objects, the system comprising: a computer readable storage comprising instructions for displaying image data derived from photographs of space objects; a hardware processor in communication with the computer-readable storage, wherein the instructions, when executed by the hardware processor, are configured to cause the system to: receive a plurality of photographs of space objects within a time domain, each of the plurality of photographs corresponding to a latitude domain, a longitude domain, and a timestamp within the time domain; derive image data from the plurality of photographs, the image data comprising a plurality of latitude ranges within the latitude domain, a plurality of longitude ranges within the longitude domain, and a plurality of time points within the time domain; based on the derived image data, develop a plurality of image chips from the plurality of photographs, each of the plurality of image chips comprising a corresponding latitude range within the latitude domain, a longitude range within the longitude domain, and a time point within the time domain; in response to the user selection, display one or more selected image chips of the plurality of image chips.

In a 119th aspect, the system of aspect 118, wherein the instructions, when executed by the hardware processor, are configured to develop each of plurality of image chips such that a space object is disposed at a center of each of the plurality of image chips.

In a 120th aspect, the system of aspect 119, wherein the space object disposed at the predetermined location of each of the plurality of image chips is the same space object for each image chip.

In a 121st aspect, the system of aspect 119-120, wherein the predetermined location of each of the plurality of image chips comprises a center of the corresponding image chip.

In a 122nd aspect, the system of aspect 118-121, wherein the instructions, when executed by the hardware processor, are configured to develop the plurality of image chips from the plurality of photographs such that the space object is maintained at a center of each image chip even as corresponding latitude and longitudes ranges change for each image chip of the plurality of image chips as the space object moves through space.

In a 123rd aspect, the system of aspect 118-122, wherein the instructions, when executed by the hardware processor, are configured to: based on the derived image data, predict a location of at least one of a space object position or a space object orbit; and based on at least the predicted space object position or the space object orbit, develop an image chips such that at least one of the predicted space object position or the space object orbit position space object is disposed at a center of the image chip.

In a 124th aspect, a system for displaying image data derived from photographs of space objects, the system comprising: a computer readable storage configured to communicate instructions for displaying image data derived from a plurality of photographs of space objects; a hardware processor in communication with the computer-readable storage, wherein the instructions, when executed by the hardware processor, are configured to cause the system to: receive image data derived from the plurality of photographs; derive a plurality of sets of identifiers, each of the sets associated with a photograph, wherein each set of identifiers corresponds to a space object and comprises: a name identifier; a time identifier; a latitude identifier; a longitude identifier; and a scalar identifier; automatically identify a first orbital object in at least one of the plurality of photographs; receive a user selection of a second orbital object in the at least one of the plurality of photographs; in response to the user selection of the second orbital object in the at least one of the plurality of photographs, derive a second set of identifiers corresponding to the second orbital object.

In a 125th aspect, the system of aspect 124, wherein the instructions, when executed by the hardware processor, are configured to cause the system to display a marker indicating a location of the second orbital object within the at least one photograph.

In a 126th aspect, the system of aspect 125, wherein the marker comprises at least one of a circle, a box, or crosshairs.

In a 127th aspect, the system of any of aspects 124-126, wherein the instructions, when executed by the hardware processor, are configured to cause the system to: receive a selection of a time identifier and a name identifier associated with the second orbital object; and display a marker indicating a location of the second orbital object within the at least one photograph.

In a 128th aspect, the system of any of aspects 124-127, wherein the instructions, when executed by the hardware processor, are configured to cause the system to generate a display comprising a longitude-time graph comprising: a longitude axis spanning from a lower-longitude limit to a upper-longitude limit, a time axis spanning from a lower-time limit to a upper-time limit; a plurality of pixels corresponding to longitude-time points within the longitude-time graph, each of the plurality of longitude-time points corresponding to the second set of identifiers of the second orbital object, wherein the second set of identifiers has a time identifier between the lower-time limit and the upper-time limit and a longitude identifier between the lower-longitude limit and the upper-longitude limit.

In a 129th aspect, the system of any of aspects 124-128, wherein deriving the second set of identifiers of the second orbital object comprises identifying, by the hardware processor, the second orbital object in the plurality of photographs.

In a 130th aspect, the system of any of aspects 124-129, wherein the instructions, when executed by the hardware processor, are configured to cause the system to transmit the second set of identifiers of the second orbital object for storage remote from the system.

In a 131st aspect, the system of any of aspects 124-130, wherein receiving the user selection of the second orbital object in the at least one of the plurality of photographs comprises modifying at least one of a brightness, a contrast, or a gamma of the at least one of the plurality of photographs.

In a 132nd aspect, the system of any of aspects 124-131, wherein receiving the user selection of the second orbital object in the at least one of the plurality of photographs comprises modifying a characteristic of the first object of the at least one of the plurality of photographs.

In a 133rd aspect, the system of any of aspects 124-132, wherein receiving the user selection of the second orbital object in the at least one of the plurality of photographs comprises receiving a plurality of inputs via at least two interface devices.

In a 134th aspect, the system of any of aspects 124-133, wherein receiving the user selection of the second orbital object in the at least one of the plurality of photographs comprises modifying a characteristic of the selected second orbital object in the at least one of the plurality of photographs.

In a 135th aspect, the system of any of aspects 124-134, wherein the instructions, when executed by the hardware processor, are configured to cause the system to receive the at least one of the plurality of photographs from a database remote from the system.

In a 136th aspect, the system of any of aspects 124-135, wherein the instructions, when executed by the hardware processor, are configured to cause the system to receive the at least one of the plurality of photographs from a database local to the system.

In a 137th aspect, the system of any of aspects 124-136, wherein the instructions, when executed by the hardware processor, are configured to cause the system to receive the at least one of the plurality of photographs via pointers, wherein the at least one of the plurality of photographs is stored in corresponding one or more databases.

In a 138th aspect, the system of any of aspects 124-138, wherein the instructions, when executed by the hardware processor, are configured to cause the system to generate a display comprising a longitude-latitude graph comprising: a longitude axis spanning from a lower-longitude limit to an upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the lower-longitude limit and the upper-longitude limit.

In a 139th aspect, the system of any of aspects 124-139, wherein the instructions, when executed by the hardware processor, are configured to cause the system to generate a display comprising a scalar-time graph comprising: a scalar axis spanning from a lower-scalar limit to an upper-scalar limit, a time axis spanning from a lower-time limit to a upper-time limit; and a plurality of pixels corresponding to scalar-time points within the scalar-time graph, each of the plurality of scalar-time points corresponding to a set of identifiers having a time identifier between the lower-time limit and the upper-time limit and having a scalar identifier between the lower-scalar limit and the upper-scalar limit.

In a 140th aspect, the system of aspect 139, wherein the scalar represents a magnitude.

In a 141st aspect, the system of any of aspects 124-140, further comprising: a historical data interface configured to receive historical data of space objects from a historical data set; and a real-time data interface configured to receive contemporary data of space objects from a contemporary data set, wherein the contemporary data comprises data collected after the historical data available from the historical data set; wherein the plurality of sets of identifiers are received via one or both of the historical or real-time data interfaces.

In a 142nd aspect, a system for determining and displaying an orbit of an orbital object using observations of the orbital object collected over a selected time period, the system comprising: a computer readable storage configured to communicate instructions for displaying one or more graphs; an orbital object data interface configured to receive orbital object data from a data set covering at least the selected time period, the orbital object data comprising a time, a latitude, a longitude, and a scalar for the orbital object; and a hardware processor in communication with the computer-readable storage, wherein the instructions, when executed by the hardware processor, are configured to cause the system to: receive a plurality of sets of identifiers, wherein each set of identifiers corresponds to an orbital object and comprises: a name identifier; a time identifier; a latitude identifier; and a longitude identifier; receive a selection of a plurality of timepoints corresponding to an orbital object, wherein the selection of the plurality of timepoints comprises sets of identifiers within the selected time period; determine an orbital path of the orbital object associated with the selected plurality of timepoints, wherein the orbital path is determined over an orbital time period that includes a first time period that (i) overlaps the selected time period, (ii) precedes the selected time period, (iii) succeeds the selected time period, or (iv) any combination thereof, the first time period spanning from a lower-time limit to an upper-time limit; and generate a display interface comprising: a longitude-time graph comprising: a longitude axis spanning from a lower-longitude limit to an upper-longitude limit, a time axis spanning from the lower-time limit to the upper-time limit; and an indication of the orbital path spanning at least the first time period.

In a 143rd aspect, the system of aspect 142, wherein the display interface further comprises a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and the second upper-longitude limit.

In a 144th aspect, the system of any of aspects 142-143, wherein the display interface further comprises a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to a set of identifiers having a time identifier between the second lower-time limit and the second upper-time limit and having a scalar identifier between the lower-scalar limit and the upper-scalar limit.

In a 145th aspect, the system of any of aspects 142-144, wherein the selection of the plurality of timepoints comprise a time identifier and a name identifier.

In a 146th aspect, the system of any of aspects 142-145, wherein the selection of the plurality of timepoints comprise a plurality of time identifiers.

In a 147th aspect, the system of any of aspects 142-146, wherein the selection of the plurality of timepoints comprise a plurality of longitude identifiers.

In a 148th aspect, the system of any of aspects 142-147, wherein the selection of the plurality of timepoints comprise a plurality of latitude identifiers.

In a 149th aspect, the system of any of aspects 142-148, wherein execution of the instructions by the hardware processor causes the system to display an indication of the orbital path spanning a future-time period subsequent to the selected time period.

In a 150th aspect, the system of any of aspects 142-149, wherein execution of the instructions by the hardware processor causes the system to display an indication of the orbital path spanning a prior-time period preceding the selected time period.

In a 151st aspect, the system of any of aspects 142-150, the display further comprising an indicator of the current time.

In a 152nd aspect, the system of aspect 151, wherein the indicator of the current time comprises a line traversing at least part of the longitude-time graph.

In a 153rd aspect, the system of any of aspects 151-152, wherein the indicator of the current time comprises a line traversing at least part of the scalar-time graph.

In a 154th aspect, the system of any of aspects 151-153, wherein execution of the instructions by the hardware processor causes the system to display the indication of the orbital path in relation to the indicator of the current time so as to indicate that the first time period spans a time later than the current time.

In a 155th aspect, the system of any of aspects 151-154, wherein execution of the instructions by the hardware processor causes the system to display the indication of the orbital path in relation to the indicator of the current time so as to indicate that the first time period spans a time prior to the current time.

In a 156th aspect, the system of any of aspects 142-155, further comprising an orbital path data interface configured to receive orbital path data from an orbital path data set, the orbital path data comprising a plurality of received orbital paths, each of the plurality of received orbital paths being associated with an orbital object corresponding to a plurality of timepoints, and wherein execution of the instructions by the hardware processor causes the system to display, based on the received orbital path data, an indication of a received orbital path spanning at least the first time period.

In a 157th aspect, the system of aspect 156, wherein execution of the instructions by the hardware processor causes the system to determine the received orbital path based on a comparison of corresponding name identifiers associated with the received orbital path and the first orbital path.

In a 158th aspect, the system of aspect 157, wherein execution of the instructions by the hardware processor causes the system to: compare the first orbital path with the received orbital path; and based on the comparison, indicate a result of the comparison.

In a 159th aspect, the system of aspect 158, wherein comparing the first orbital path with the received orbital path comprises determining a difference between at least one identifier associated with the first orbital path and a corresponding identifier of the received orbital path.

In a 160th aspect, the system of any of aspects 158-159, wherein execution of the instructions by the hardware processor causes the system to determine a difference between at least one identifier associated with the first orbital path and a corresponding identifier of the received orbital path.

In a 161st aspect, the system of any of aspects 158-160, wherein execution of the instructions by the hardware processor causes the system to determine a residual characteristic of the first orbital path by determining a difference between a timepoint associated with the first orbital path and a corresponding timepoint associated with the received orbital path.

In a 162nd aspect, the system of aspect 161, wherein determining the difference between a timepoint associated with the first orbital path and a corresponding timepoint associated with the received orbital path comprises calculating one or more of an ascension or a declination.

In a 163rd aspect, a system for displaying measurements of space objects, the system comprising: a computer readable storage medium configured to communicate instructions for displaying one or more graphs; an orbital object data interface configured to receive orbital object data from a data set covering at least the selected time period, the orbital object data comprising a time, a latitude, a longitude, and a scalar for an orbital object; a hardware processor in communication with the computer-readable storage medium, wherein the instructions, when executed by the hardware processor, are configured to cause the system to: receive a plurality of sets of identifiers, wherein each set of identifiers corresponds to the orbital object and comprises: an object identifier; a time identifier; a latitude identifier; and a longitude identifier; receive a track comprising a plurality of the sets of identifiers associated with the orbital object; display a longitude-time graph comprising: a longitude axis spanning from a lower-longitude limit to an upper-longitude limit, a time axis spanning from a lower-time limit to an upper-time limit; and a track representation comprising longitude-time points within the longitude-time graph, each of the plurality of longitude-time points corresponding to a set of identifiers having a time identifier between the lower-time limit and the upper-time limit and having a longitude identifier between the lower-longitude limit and the upper-longitude limit, wherein the track representation provides a view of at least a portion of the track; and in response to a user selection of the track and receipt of a user instruction to determine an orbit, display an orbit representation on the longitude-time graph by: determining an orbit of the orbital object using the selected track during a time period comprising a time after or before the current time; and overlaying the orbit representation corresponding to the determined orbit on the longitude-time graph.

In a 164th aspect, the system of aspect 163, wherein execution of the instructions by the hardware processor causes the system to display the orbit representation on the longitude-time graph, on a longitude-latitude graph, or on a combination of graphs.

In a 165th aspect, the system of any of aspects 163-164, the display further comprising an indicator of the current time.

In a 166th aspect, the system of any of aspects 163-165, wherein the display interface further comprises a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to a set of identifiers having a time identifier between the second lower-time limit and the second upper-time limit and having a scalar identifier between the lower-scalar limit and the upper-scalar limit.

In a 167th aspect, the system of any of aspects 163-166, wherein the indicator of the current time comprises a line traversing at least part of the longitude-time graph, the scalar-time graph, or both.

CONCLUSION

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Methods and processes described herein may be embodied in, and partially or fully automated via, software code modules executed by one or more general and/or special purpose computers. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may comprise connected logic units, such as gates and flip-flops, and/or may comprise programmable units, such as programmable gate arrays, application specific integrated circuits, and/or processors. The modules described herein may be implemented as software modules, or may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of non-transitory computer-readable medium or other non-transitory computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with patients, health care practitioners, administrators, other systems, components, programs, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the example embodiments which follow should not be limited by the particular embodiments described above.

What is claimed:

1. A computer-implemented method for determining and displaying an orbit of an orbital object using observations of the orbital object, the method comprising:
   by an electronic hardware processor configured to execute instructions stored in a non-transitory memory connected to the electronic hardware processor:
      receiving, via an orbital object data interface from a network of telescopes, a plurality of sets of identifiers, wherein each set of identifiers corresponds to an orbital object;
      receiving, via a selection interface, a selection of a plurality of timepoints corresponding to the orbital object, wherein the selection of the plurality of timepoints comprises sets of identifiers within a display time period;
      determining an orbital path of the orbital object associated with the selected plurality of timepoints, wherein the orbital path is determined over an orbital time period that (i) overlaps the display time period, (ii) precedes the display time period, (iii) succeeds the display time period, or (iv) any combination thereof, the display time period spanning from a lower-time limit to an upper-time limit;
      generating data configured to display a position-time graph comprising:
         a position axis spanning from a lower-position limit to an upper-position limit,
         a time axis spanning from the lower-time limit to the upper-time limit, and
         an indication of the orbital path spanning at least a portion of the display time period; and
      transmitting for display on the selection interface the position-time graph including the indication of the orbital path.

2. The method of claim 1, wherein the display interface comprises a longitude-latitude graph comprising:
   a longitude axis spanning from a lower-longitude limit to a upper-longitude limit,
   a latitude axis spanning from a lower-latitude limit to an upper-latitude limit; and
   a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the lower-longitude limit and the upper-longitude limit.

3. The method of claim 1, wherein the display interface comprises a scalar-time graph comprising:
   a scalar axis spanning from a lower-scalar limit to an upper-scalar limit,
   a time axis spanning from a lower-time limit to an upper-time limit; and
   a plurality of pixels corresponding to scalar-time points within the scalar-time graph, each of the plurality of scalar-time points corresponding to a set of identifiers having a time identifier between the lower-time limit and the upper-time limit and having a scalar identifier between the lower-scalar limit and the upper-scalar limit.

4. The method of claim 1, wherein receiving the selection of the plurality of timepoints comprises receiving a time identifier and a name identifier.

5. The method of claim 1, wherein receiving the selection of the plurality of timepoints comprises receiving a plurality of time identifiers.

6. The method of claim 1, wherein receiving the selection of the plurality of timepoints comprises receiving a plurality of longitude identifiers.

7. The method of claim 1, wherein receiving the selection of the plurality of timepoints comprises receiving a plurality of latitude identifiers.

8. The method of claim 1, further comprising updating the display interface to display an indication of the orbital path spanning a future-time period subsequent to the display time period.

9. The method of claim 1, further comprising updating the display interface to display an indication of the orbital path spanning a prior-time period preceding the display time period.

10. The method of claim 1, wherein the display interface further comprises an indicator of the current time.

11. The method of claim 10, wherein the indicator of the current time comprises a line traversing at least part of the graph and a scalar-time graph.

12. The method of claim 10, further comprising updating the display interface to display the indication of the orbital path in relation to the indicator of the current time so as to indicate that the display time period spans a time later than the current time.

13. The method of claim 10, further comprising updating the display interface to display the indication of the orbital path in relation to the indicator of the current time so as to indicate that the display time period spans a time prior to the current time.

14. The method of claim 1, further comprising:
   receiving, via an orbital path data interface, orbital path data from an orbital path data set, the orbital path data comprising a plurality of received orbital paths, each of the plurality of received orbital paths being associated with an orbital object corresponding to a plurality of timepoints; and updating the display interface to display, based on the received orbital path data, an indication of a received orbital path spanning at least a portion of the display time period.

15. The method of claim 14, further comprising determining the received orbital paths based on a comparison of corresponding name identifiers associated with the received orbital paths and a first orbital path.

16. The method of claim 15, further comprising:
comparing the first orbital path with the received orbital path; and
based on the comparison, indicating a result of the comparison.

17. The method of claim 16, wherein comparing the first orbital path with the received orbital path comprises determining a difference between at least one identifier associated with the first orbital path and a corresponding identifier of the received orbital path.

18. The method of claim 16, further comprising determining a difference between at least one identifier associated with the first orbital path and a corresponding identifier of the received orbital path.

19. The method of claim 16, further comprising determine a residual characteristic of the first orbital path by determining a difference between a timepoint associated with the first orbital path and a corresponding timepoint associated with the received orbital path.

20. The method of claim 1, wherein the position-time graph comprises a longitude-time graph.

21. A computer-implemented method for displaying measurements of space objects, the method comprising:
receiving, via an orbital object data interface from a network of telescopes, a plurality of sets of identifiers, wherein each set of identifiers corresponds to an orbital object
receiving, via a selection interface, a track comprising a plurality of the sets of identifiers associated with the orbital object;
generating data configured to display a position-time graph comprising:
a position axis spanning from a lower-position limit to an upper-position limit,
a time axis spanning from a lower-time limit to an upper-time limit; and
a track representation comprising position-time points within the position-time graph, each of the plurality of position-time points corresponding to a set of identifiers having a time identifier of the plurality of sets of identifiers between the lower-time limit and the upper-time limit and having a position identifier of the plurality of sets of identifiers between the lower-position limit and the upper-position limit, wherein the track representation provides a view of at least a portion of the track;
and
in response to a user selection of the track and receipt of a user instruction to determine an orbit, generating updated data configured to display an orbit representation on the position-time graph by:
determining an orbit of the orbital object using the selected track during a time period comprising a time after or before a current time; and
transmitting for display on the selection interface an overlay of the orbit representation corresponding to the determined orbit on the position-time graph.

22. A computer-implemented method for determining and displaying an orbit of an orbital object using observations of the orbital object, the method comprising:
by an electronic processor configured to execute instructions stored in a non-transitory memory connected to the electronic processor:
receiving, via an orbital object data interface from a network of telescopes, a plurality of sets of identifiers, wherein each set of identifiers corresponds to an orbital object;
receiving, via a selection interface, a selection of a plurality of timepoints corresponding to the orbital object, wherein the selection of the plurality of timepoints comprises sets of identifiers within a time period associated with historical measurements;
determining an orbital path of the orbital object associated with the selected plurality of timepoints, wherein the orbital path is determined over an orbital
time period that (i) overlaps the time period associated with the historical measurements, (iI) precedes the display time period, (iii) succeeds the display time
period, or (iv) any combination thereof, the orbital time period spanning from a lower-time limit to an upper-time limit; and
generating a display interface having a position-time graph comprising:
a position axis spanning from a lower-position limit to an upper-position limit, a time axis spanning from the lower-time limit to the upper-time limit, and an indication of the orbital path spanning at least a portion of the display time period; and
transmitting for display on the selection interface the position-time graph including the indication of the orbital path.

* * * * *